United States Patent
Sugimura et al.

(10) Patent No.: US 8,374,401 B2
(45) Date of Patent: Feb. 12, 2013

(54) BIOMETRIC AUTHENTICATION DEVICE, AUTHENTICATION ACCURACY EVALUATION DEVICE AND BIOMETRIC AUTHENTICATION METHOD

(75) Inventors: Yuka Sugimura, Kawasaki (JP); Toshio Endoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 428 days.

(21) Appl. No.: 12/795,924

(22) Filed: Jun. 8, 2010

(65) Prior Publication Data
US 2010/0316261 A1 Dec. 16, 2010

(30) Foreign Application Priority Data
Jun. 11, 2009 (JP) ................................. 2009-140527

(51) Int. Cl.
*G06K 9/00* (2006.01)
(52) U.S. Cl. ...................................................... 382/115
(58) Field of Classification Search .................. None
See application file for complete search history.

(56) References Cited

U.S. PATENT DOCUMENTS

| | | | |
|---|---|---|---|
| 6,519,563 B1 | 2/2003 | Lee et al. | |
| 2010/0008545 A1* | 1/2010 | Ueki et al. | 382/115 |
| 2010/0045432 A1* | 2/2010 | Abe | 340/5.83 |
| 2010/0135539 A1* | 6/2010 | Kono et al. | 382/115 |
| 2010/0138668 A1* | 6/2010 | Tsuria et al. | 713/186 |
| 2011/0103657 A1* | 5/2011 | Kang et al. | 382/128 |

FOREIGN PATENT DOCUMENTS
JP 2001-101406 A 4/2001

OTHER PUBLICATIONS

Nandakumar, Karthik et al., "Likelihood Ratio-Based Biometric Score Fusion", IEEE Transactions on Pattern Analysis and Machine Intelligence, vol. 30, No. 2, Feb. 2008, 342-347.
Neyman, Jerzy et al., "On the Problem of the Most Efficient Tests of Statistical Hypotheses", Philosophical Transactions of the Royal Society of London, Series A, Containing Papers of a Mathematical or Physical Character, vol. 231, Feb. 16, 1933, 289-337.

* cited by examiner

*Primary Examiner* — Vikkram Bali
(74) *Attorney, Agent, or Firm* — Fujitsu Patent Center

(57) ABSTRACT

A biometric authentication device includes a verification-image generation probability calculation unit for calculating a verification-image generation probability using a verification-image generation probability model, a change probability calculation unit for calculating a change probability of a set of a registration image and a verification image using a change probability model, a dissimilarity calculation unit for calculating the degree of dissimilarity on the basis of the verification-image generation probability and the change probability and an authentication unit for determining whether the verification image belongs to an authentication target by comparing the degree of dissimilarity with a predetermined authentication threshold.

18 Claims, 42 Drawing Sheets

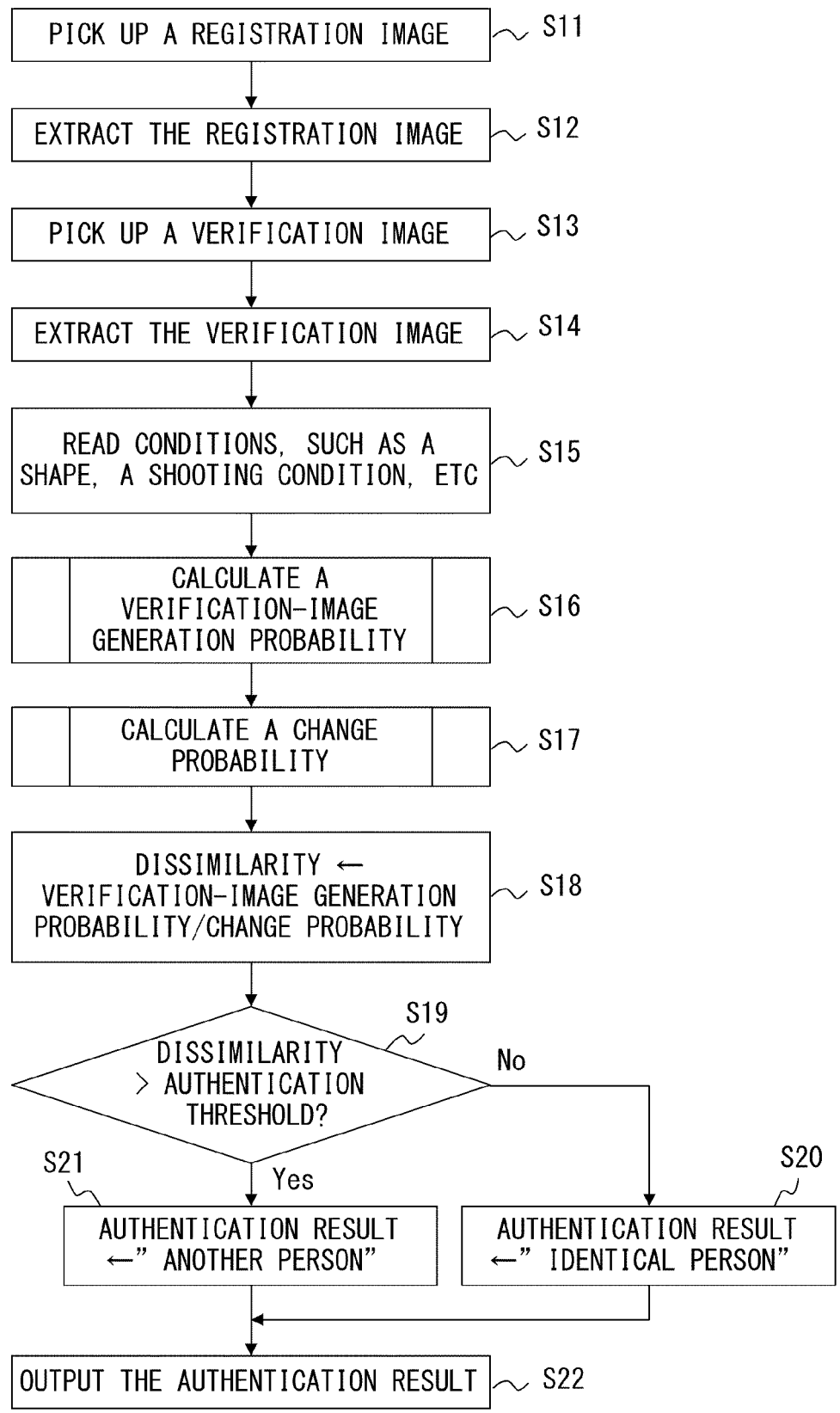
F I G. 2

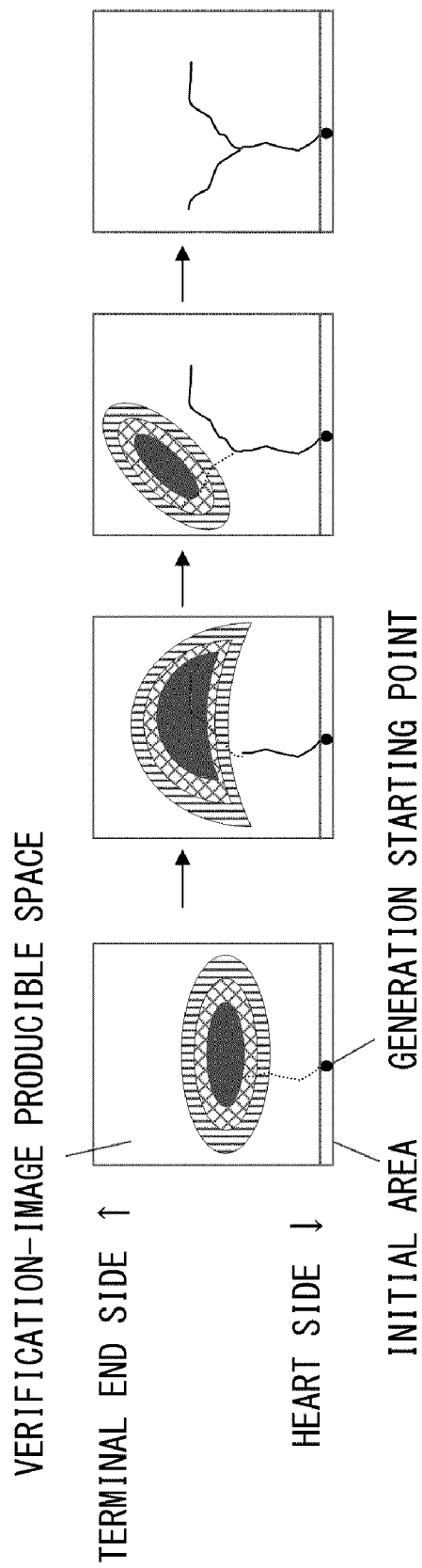
F I G. 3

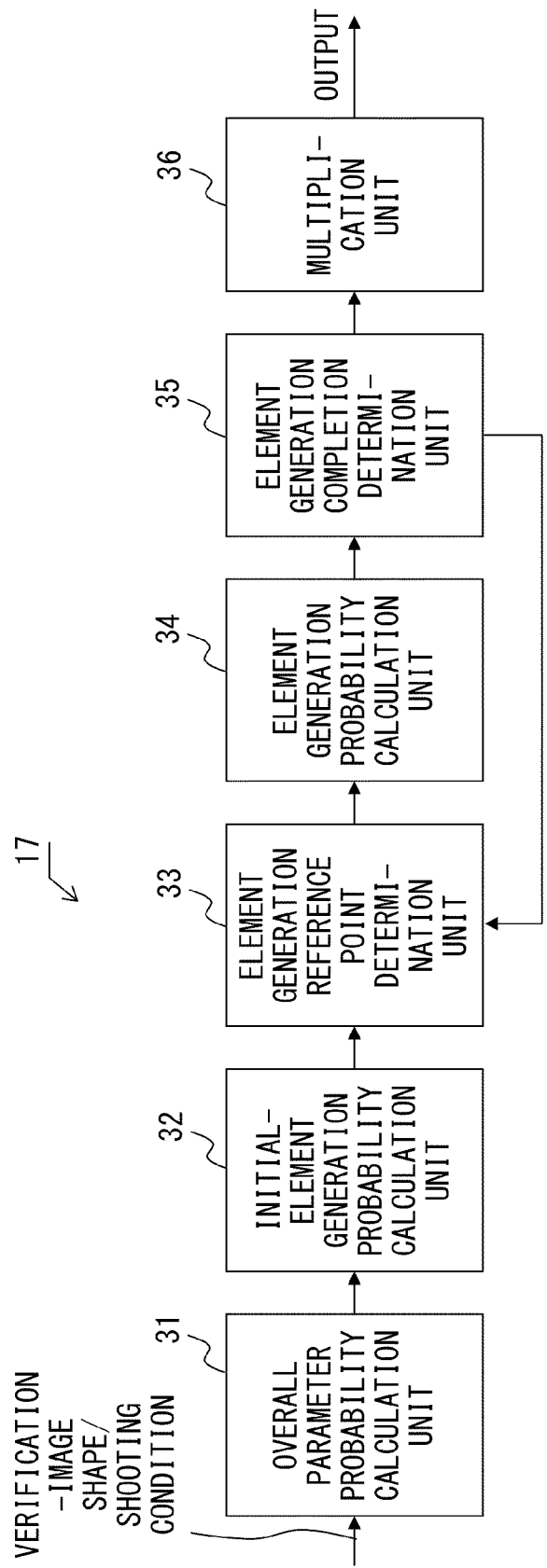
F I G. 4

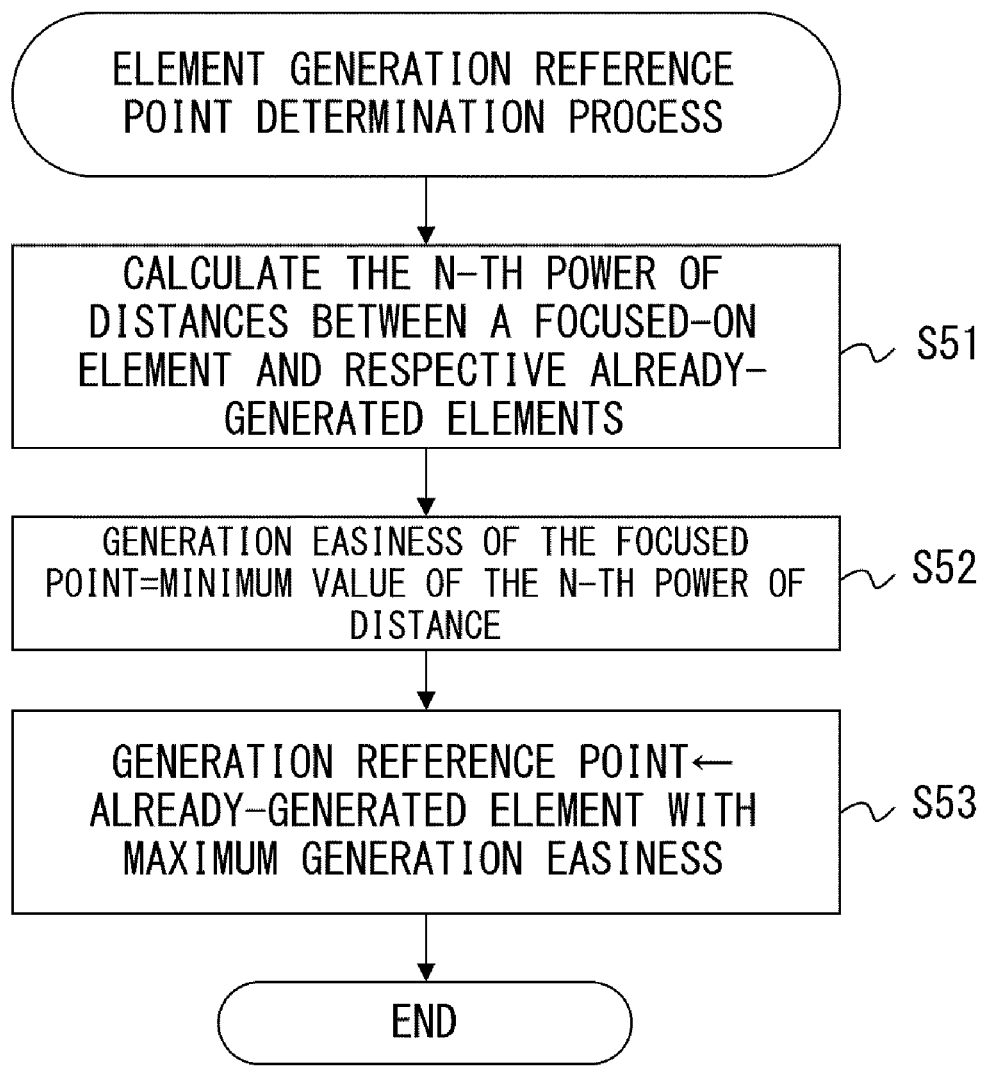
F I G. 6 B

| 1 | 0 | 0 | 0 | 0 | 0 | 1 |
|---|---|---|---|---|---|---|
| 1 | 0 | 0 | 0 | 0 | 0 | 1 |
| 1 | 0 | 0 | 0 | 0 | 0 | 1 |
| 1 | △1 | 0 | ◯1 | 0 | 0 | 1 |
| 1 | 0 | ◎1 | 0 | 0 | 0 | 1 |
| 1 | 1 | 1 | 1 | 1 | 1 | 1 |

F I G. 7

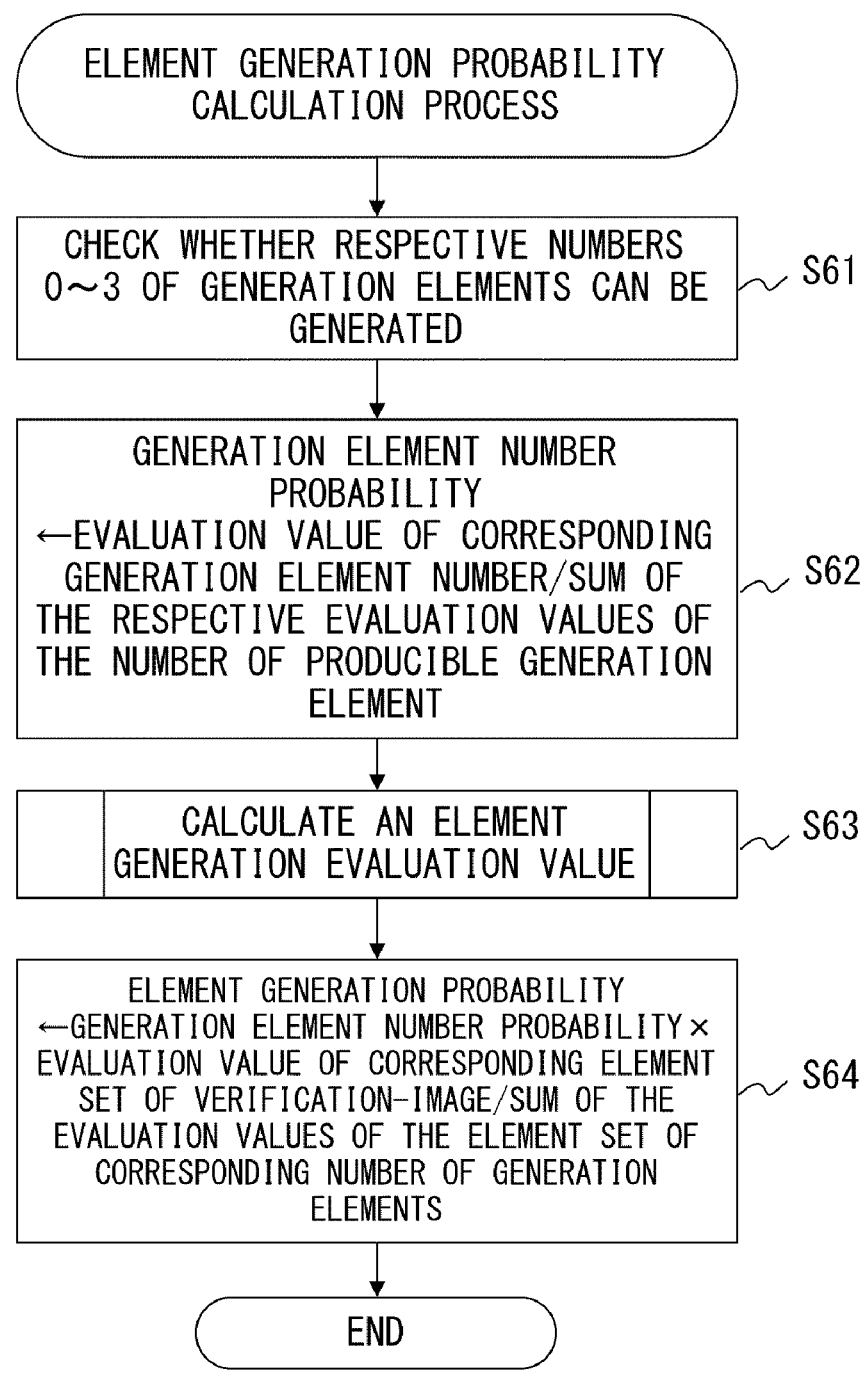
F I G. 8 A

| 0 | 0 | 0 | 0 | 0 |
|---|---|---|---|---|
| 0 | 1 | 0 | 1 | 0 |
| 0 | 0 | 1 | 0 | 0 |
| 1 | 0 | 1 | 0 | 0 |
| 0 | 1 | 0 | 0 | 0 |

FIG. 9A

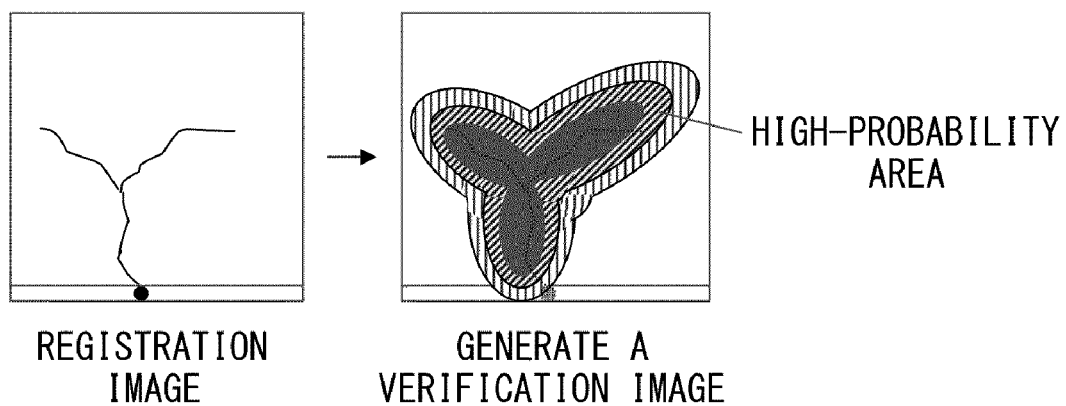
F I G. 1 1

F I G. 1 6 A

| (DISTANCE)$^2$ | 0 | 1 | 2 | 3 | 4 | ... |
|---|---|---|---|---|---|---|
| COEFFICIENT | 4 | 2 | 1 | 1/2 | 1/4 | ... |

51

F I G. 1 6 B

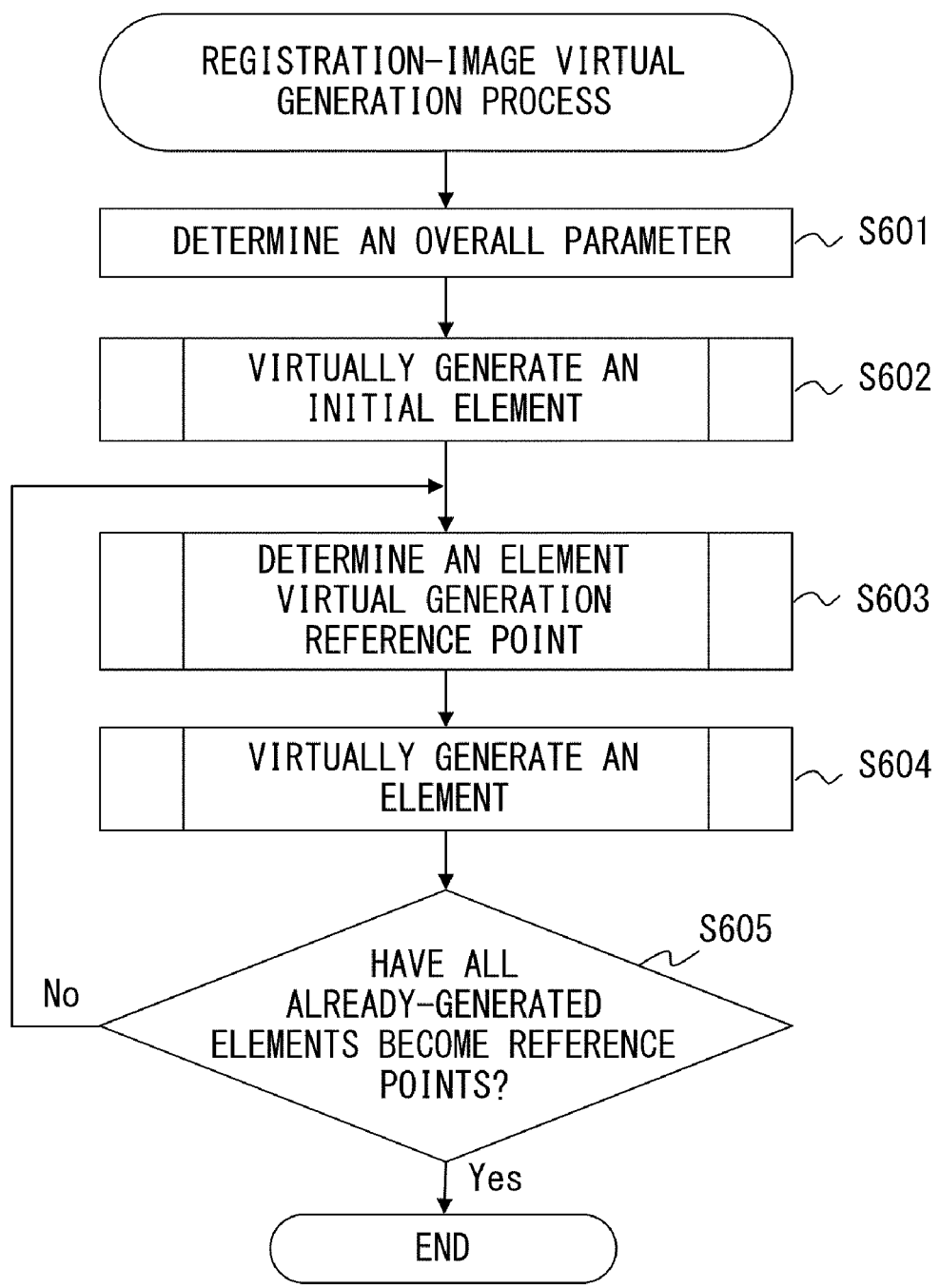
F I G. 2 6

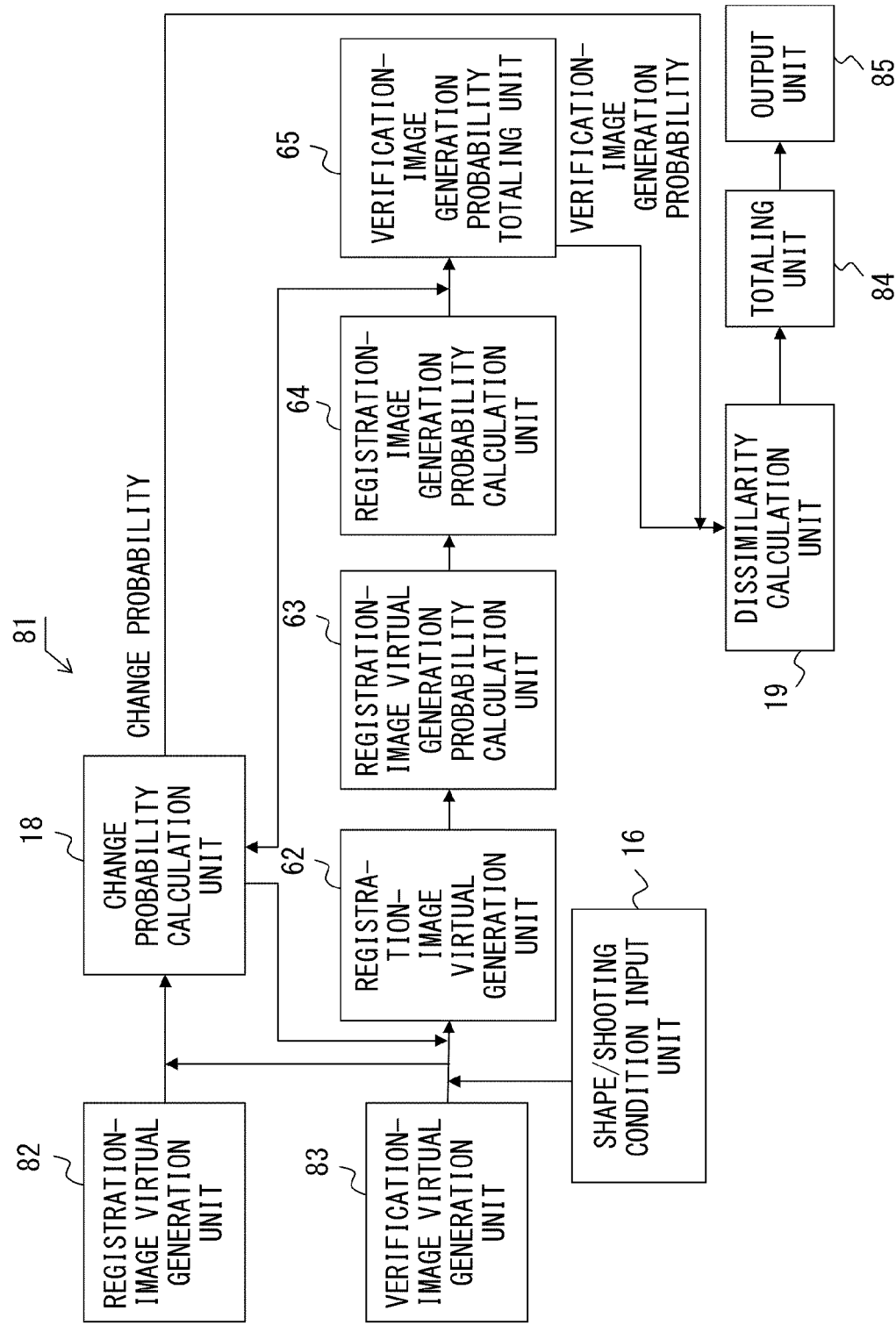
F I G. 30

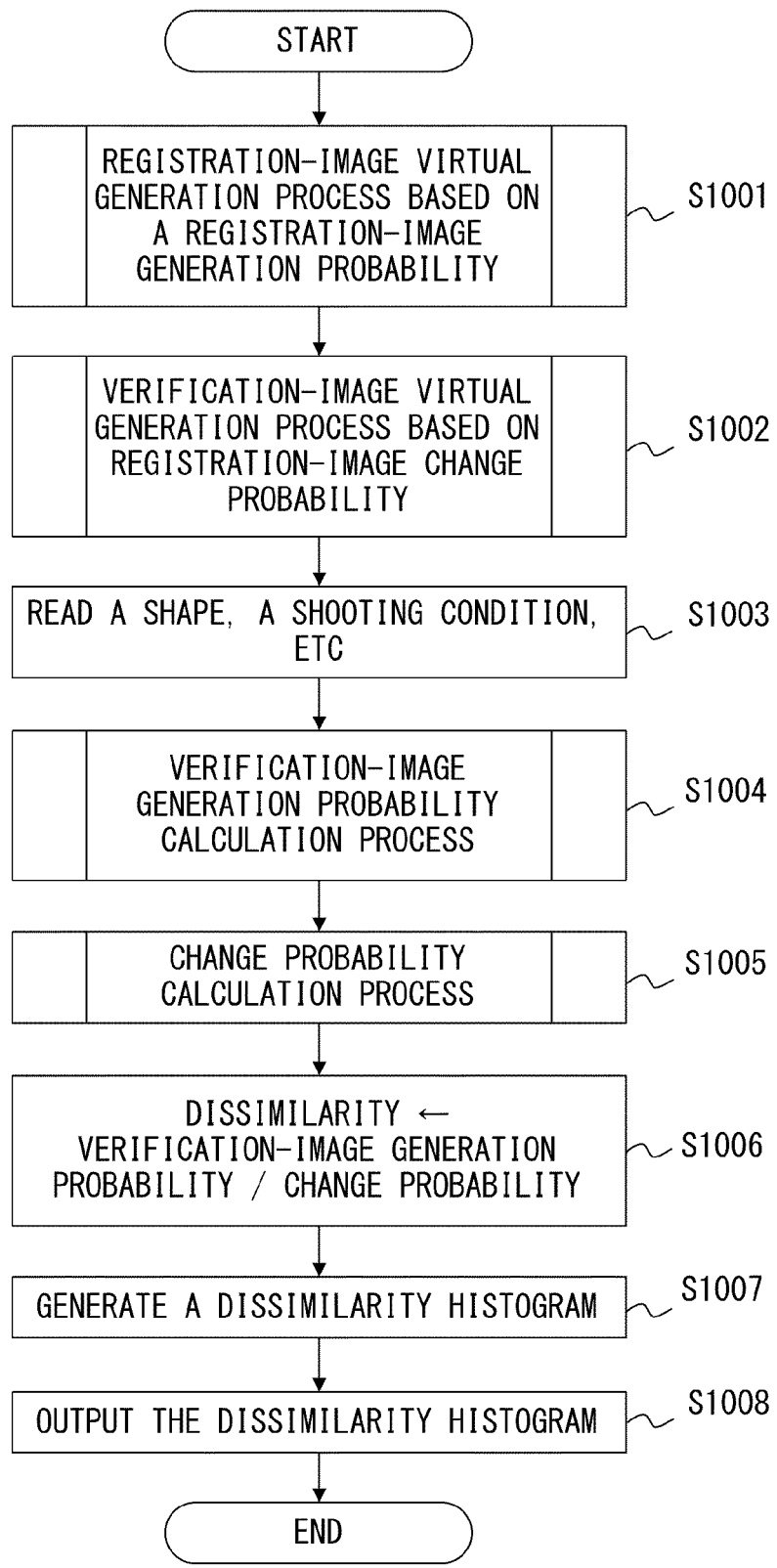
F I G. 3 1

BIOMETRIC AUTHENTICATION DEVICE, AUTHENTICATION ACCURACY EVALUATION DEVICE AND BIOMETRIC AUTHENTICATION METHOD

CROSS-REFERENCE TO RELATED APPLICATION

This application is based upon and claims the benefit of priority of prior Japanese Patent Application No. 2009-140527, filed on Jun. 11, 2009, the entire contents of which are incorporated herein by reference.

FIELD

The embodiments discussed herein are related to a biometrics authentication device, an authentication accuracy evaluation device and a biometrics authentication method.

BACKGROUND

Recently, as a personal identification means with no danger of loss (oblivion) and theft, a personal authentication technique using individual biometric information, such as a fingerprint, a face and the like has been increasingly studied. Biometrics information is roughly categorized into a physiological feature and a behavioral feature. A personal authentication technique is classified into a verification process (1:1 authentication) for determining whether a user is a specific person expressed by a card, a number or the like and an identification process (1:N authentication) for determining that a user is a specific person of registered persons.

A technique for generating a principal model necessary for individual authentication on the basis of the biometric feature information of an arbitrary person, of a plurality of pieces of biometric feature information and generating an invader model on the basis of the other pieces of biometric feature information, and a distance from a principal model and its distribution is known (for example, Patent document 1).

In biometric authentication, an image of a living body is picked up using a camera or the like and the features of the living body are extracted from the picked-up image. Then, it is verified whether a user is a principal, by collating the features with the pre-registered features of a single or a plurality of registration images.

Even in the same person, biometric information changes to some extent, depending on the difference of a collection environment, the change of a physical state. Therefore, in the individual authentication process it cannot be expected that registered data completely coincides with a verification data to be authenticated. Therefore, it is determined that a user is a principal, by the degree of similarity indicating how much a verification data to be authenticated is similar to the registered data.

When the degree of similarity is equal to or larger than a certain threshold (authentication threshold), it is determined that the user is an identical person. Otherwise, it is determined that the user is another person. It can also be determined whether a user is a principal, by comparing the degree of dissimilarity with the threshold, instead of the degree of similarity. Determination based on the degree of similarity or dissimilarity has a possibility that the following two types of errors may occur.

One is a case where a user is wrongly determined to be another person although the user is an identical person (identical person rejection).

The other is a case where a user is wrongly determined to be an identical person although the user is another person (Another person acceptance).

A rate at which the former error occurs is called a false rejection rate (FRR) and a rate at which the latter error occurs is called a false acceptance rate (FAR). Both are collectively called authentication accuracy. Authentication accuracy is one of the most important performance indexes.

When in determination based on the degree of dissimilarity, if an authentication threshold is reduced, FRR increases and FAR decreases. Conversely, if an authentication threshold is increased, FRR decreases and FAR increases. Thus, FRR and FAR are in a trade-off relation. Therefore, as the expression method of authentication accuracy, a FRR value in the case where FAR is below a certain value, a FAR value in the case where FRR is below a certain value or a set of several FRR and FAR values is used.

Authentication accuracy can be improved as follows.
1. Obtain learning data (training data) by measuring many subjects by a sensor, such a camera or the like.
2. Observe training data, and devise and realize a measurement method, a feature extraction method and a collation method that can be expected to be effective in reducing the number of errors of an individual authentication process.
3. Apply the verification method in the above step 2 to the training data in the above step 1 or a newly obtained training data (more particularly in the case where the modification of a measurement method is accompanied) and evaluate authentication accuracy.
4. Repeat the above steps 1 through 3 until targeted accuracy is obtained.

The above-described improvement method of authentication accuracy has the following problems. In order to improve the authentication accuracy of various types of data that exists in the world, many pieces of training data is necessary. Much cost is necessary for the collection and analysis of data. Since the measurement/extraction/collation methods of collected data are developed, excessive learning is easy to occur. Since the accuracy is often improved by fine adjustment for each piece of data, man-hours increase. Since a series of procedures for the improvement of authentication accuracy is executed by trial and error, it is difficult to make a stable development.

Patent document 1: Japanese Laid-open Patent Publication No. 2001-101406

SUMMARY

A biometric authentication device includes a storage unit to store data indicating an initial-element generation probability of a blood vessel image, data indicating a branch probability of an element and data indicating a change coefficient or change probability of the element, obtained by dividing a plurality of sets of a registration image and a verification image which indicate the blood vessel image of a living body into a plurality of respective elements, a verification-image generation probability calculation unit to calculate the element generation probability of the focused-on element of a verification image to be authenticated, using the data indicating the generation probability of the initial elements and the data indicating a branch probability which are stored in the storage unit and calculating a value obtained by multiplying the element generation probabilities of respective focused-on elements as the verification-image generation probability of the collation image to be authenticated, a change probability calculation unit to calculate change probabilities of the focused-on element of the verification image and the element of a registration image for a person to be authenticated, using the data indicating the change coefficient or the change probability which are stored in the storage unit and calculating a value obtained by multiplying the change probabilities of respective focused-on elements as the change probability of the verification image, a dissimilarity or similarity calculation unit to calculate the degree of similarity or dissimilarity using the verification image generation probability and the change probability and an authentication unit to determine whether the verification image to be authenticated belongs to a registered person, in accordance with the degree of dissimilarity or similarity is more or less than a threshold.

Another biometric authentication device includes a storage unit to store data indicating an initial-element generation probability of a blood vessel image, data indicating a branch probability of an element and data indicating a change coefficient or a change probability of the element, which is obtained by dividing a plurality of sets of a registration image and a verification image which indicate the blood vessel image of a living body into a plurality of respective elements, a registration image virtual generation unit to generate a registration-image by virtually generating a plurality of elements using the data indicating the initial-element generation probability and data indicating the branch probability of the element, which are stored in the storage unit; and a registration-image virtual generation probability calculation unit to calculate the registration-image virtual generation probability of the virtually generated registration image. The biometric authentication device further includes a registration-image generation probability calculation unit to calculate the registration image generation probability of a registration image, a first change probability calculation unit to calculate the respective virtual change probability of the registration image and the virtually generated registration image, a verification image generation probability calculation unit to calculate a verification image generation probability using the registration-image generation probability, the registration-image virtual generation probability and the virtual change probability, a second change probability calculation unit to calculate the respective change probability of the registration image and a verification image to be authenticated, a dissimilarity or similarity calculation unit to calculate the degree of dissimilarity or similarity using the verification-image generation probability and the change probability and an authentication unit to determine whether a verification image to be authenticated belongs to the registered person, in accordance with the degree of dissimilarity or similarity is more or less more than a threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a flowchart illustrating the summary of the process in the first preferred embodiment.

FIG. 3 illustrates a verification-image generation probability distribution and the pattern of veins.

FIG. 4 is a configuration of a verification-image generation probability calculation unit in the first preferred embodiment.

FIG. 6A and FIG. 6B are flowcharts of an initial-element generation probability calculation process and an element generation reference point determination process, respectively.

FIG. 7 illustrates already-generated elements on the outer circumference of 5×5 pixel biometric information.

FIGS. 8A and 8B are flowcharts of an element generation probability calculation process and an element generation evaluation value calculation process, respectively.

FIGS. 9A and 9B explain biometric information and an initial-element generation probability, respectively.

FIG. 11 explains a change probability (No. 1).

FIG. 26 is a flowchart of a registration-image virtual generation process.

FIG. 30 is a configuration of an authentication accuracy evaluation device in the third preferred embodiment.

FIG. 31 is a summary of the process in the third preferred embodiment.

DESCRIPTION OF EMBODIMENTS

Figure 1:
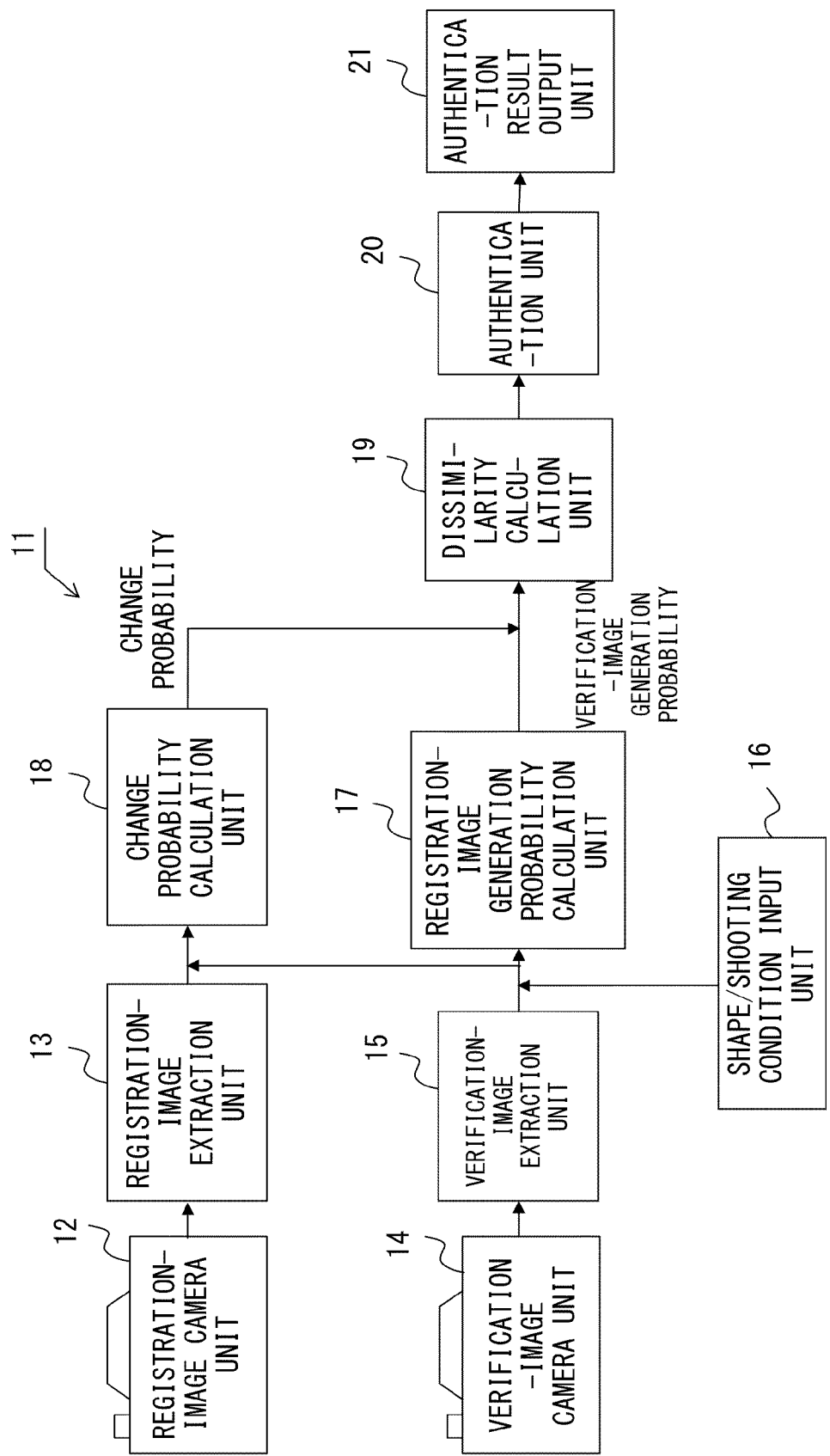
FIG. 1 is a configuration of a biometric authentication device in the first preferred embodiment.

The preferred embodiments of the present invention will be explained below. In the following explanation, a case where the verification-image generation probability and change probability of tree-shaped biometric information (biometric information indicating the features of a blood vessel and the like) is calculated using a probability model is used as an example.

The generation probability is a probability that data to be obtained becomes a specific verification image when an unspecific person presents a biometric feature for authentication. The change probability is a probability that data to be obtained becomes a specific verification image when a registered person presents a biometric feature for authentication.

In this authentication method, authentication is made as follows. As to a set of a registration image and a verification image to be used for authentication, a change probability from the registration image to a verification image and a verification image generation probability are calculated. It is determined whether a user is an identical person, using a ratio between the calculated verification-image generation probability and change probability (verification-image generation probability/change probability) as the degree of dissimilarity (likelihood-ratio).

The above authentication method realizes the best authentication by "Neyman-Pearson lemma". The best authentication means "authentication having the smallest FAR under the condition of a constant FRR" or "authentication having the smallest FRR under the condition of a constant FAR".

As a biometric authentication using the above verification-image generation probability and change probability, the following method is considered.

When learning is made, training data is obtained by collecting sets of the registration-image and verification-image of the same person for many persons. Then, verification is performed using the training data, the number of times of the generation of the same sets of the registration-image and verification-image is recorded. Then, the number of times of the generation is divided by the number of all pieces of training data to calculate its verification-image generation probability and change probability, which are stored in a database.

When authentication is made, as to the respective registration-image and verification-image of an authentication target, its verification-image generation probability and change probability are obtained from the database and the degree of dissimilarity (verification-image generation probability/ change probability) is calculated. Then, this degree of dissimilarity is compared with the authentication threshold. When the degree of dissimilarity is larger than the threshold, it is determined that the user is another person. When the degree of dissimilarity is equal to or smaller than the threshold, it is determined that the user is an identical person.

However, the above-described biometric authentication method has the following problems. In order to learn all the probabilities of all the sets of a registration-image and a verification-image, it is necessary to prepare extremely many pieces of training data. For example, when a bit-map image of 100×100 pixels is considered, the number of all the pixels becomes $2^{10000}$ and the number of the sets of a registration image and a verification image becomes its square, that is, $2^{20000}$. The authentication device has to have the number of databases that relates such a number of images to such a number of probabilities and the amount of data becomes enormous.

In order to solve the above problem, the following preferred embodiments are designed in such a way that in a biometric authentication based on tree-shaped biometric information, such as a blood vessel, verification-image generation probabilities and the change probabilities of sets of a registration image and a verification image can be calculated using a verification-image generation probability model and a change probability model.

It is assumed that a group of registration images and a group of verification images are X and Y, respectively. In this case, it is considered that if a device and a method that are_used for measurement and extraction are the same both at the time of registration and at the time of verification, X=Y is established.

However, sometimes a device or a method that are used for measurement and extraction is different between at the time of registration and at the time of verification. For example, it is considered that for a device for registration, a dedicated high-resolution sensor is used and for a device for verification, an inexpensive low-resolution sensor, a Web camera, a camera attached to a cellular phone or the like is used. In such cases, X does not coincide with Y.

Given that the group of specific registration images x, x', . . . is X, and the group of specific verification images y, y', . . . is Y. Given that a probability (registration-image generation probability) that a registration image x may be obtained is $P_x$ (x) when an unspecific person makes a registration, $\Sigma_{x \in X} P_x(x)=1$ is established.

The above expression indicates that the sum of the registration-image generation probability $P_X(x)$ of the registration images x, x', . . . becomes "1".

Alternately, sometimes a probability $P_{x,i}(x)$ that the registration image x may be obtained when a specific person i expressed by a card, a number or the like makes a registration is also used.

A verification-image generation probability that a verification image y may be obtained when an unspecific person makes a verification is expressed by $P_y(y)$. In this case, $\Sigma_{y \in Y} P_y(y)=1$ is established.

The above expression indicates that the sum of the verification-image generation probability $P_y(y)$ of the verification images y, y', . . . becomes "1".

As an unspecific person, it is assumed that its change probability that the verification image may become y when the registration image is x is $P_{Y|X}(y|x)$. Alternately, sometimes a probability $P_{Y|X,i}(y|x)$ that the verification image of a specific person i may become y when its registration image is x can be used.

Among $P_x$, $P_y$ and $P_{Y|X}$, the following expression (1) is established.

$$P_Y(y) = \sum_{x' \in X} P_X(x') P_{Y|X}(y|x') \tag{1}$$

Presuming the above, the following two methods will be explained.

The first method calculates the degree of dissimilarity $P_Y(y)/P_{Y|X}(y|x)$, using a verification-image generation probability model $P_Y$ and a change probability model $P_{Y|X}$.

The second method calculates a verification-image generation probability $P_Y(y)$, using a registration-image generation probability model $P_X$ and a change probability model $P_{Y|X}$. The verification-image generation probability $P_Y(y)$ can be calculated using the registration-image generation probability $P_X(x)$ and the change probability $P_{Y|X}(y|x)$ according to the expression (1).

Alternatively, registration images $x_1, \ldots,$ and $x_M$ can be generated using an already known probability distribution $r(x)$ and the estimation value $P'_Y(y)$ of a verification-image generation probability can be calculated by importance sampling according to the expression (2)

$$P_Y(y) = (1/M) \sum_{i=1}^{M} \{(P_X(x_i) P_{Y|X}(y|x_i))/r(x_i)\} \quad (2)$$

[1] First Embodiment

FIG. 1 is a configuration of a biometric authentication device 11 in the first preferred embodiment. The first preferred embodiment calculates a verification-image generation probability and a change probability, using a verification-image generation probability model and a change probability model, respectively. Then, the first preferred embodiment calculates the degree of dissimilarity on the basis of the verification-image generation probability and the change probability and determines whether the user is an identical person by comparing the degree of dissimilarity with a threshold.

A case where it is determined whether the verification image belongs to an identical person when an authentication target is specified by inputting an individual identification card, an individual identification number or the like will be explained below.

The process operation of the biometric authentication device 11 will be explained below with reference to the flowchart illustrated in FIG. 2.

A registration-image camera unit 12 picks up a registration image for biometric authentication (S11). A registration-image extraction unit 13 extracts biometric information from the picked-up registration image (S12). In this preferred embodiment, for example, veins in a palm or the like are used for biometric information.

A verification-image camera unit 14 picks up the blood vessel image of the palm of a verification target (S13). A verification-image extraction unit 15 extracts biometric information from the picked-up verification image (S14). A shape and shooting condition input unit 16 reads the shape of the authentication target and a shooting condition (information indicating the resolution of a camera device and the like) (S15).

A verification-image generation probability calculation unit 17 calculates a verification-image generation probability, using a verification-image generation probability model (S16). A change probability calculation unit 18 calculates the change probability of a set of a registration image and a verification image, using a change probability model (S17).

A dissimilarity calculation unit 19 calculates the degree of dissimilarity by dividing the verification-image generation probability by the change probability (S18). The degree of similarity can also be calculated instead of the degree of dissimilarity.

An authentication unit 20 compares the degree of dissimilarity with an authentication threshold (S19). When the degree of dissimilarity is equal or less than the threshold, it is determined that the user is an identical person (S20). When the degree of dissimilarity is more than the threshold, it is determined that the user is another person (S21). An authentication result output unit 21 outputs the authentication result (S22). In the case where the degree of similarity is calculated, when the degree of similarity is equal to or more than the predetermined threshold, it is determined that the user is an identical person. the degree of dissimilarity is less than the threshold, it is determined that the user is another person.

Alternatively, the registration-image camera unit 12 and the verification-image camera unit 14 can be separated from the biometric authentication device 11. A registration image picked up by the registration-image camera unit 12 of another device can also be stored in a storage device and a registration image can also be read from the storage device.

FIG. 3 illustrates respective examples of a verification-image generation probability distribution and the pattern of veins.

Veins are formed toward its terminal end from a side near the heart in the generation-possible space of a verification image. FIG. 3 illustrates a probability distribution in which veins are generated from the generation starting point of an initial area. The respective elements of a vein, such as a point, a line segment, a curve and the like have a tendency to be easily generated in a place where no existing element exists.

A black area at the center and a slash-line crossed area in its outside illustrated in FIG. 3 indicate the highest and the second highest areas, respectively, of an element generation probability. A vertical line area outside of the slash-line crossed area indicates third highest area of the element generation probability.

FIG. 4 is a configuration of the verification-image generation probability calculation unit 17. The process operation of the verification-image generation probability calculation unit 17 will be explained below in reference to the flowchart illustrated in FIG. 5.

An overall parameter probability calculation unit 31 calculates the parameters of a probability model (S31).

An initial-element generation probability calculation unit 32 calculates the generation probabilities of one or a plurality of initial elements generated in the initial generation area of the generation area (S32).

An element generation reference point determination unit 33, for example, determines its generation reference point when there is a plurality of elements as the candidate of an element generation reference point (S33).

In the process of step S33, for example, a vein image is divided into a plurality of elements and calculates the n-th power of a distance between an already-generated element and a focused-on element as a value indicating how easily an element is generated. Then, the already-generated element in which the value becomes the largest is determined as a generation reference point. This is because a vein has a tendency to be generated in such a direction that a vein goes away from an adjacent vein. The generation order of elements can be uniquely determined by the process in step S33.

An element generation probability calculation unit calculates the generation probability of a general element (S34). In this preferred embodiment, an element number evaluation value indicating the branch probability of the element of a vein image is in advance calculated on the basis of a plurality of pieces of training data and an element number evaluation table is generated. In the process of step S34, for example, the respective generation probabilities of elements are calculated with reference to this element number evaluation table. The process of calculating the generation probability of an element will be explained in detail later.

An element generation completion determination unit 35 determines whether all already-generated elements become reference points, that is, whether the calculation of a generation probability is completed as to all already-generated elements (S35).

When there is an already-generated element the calculation of whose generation probability is not completed (NO in step S35), the process returns to step S33 and the above processes in steps S33 through S35 are repeated using the remaining already-generated elements as reference points.

When the calculation of the generation probabilities of all the already-generated elements is completed (YES in step S35), a multiplication unit 36 calculates the product of the element generation probabilities of respective elements as a verification-image generation probability (S36).

By the above process, the generation probability of a verification image to be authenticated is outputted from the multiplication unit 36.

Figure 5:
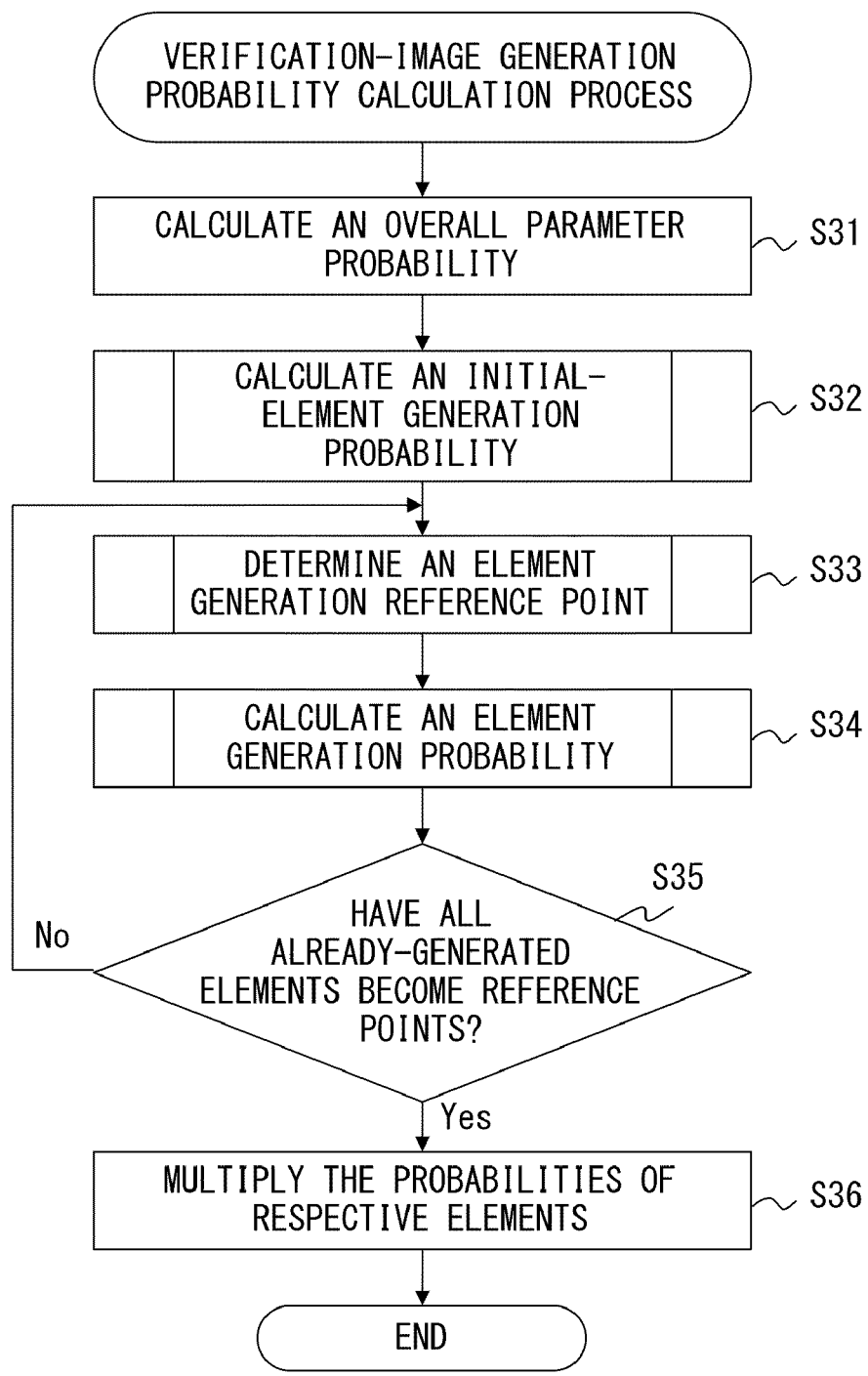
FIG. 5 is a flowchart of a verification-image probability calculation process.
Figure 6A:
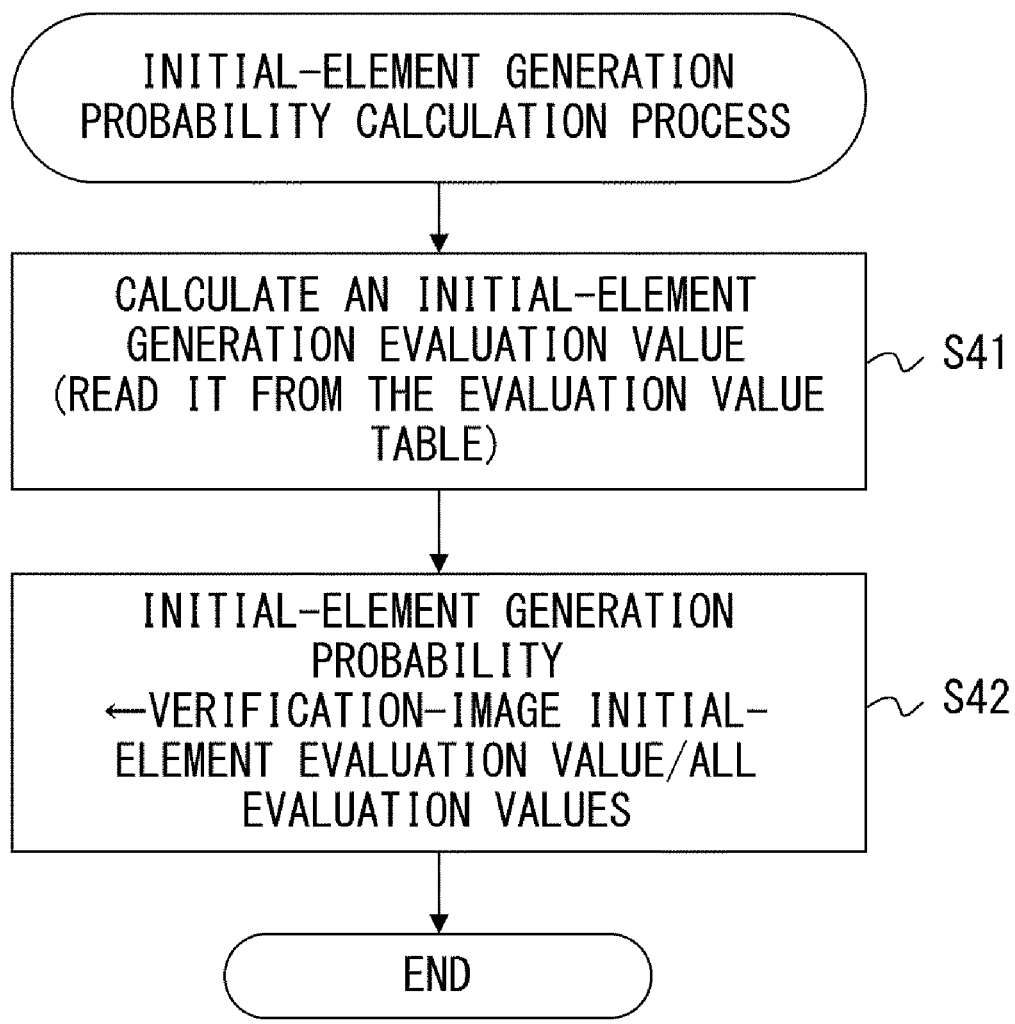

FIG. 6A is a detailed flowchart of the initial-element generation probability calculation process in step S32 illustrated in FIG. 5.

The evaluation values of respective initial-element candidates are read from the evaluation table (initial-element generation evaluation table) and an initial-element generation value is calculated (S41 in FIG. 6A). The initial-element generation evaluation table for obtaining an initial-element generation value (data for calculating the generation probability of an initial element) is in advance generated from a plurality of pieces of training data.

Then, the evaluation value of an initial-element candidate, obtained from the initial-element generation evaluation table is divided by the sum of the evaluation values of all initial-element candidates to calculate the initial-element generation probability of the initial element to be calculated (S42).

By the above processes in steps S41 and 42, the generation probability of an initial element in a predetermined generation area of a verification image can be calculated.

Next, FIG. 6B is a detailed flowchart of the initial-element generation reference point determination process in step S33 illustrated in FIG. 5.

The n-th power of a distance between an element (hereinafter called a "focused-on element" or a "focused-on element candidate" depending upon whether the element is already generated) and an already-generated element is calculated (S51 in FIG. 6B). The process in step S51 is applied to respective already-generated elements.

As the value of n above, an optimum value is determined in advance by the learning of training data. Assuming that already-generated elements virtually exist outside a generation area with a predetermined size, the respective n-th power of a distance between an already-generated element and a focused-on element are also calculated.

For example, it is assumed that the generation area of a verification image has a size of 5×5 pixels, as illustrated in FIG. 7. It is assumed that virtual already-generated elements (pixels "1" slashed in FIG. 7) exist outside the generation area and the n-th power of a distance between the virtual already-generated element and the focused-on element is calculated as a value indicating how easily an element is generated. Already-generated elements (enclosed with Δ in FIG. 7) generated at the same time as the focused-on element (enclosed with ○ in FIG. 7) and an element adjacent to the focused-on element (enclosed with ⊙ in FIG. 7) are not included in the distance calculation.

Then, the minimum value of the respective n-th power between the already-generated elements and the focused-on element is specified as easiness in element generation (S52).

The process in step S52 is based on a feature that a vein has a tendency to be easily generated in such a direction that it goes away from another vein.

Steps S51 and S52 are performed using each of the already-generated elements of which a reference point is not made yet as a focused-on element. And an already-generated element whose easiness is the maximum is determined as a generation reference point (S53).

FIG. 8A is a detailed flowchart of an element generation probability calculation process in step S34 of FIG. 5.

In FIG. 8A it is checked whether the number of generation element 0 through 3 can be possible, that is, what is the number of producible elements (S61).

In the determination of the number of generation elements of step S61, for example, it is determined which a vein is branched into, one adjacent point, two adjacent points, three adjacent points or whether the vein is a terminal end point. In this preferred embodiment, the evaluation values of four number of elements in a case where one adjacent point is generated, a case where two adjacent points are generated, a case where three adjacent points are generated and a case where no element is generated, are stored in the element number evaluation value table. The element number evaluation value table is generated from training data of a plurality of sets of a registration image and a collation image. The number of elements is not limited and it can be less or more than four.

Then, the evaluation value of the number of generation elements obtained from the element number evaluation value table is divided by the sum of the evaluation value of the corresponding number of producible elements so as to calculate generation element number probability data (S62).

Then, an element generation evaluation value calculation process in step S63 is performed. The element generation evaluation value calculation process in step S63 is applied to respective sets of element candidates of the number of elements.

Figure 8B:
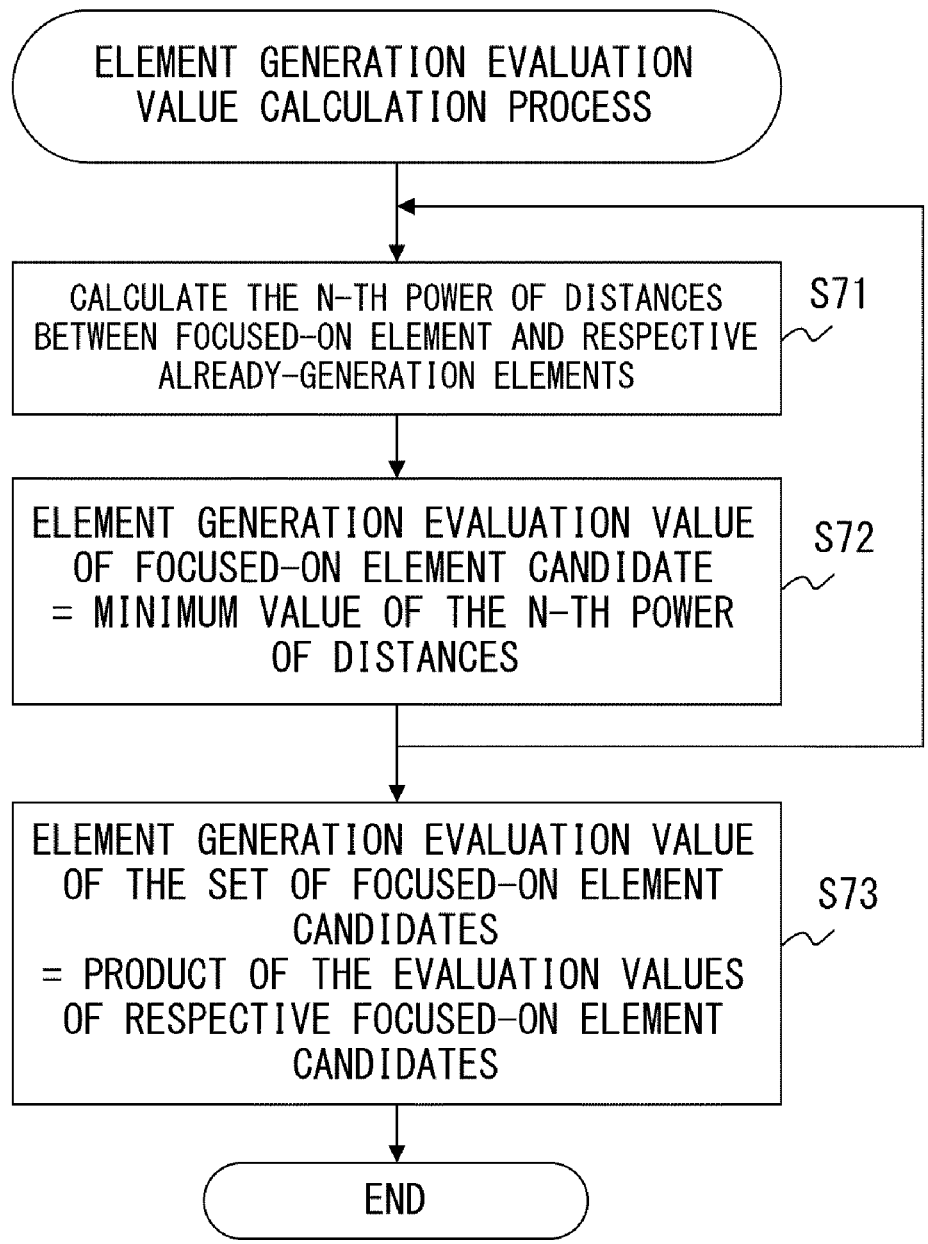

FIG. 8B is a detailed flowchart of an element generation evaluation value calculation process in step S63.

Firstly, the respective n-th power of a distance between the focused-on element candidate and respective already-generated elements is calculated (S71).

The minimum value of the respective n-th power of the distance, obtained by the calculation in step S71 is stored in memory or the like as the element generation evaluation value of the focused-on element candidate (S72).

A loop that returns to step S71 from step S72 illustrated in FIG. 8B indicates that the processes in steps S71 and S72 are applied to respective focused-on element candidates to be calculated.

After the calculation of the evaluation values of respective focused-on element candidates is completed, the process proceeds to step S73 and the product of the evaluation values of respective focused-on element candidates of the set of focused-on element candidates is calculated as the evaluation value of the sets of the focused-on element candidates.

After the element generation evaluation value calculation in step S63 of FIG. 8A is completed, the process proceeds to the process in step S64. In step S64, an element generation probability is calculated by taking a value obtained by dividing the evaluation value of the set of elements to be calculated of the verification image by the sum of all evaluation values of the sets of elements determined by the number of generation elements and multiplying this value by the generation element number probability. Specifically, (evaluation value of the set of elements to be calculated of the verification image/ sum of all evaluation values of the sets of elements determined by the number of generated number) ×generation element number probability is calculated as an element generation probability.

By the above processes in steps S61 through S64 and S71 through S73, the generation probability of the respective elements of a verification image of an authentication target can be calculated (step S36).

Here, the respective calculation methods of the initial-element generation probability and the element generation probability will be explained with reference to FIGS. 9 and 10.

Figure 9A:
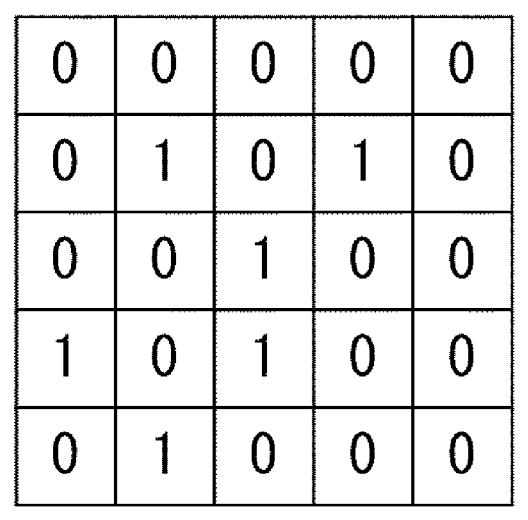

FIG. 9A explains one example of biometric information. FIG. 9A illustrates biometric information of 5×5 pixels. "1" and "0" indicate a pixel in which biometric information exists and a pixel in which biometric information does not exist, respectively. Tree-shaped biometric information indicates, for example, the pattern of veins in a palm.

Figure 9B:
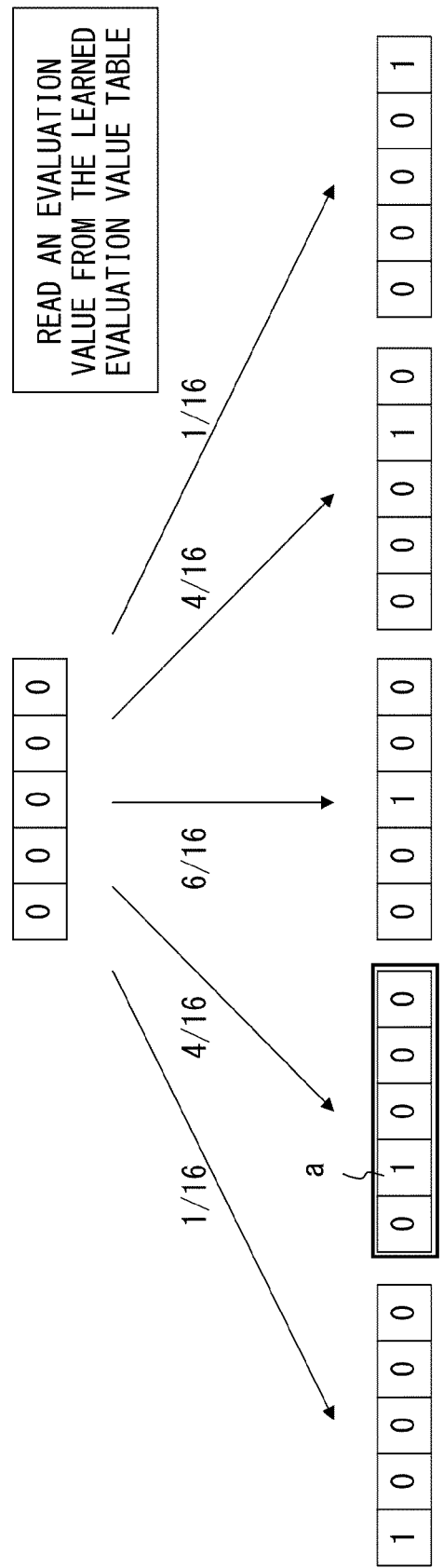

FIG. 9B explains an initial-element generation probability. The calculation of the initial-element generation probability of a verification image of the same 5×5 pixels as the tree-shaped biometric information illustrated in FIG. 9A will be explained below.

In this preferred embodiment, data indicating the generation probability of an initial element (for example, an initial-element generation evaluation value) is calculated by learning using training data composed of sets of a registration image and a verification image and the obtained data is stored in a storage device, such as memory or the like, as an initial-element evaluation value table.

The example illustrated in FIG. 9B illustrates a case where the evaluation value of an element at the left end (the first element from the left end) is "1", the evaluation value of the second element from the left end is "4" and the evaluation value of the third element from the left end is "6". Further, the evaluation value of the fourth element from the left end is "4", and an element at the right end is "1".

After the evaluation values of respective initial-element candidates are obtained, in the process of step S42 illustrated in FIG. 6, an initial-element generation probability can be calculated on the basis of the evaluation values of the respective initial-element candidates and the sum of all the evaluation values.

In this example, since the sum of all the evaluation values is "16", the initial-element generation probabilities of the element at the left end (the first element from the left end) is $1/16$, the second element from the left end is $4/16$. And the third element from the left end is $6/16$, the evaluation value of the fourth element from the left end is $4/16$, and an element at the right end is $1/16$. When an element "a" is selected as an initial element, its initial-element generation probability is "$4/16$".

Figure 10:
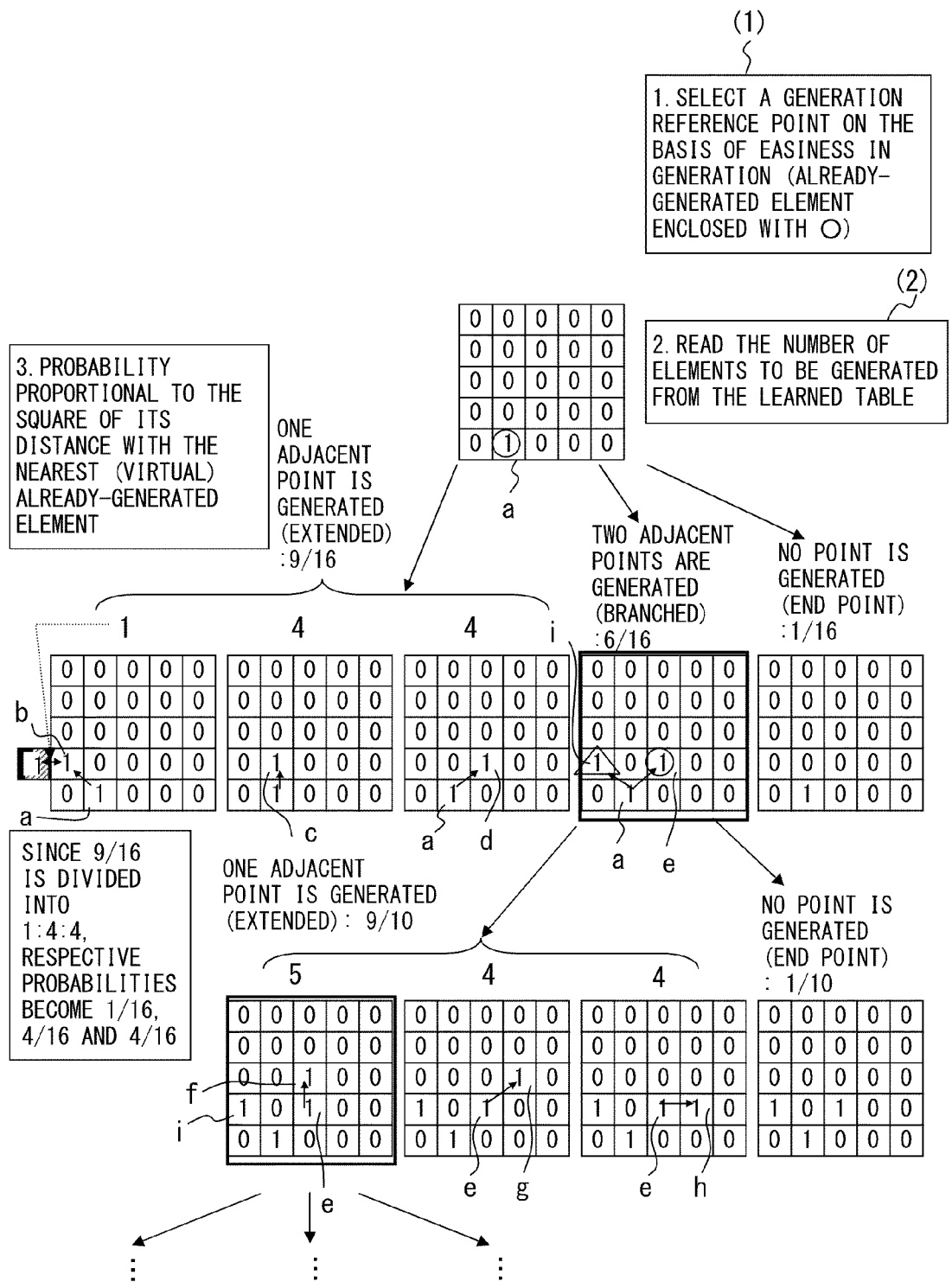
FIG. 10 explains an element generation probability calculation.

Next, FIG. 10 explains a general element generation probability calculation. FIG. 10 illustrates the position of an element generated following the generation reference point and its generation probability. FIG. 10 is an example of a bit map of 5×5 pixels and a position in the upper left corner is specified as the origin (0, 0) (indicating the x and y coordinates).

It is assumed that an element a enclosed with ○ at the coordinates (1, 4) illustrated in FIG. 10 is selected as a generation reference point ((1) FIG. 10) by the element generation reference point determination process illustrated in FIG. 6B.

As the initial-element generation probability of the generation reference point a, "$4/16$" is obtained from the evaluation value "4" obtained from the initial-element evaluation value table and the sum of all the evaluation values "16".

Then, the number of elements producible at the generation reference point "a" is read from the element number evaluation value table stored in memory or the like ((2) in FIG. 10). In the example illustrated in FIG. 10, the element number evaluation value table stores "9" as the evaluation value of the number of elements in cases where one adjacent point is generated, "6" as the evaluation value of the number of elements in cases where two adjacent points are generated and "1" as the evaluation value of the number of elements in cases where no adjacent points are generated.

The evaluation value in the case where one adjacent point, two adjacent points and the like are generated is not limited to a single value. For example, when the branch probability of an element obtained by the learning of training data differs depending on its position, the element number evaluation value table can also store a different evaluation value depending on its position.

In the example illustrated in FIG. 10, the value of the n-th power in the case of calculating a distance between a focused-on element and an already-generated element is set to "2" in the element generation evaluation value calculation process illustrated in FIG. 8B. An optimal value can be determined as the value of n by learning using training data.

"9", "6" and "1" are obtained as the evaluation values from the element number evaluation value table in cases where one adjacent point is generated, where two adjacent points are generated and where no adjacent point is generated, respectively. In this case, the sum of the respective evaluation values of the corresponding number of producible elements becomes "16".

Therefore, as the generation element number probabilities in the cases where one adjacent point is generated, where two adjacent points are generated and where no adjacent point is generated, from the generation reference point a (1, 4), "$9/16$", "$6/16$" and "$1/16$" are respectively obtained by the process in step S62 of FIG. 8A.

In regard to a focused-on element b (0, 3) to the upper left of the generation reference point a (1, 4), the minimum value of the square of its distance with a virtual already-generated element at the outer circumference is "1". This value "1" is the element generation evaluation value of the focused-on element b.

In regard to a focused-on element c(1, 3) one pixel above the generation reference point a, the distance with a virtual already-generated element at the outer circumference is two pixels and the square of the distance is "$2^2=4$". This is the minimum value of the distance between the focused-on element c and the already-generated element. In this case, the element generation evaluation value of the focused-on element c is "4". Since the generation reference point "a" is adjacent to the focused-on element c, the generation reference point "a" is excluded from the calculation target.

In regard to a focused-on element d(2, 3) to the upper right of the generation reference point a, the square of its distance with a virtual already-generated element at the outer circumference is "4" and this is the minimum value. Therefore, the element generation evaluation value of the focused-on element is "4". In this case, since the generation reference point "a" is adjacent to the focused-on element d, the generation reference point "a" is excluded from the calculation target.

As the element generation probability in the case where one adjacent point is generated, "$9/16$" is obtained by the above-described process. The generation probability of the set of one adjacent point and a focused-on element can be obtained by dividing the evaluation value of the focused-on element by the sum of all the evaluation values of the focused-on element.

Since a generation probability ratio among the focused-on elements b, c and d is 1:4:4, the element generation probabilities of the focused-on elements b, c and d are "1/16", "4/16" and "4/16", respectively.

Next, an element generation probability in the following stage in the case where two adjacent points are selected will be explained with reference to biometric information in the second and third stages illustrated in FIG. 10.

Firstly, a generation reference point is determined. Since in regard to an element i, the distance to the virtual generation element at the outer circumference is one pixel, the ease of element generation is "1". Since, in regard to an element e, the distance to a virtual generation element at the outer circumference is two pixels, the ease of element generation is "4". In this case, since the already-generated element "a" is adjacent to the focused-on element "e", the already-generated element "a" is excluded from the calculation target. Therefore, the element e which is most easily produced is selected as the generation reference point.

In this case, in regard to the element e it is assumed that either a case where one adjacent point is generated or a case where no elements are generated can be selected as the number of elements. In this case, since the number of selectable elements is of one of these two cases, the sum of the evaluation value number of producible elements becomes "9+1=10".

The square of a distance between a focused-on element candidate "f" one pixel above the element "e" and the already-generated element "i" is "$1+2^2=5$". Since this is the minimum value of the square of the distance, the element generation evaluation value of the focused-on element candidate f is "5".

The square of a distance between a focused-on element candidate g to the upper right of the element e and the virtual already-generated element at the outer circumference is "4". Since this is the minimum value of the square of the distance, the element generation evaluation value of the focused-on element candidate g is "4".

The square of a distance between a focused-on element candidate h one pixel in the right side the reference point element e and the virtual already-generated element at the outer circumference is "4". Since this is the minimum value of the square of the distance, the element generation evaluation value of the focused-on element candidate h is "4".

In this case, "9/10" is obtained as the element number generation probability of one adjacent point, "5" is obtained as the element generation evaluation value of the focused-on element candidate f and "13" is obtained as the sum of the element generation evaluation values. Therefore, the element generation probability of the focused-on element candidate f is "(9/10)·(5/13)".

In the example illustrated in FIG. 10, the element generation probability of the initial element "a" is 4/16, the element generation probability of two adjacent points is 6/16 and the element generation probability of the element f is (9/10)·(5/13). Therefore, the generation probability $P_Y(y)$ of a verification image including these elements can be expressed as $P_Y(y)=$ (4/16)·(6/16)·(9/10)·(5/13) . . . Thus, the process using elements "a" and "e" as reference points is completed.

By performing the above-described processes using the respective elements of a verification image as the reference points and calculating the product of the element generation probabilities of the respective elements, a verification-image generation probability can be calculated.

Figure 12:
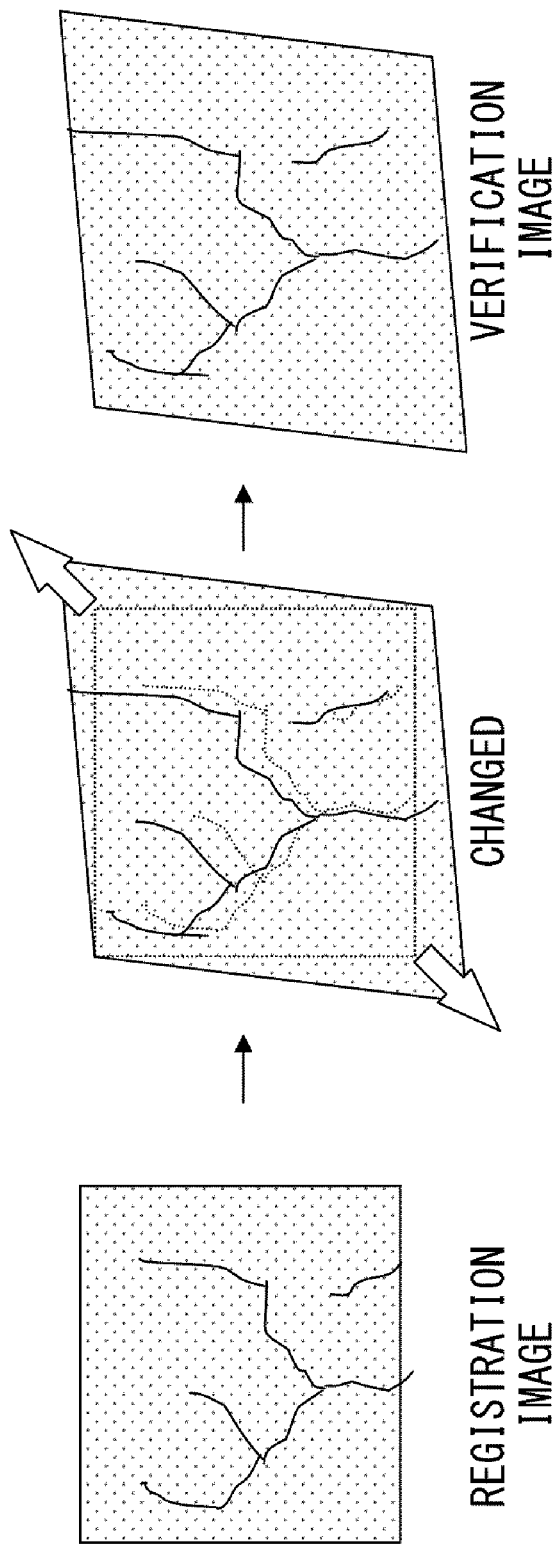
FIG. 12 explains a change probability (No. 2).

Next, the calculation method of the change probability of a verification image will be explained. FIGS. 11 and 12 explain a change probability.

Respective areas illustrated in FIG. 11 illustrate probabilities that a verification image can be obtained when a registration image is changed by a change probability. A blackened area in the center indicates an area in which a verification image can be obtained with the highest probability, a diagonally hatched area outside the blackened area indicates an area in which the verification image can be obtained with the second highest probability, and a vertically hatched area outside the diagonally hatched area indicates area in which the verification image can be obtained with the third highest probability. Since verification and registration images to be paired have a high similarity, a change probability can be calculated on the basis of verification and registration images. FIG. 12 illustrates a verification image obtained when some transformation is applied to the entire registration image.

Figure 13:
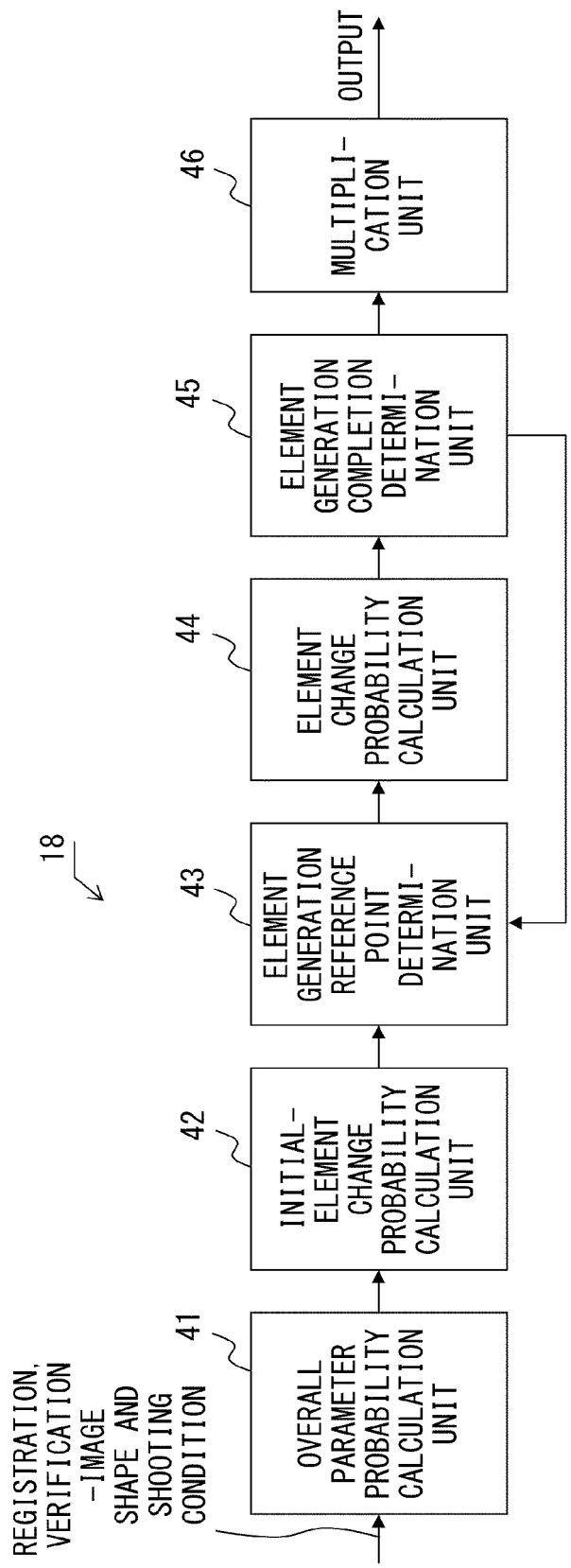
FIG. 13 is a configuration of a change probability calculation unit in the first preferred embodiment.

FIG. 13 is a configuration of a change probability calculation unit 18 in the first preferred embodiment.

The change probability calculation unit 18 includes an overall parameter probability calculation unit 41, an initial-element change probability calculation unit 42, an element generation reference point determination unit 43, an element change probability calculation unit 44, an element generation completion determination unit 45 and a multiplication unit 46.

Figure 14:
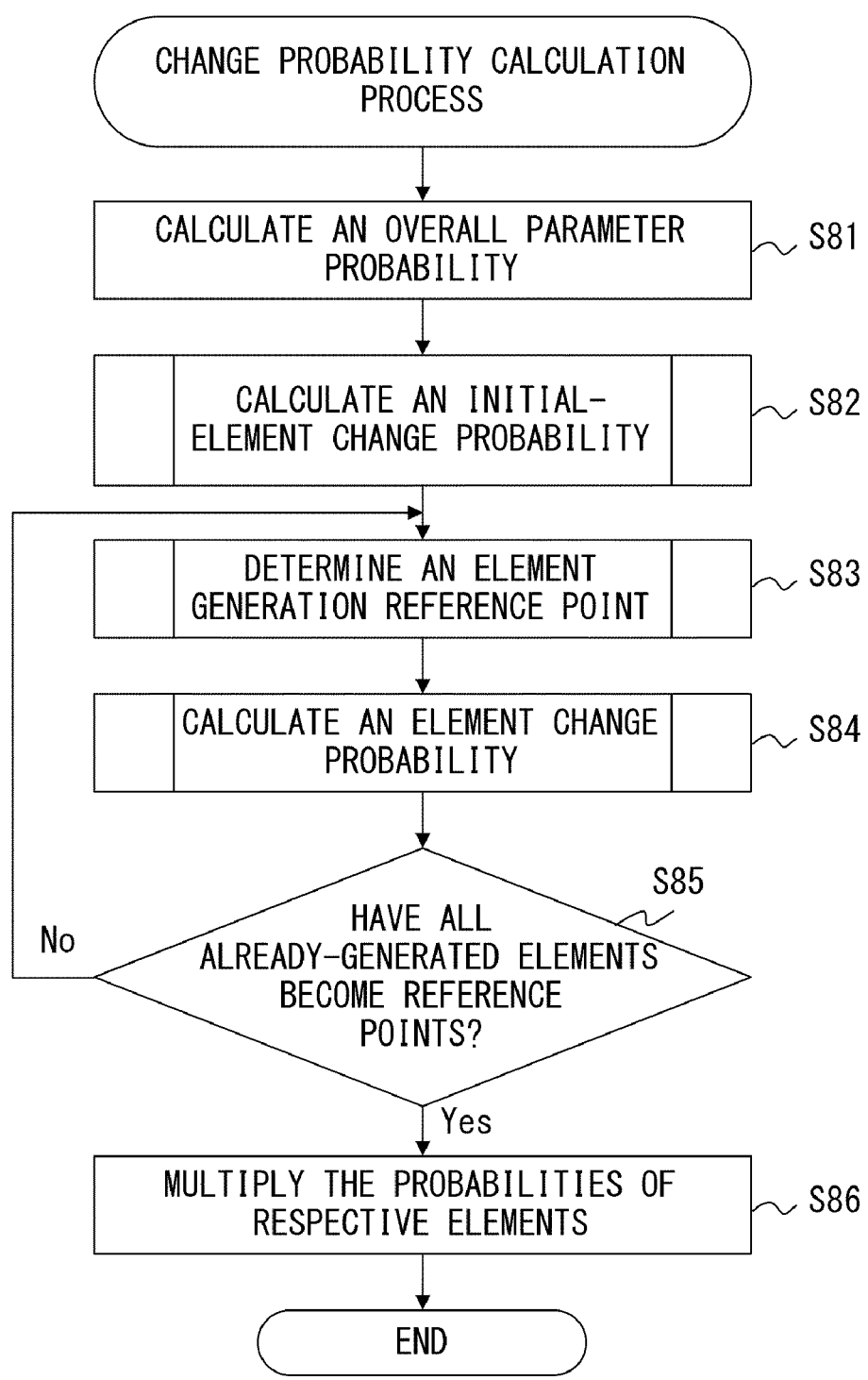
FIG. 14 is a flowchart of a change probability calculation process in the first preferred embodiment.

FIG. 14 is a flowchart of the change probability calculation unit 18 in the first preferred embodiment.

In step S81, the overall parameter probability calculation unit 41 calculates the probabilities of parameters used to calculate a change probability model. A registration image, a verification image and data, such as a shape and shooting condition and the like are inputted to the overall parameter probability calculation unit 41.

In step S82, the initial-element change probability calculation unit 42 calculates the change probabilities of the initial elements of registration and verification images.

In step S83, the element generation reference point determination unit 43 calculates the ease of element generation and determines a reference point element. The process in step S83 is the same as the element generation reference point determination process illustrated in FIG. 6B. More specifically, the element generation reference point determination unit 43 calculates the minimum value of the n-th power of a distance as ease of element generation and determines an already-generated element whose easiness in element generation is the maximum as a generation reference point.

In step S84, the element change probability calculation unit 44 calculates the element change probabilities of respective elements.

In step S85, the element generation completion determination unit 45 determines whether all already-generated elements become reference points. When there is an already-generated element that has not become a reference point (NO in step S85), the process returns to the element generation reference point determination process in step S83.

When all the already-generated elements have become reference points (YES in step S85), the process proceeds to step S86. In step S86, the multiplication unit 46 calculates the product of the element change probabilities of respective elements.

Figure 15:
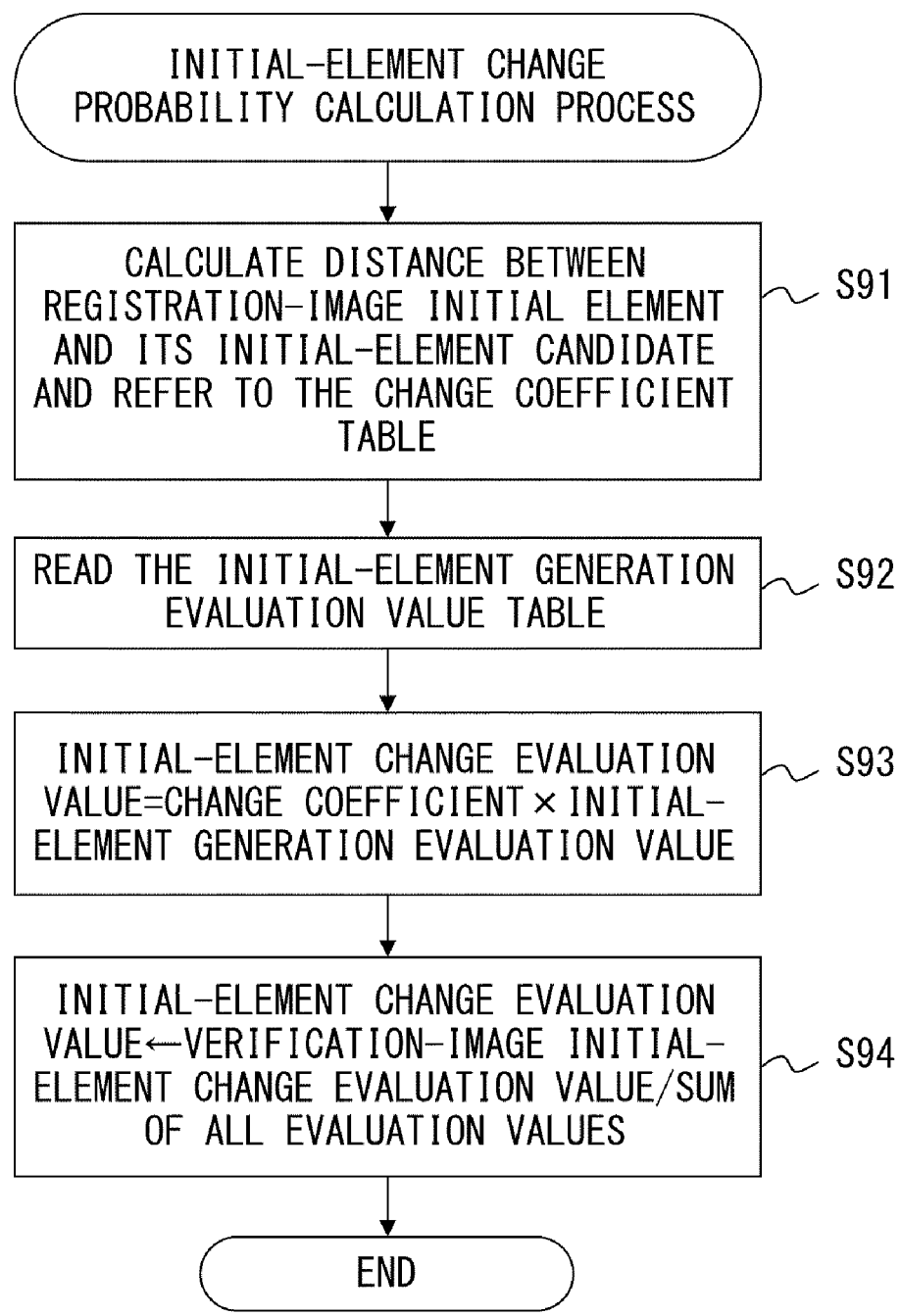
FIG. 15 is a flowchart of an initial-element change probability calculation process.

FIG. 15 is a detailed flowchart of an initial element change probability calculation process in step S82 illustrated in FIG. 14.

The initial element of the registration image of a specific authentication target and the distance between the initial elements of a verification image are calculated and change coefficient data corresponding to calculated distances are obtained with reference to the change co-efficient table (FIG. 16B) (S91).

Figure 16:
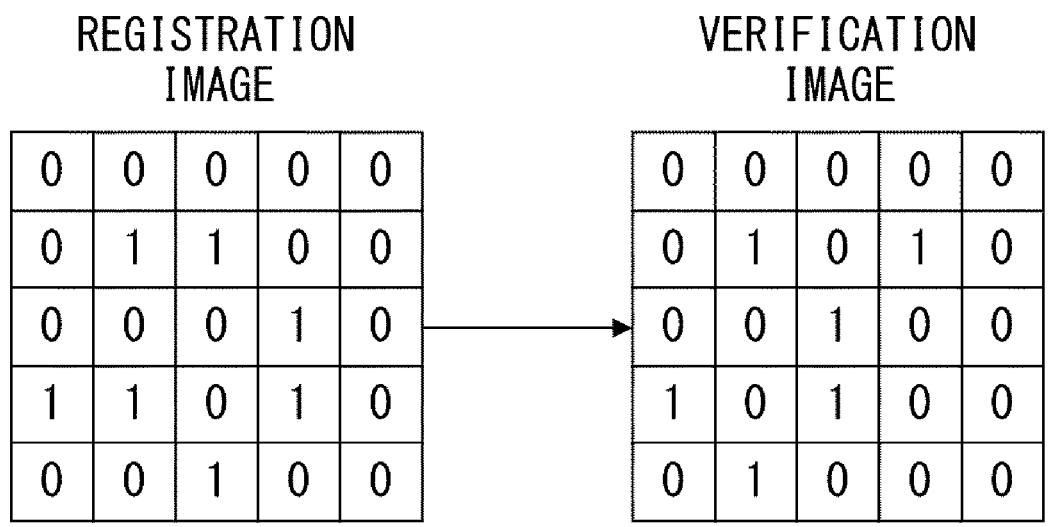
FIGS. 16A and 16B illustrate the change of a registration image and a change co-efficient table, respectively.

FIG. 16A illustrates the bit-map data of 5×5 of the registration and verification images, and FIG. 16B illustrates one example of the change co-efficient table 51.

The distances between the registration and verification images can be calculated on the basis of distances between elements whose biometric information is "1".

The change coefficients are stored in the change coefficient table 51 in relations to the distances. For example, when the distance is "0", the change coefficient is "4". When the distance is "1", the change coefficient is "2". The longer is a distance between registration and verification images, the smaller becomes a change coefficient.

Back to FIG. 15, in step S92, the evaluation value of the initial-element candidate is read from the initial-element evaluation value table. The process in step S92 is the same as the process in step S41 illustrated in FIG. 6.

Then, an initial-element change evaluation value is calculated by multiplying the initial-element evaluation value obtained in step S92 by the change coefficient obtained in step S91 (S93).

The above processes in steps S91 through S93 are applied to all the initial-element candidates. After the calculation of the change evaluation values of the initial-element candidates is completed, the process proceeds to step S94 and an initial-element change probability is calculated by dividing the initial-element change evaluation value of the verification image by the sum of all the initial-element change evaluation values.

Figure 17:
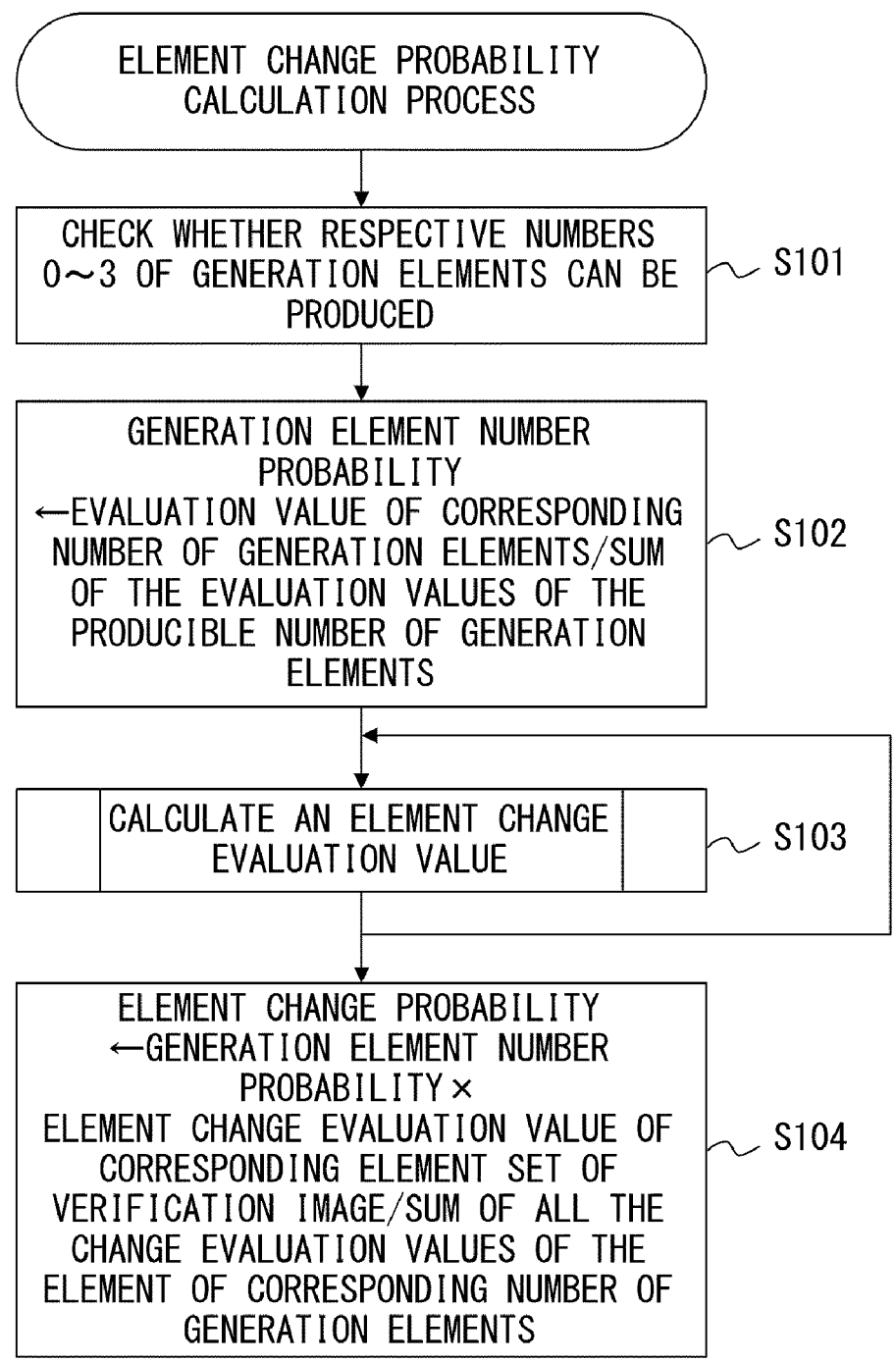
FIG. 17 is a flowchart of an element change probability calculation process.

FIG. 17 is a detailed flowchart of an element change probability calculation process in step S84 illustrated in FIG. 14.

After the generation reference point is determined, it is checked whether the respective numbers 0 through 3 of generation elements is possible (101). In this preferred embodiment, four cases of the respective number of elements 0 through 3 are made possible. The number of producible elements of a generation reference point can be determined in advance determined according to the position of a reference point, the learning result of training data or the like.

Then, the evaluation value of the number of producible elements is read from the element number evaluation value table stored in memory or the like and a generation element number probability is calculated by dividing the evaluation value of the corresponding number of generation elements by the sum of the evaluation values of the number of producible elements (S102). For example, four of the element number evaluation values in cases where one adjacent point is generated, where two adjacent points are generated, where three adjacent points are generated and where no points are generated are stored in the element number evaluation value table.

Then, an element change evaluation value calculation process in step S103 is performed. The process in step S103 is applied to respective sets of element candidates of the corresponding number of elements.

Figure 18:
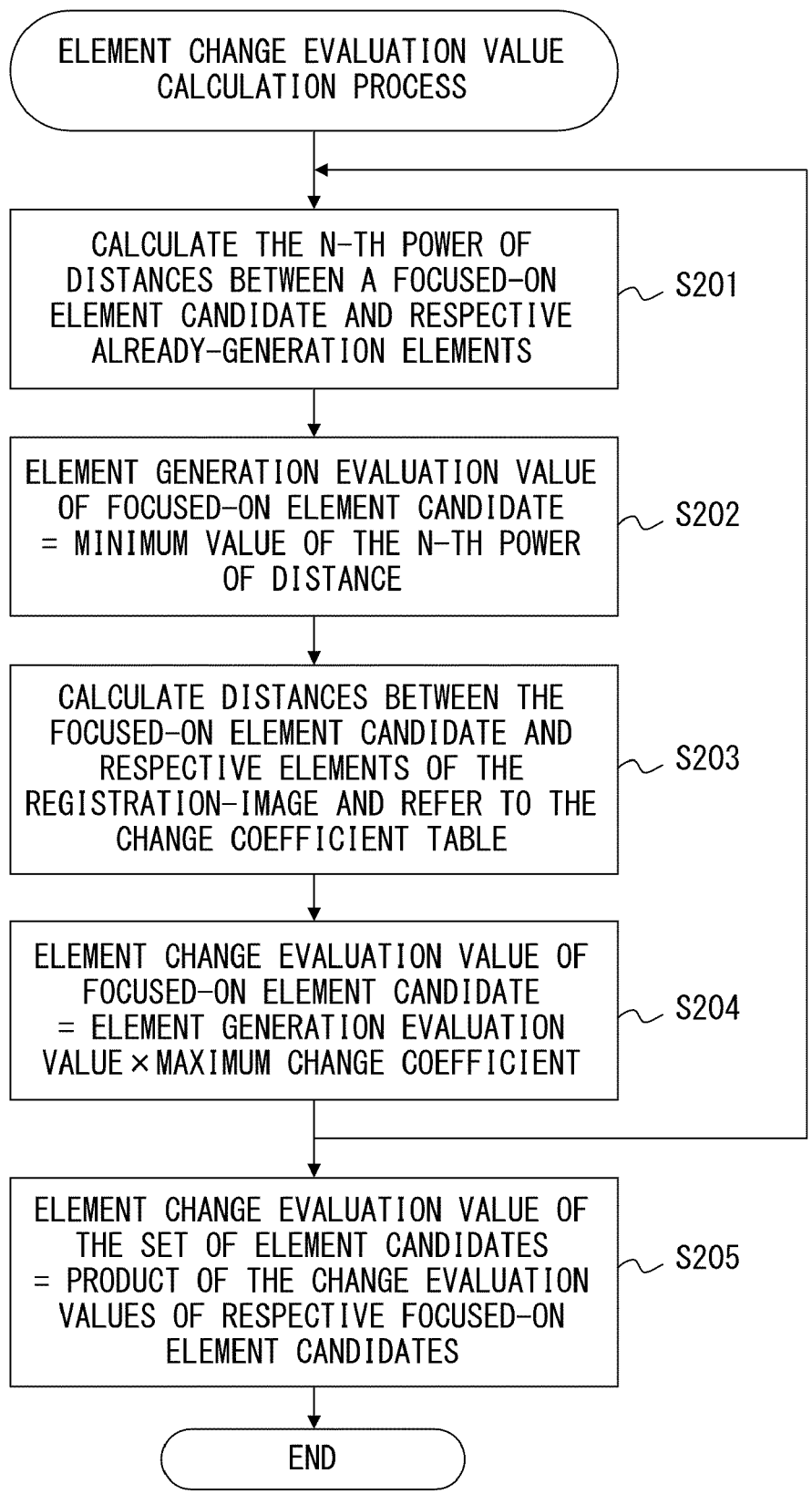
FIG. 18 is a flowchart of an element change evaluation value calculation process.

FIG. 18 is a detailed flowchart of the element change evaluation value calculation process in step S103 illustrated in FIG. 17.

Firstly, the n-th power of a distance between a focused-on element candidate to be calculated and an already-generated element is calculated (S201).

It is assumed that in the element change evaluation value calculation process too, there are virtual already-generated elements outside the generation area as in the earlier-described element generation probability calculation process. Then, these virtual already-generated elements are included in the distance calculation target. Already-generated elements adjacent to a focused-on element candidate are not included in the distance calculation target.

Then, the minimum value of the n-th power of the distance is obtained by the calculation as the element generation evaluation value of the focused-on element candidate and is stored in memory or the like (S202).

Then, a distance between the focused-on element candidate and respective elements of the registration image is calculated and the change co-efficient of the corresponding distance is obtained from the change co-efficient table 51 (S203).

Then, the element change evaluation value of the focused-on element candidate is calculated by multiplying the element generation evaluation value obtained in step S202 by the maximum value of the change coefficient obtained in step S203 (S204).

The above processes in steps S201 through S204 are repeatedly applied to respective producible focused-on element candidates.

After the calculation of the element change evaluation values of the focused-on element candidates is completed, the process proceeds to step S205. In step S205, the product of the element change evaluation values of the respective focused-on element candidates is calculated to calculate the element change evaluation value of the sets of the focused-on element candidates.

After the element change evaluation value calculation in step S103 illustrated in FIG. 17 is completed, then, an element change probability is calculated in step S104. In step S104, the element change probability is calculated using (generation element number probability)×(element change evaluation value of set of corresponding elements of verification image)/(sum of all change evaluation values of elements of number of generation elements).

Figure 19:
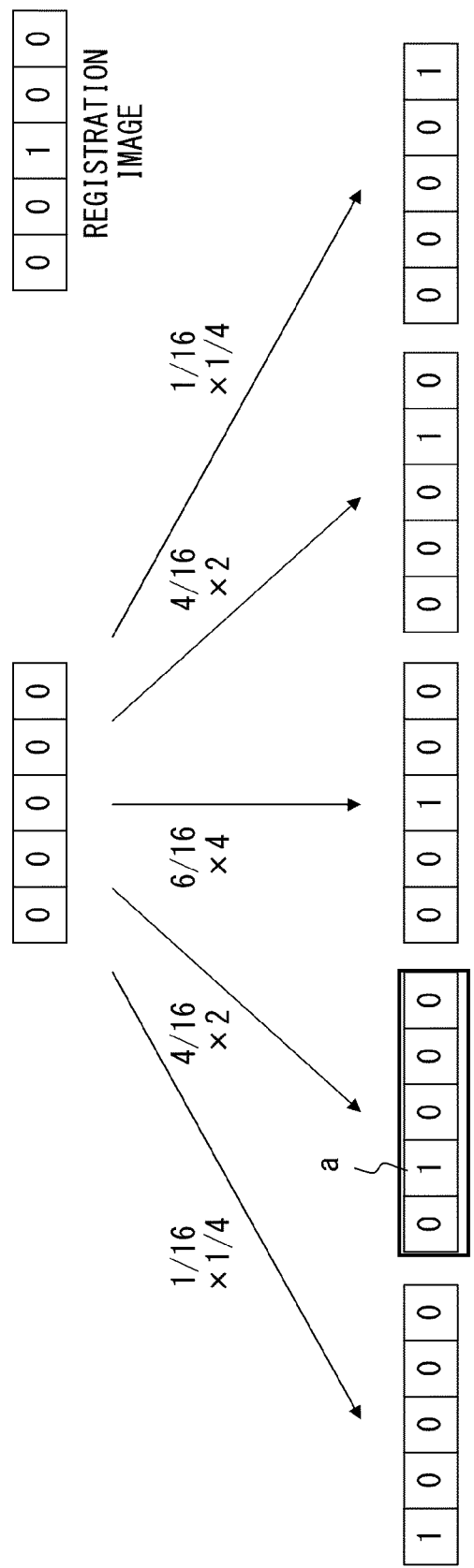
FIG. 19 explains the change probability calculation of initial elements.

Next, one example of the above-described change probability calculation of an element will be explained with reference to FIG. 19. FIG. 19 explains the change probability calculation of initial elements.

Firstly, a distance between corresponding elements of the registration and verification images is calculated and a change coefficient corresponding to the square of the distance is obtained from the change coefficient table 51 (FIG. 16B). By this distance calculation, "2" is obtained as the change coefficient of the initial-element candidate "a" second from the left in FIG. 19.

Then, the evaluation value of the initial-element candidate is read from the initial-element evaluation value table. The example illustrated in FIG. 19 illustrates a case where the evaluation value of an element at the left end of the initial area is "1", the evaluation value of the second element "a" from the left is "4", the evaluation value of the third element from the left is "6", the evaluation value of the fourth element from the left is "4" and the evaluation value of an element at the right end is "1".

After the change coefficients of respective initial-element candidates and the initial-element generation evaluation value are obtained, an initial-element change evaluation value is calculated by multiplying them.

Next, initial element change probability is obtained by dividing initial element change evaluation value of the element to be calculated, by sum of initial element change evaluation value of all initial element candidates.

In the example illustrated in FIG. 19, the element evaluation value of the initial element "a" is "4", the sum of evaluation values of the initial-element candidates is "16" and the change coefficient is "2". Therefore, for example, the element change probability $P_a$ of the initial element "a" becomes $P_a=(4/16)\times 2/\{(1/16)\times(1/4)+(4/16)\times 2+(6/16)\times 4+(4/16)\times 2+(1/16)\times(1/4)\}$.

Figure 20:
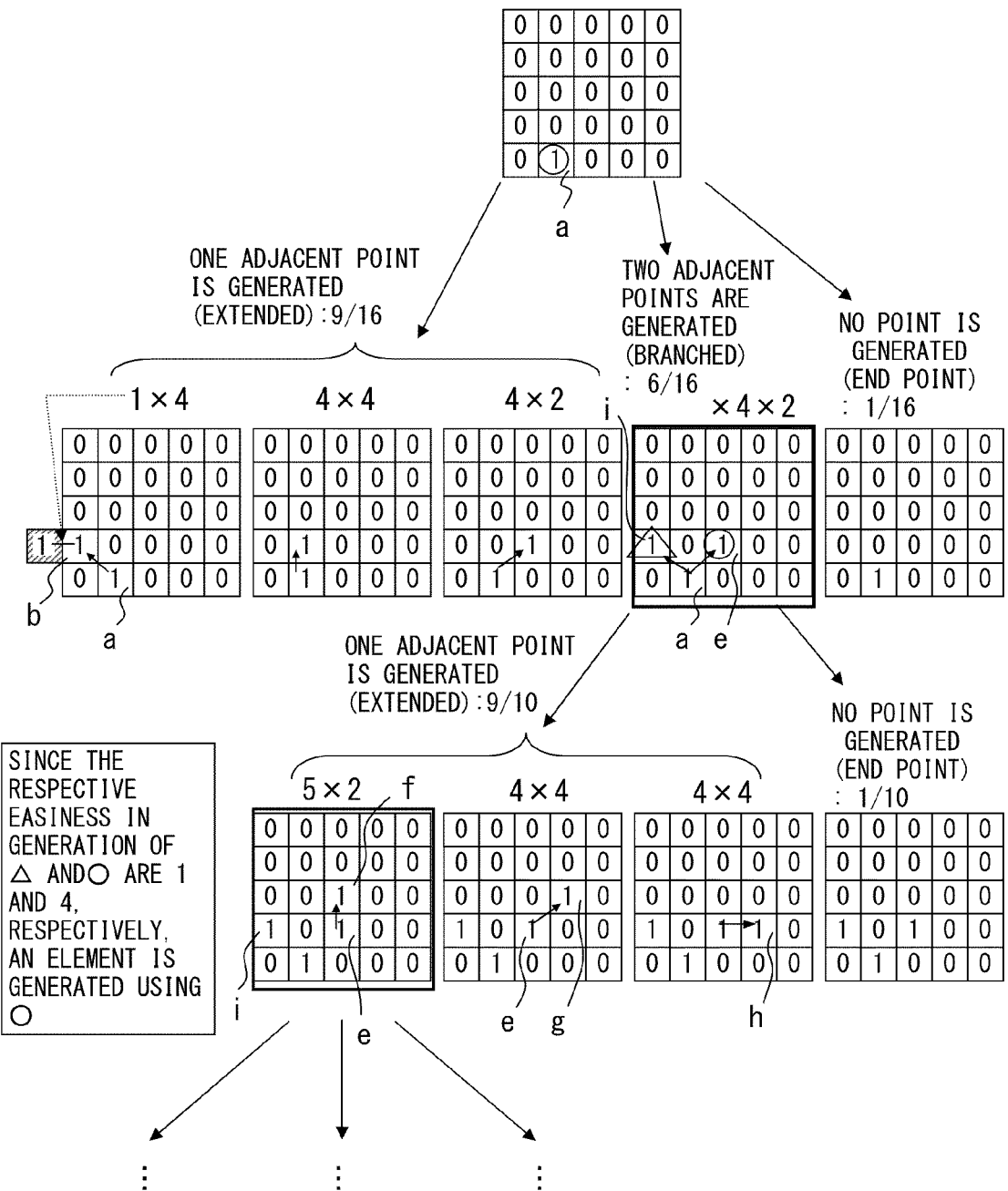
FIG. 20 explains the change probability calculation of general elements.

FIG. 20 explains the change probability calculation of initial elements. FIG. 20 illustrates the position of an element generated following the generation reference point and its generation probability. FIG. 10 is an example of a bit map of 5×5 pixels and a position in the upper left corner is specified as the origin (0, 0). FIG. 20 illustrates that evaluation values in three cases of an element number of where one adjacent point is generated, where two adjacent points are generated and where no elements are generated are stored in the element number evaluation value table.

The calculation method of a change probability in a case where the element a(1, 4) of a 5×5 image in the first stage illustrated in FIG. 20 is determined as a generation reference point will be explained below.

When the evaluation value of the number of generation elements are read from the element number evaluation value table, "9" is obtained as the evaluation value of the number of elements in cases where one adjacent point is generated, "6" is obtained in cases where two adjacent points are generated and "1" is obtained in cases where no elements are generated. In this case, the sum of the evaluation values is "16". Therefore, the generation element number probability in the case where two adjacent points are generated is "6/16".

Then, the square (in the case of n=2) of a distance between a focused-on element candidate to be calculated and the already-generated element is calculated and the minimum value of the square of the distance is determined for an element generation evaluation value (processes in steps S201 and S202 of FIG. 18).

Then, a distance between the focused-on element candidate and the element of the registration image is calculated, a change coefficient corresponding to the distance is obtained and an element change evaluation value is calculated (processes in steps S203 and S204 of FIG. 18).

In regard to the focused-on element b of an image in the second stage illustrated in FIG. 20, since the square of the distance to the already-generated element is "1" and "4" can be obtained as the change coefficient from the change coefficient table 51, the element change evaluation value is "1×4".

Since "6" can be obtained as the evaluation value of the number of elements of focused-on element candidates "e" and "i" from the element number evaluation value table in the case where two adjacent points are generated, the generation element number probability is "6/16". As their change coefficients, "4" and "2" are respectively obtained from the calculation results of their distances to the elements of the registration image and the change coefficient table 51.

Therefore, the element change probability of the set of the focused-on element candidates in the case where two adjacent points are generated is "(6/16)×(4×2)/(4×2)".

By applying the above-described processes in steps S81 through S86 to the respective elements of the verification image, the change probability $P_{Y|X}(y|x)$ of the verification image can be calculated.

By performing the above-described verification image generation probability calculation, change probability calculation and the like, a verification image generation probability $P_Y(y)$ and a change probability $P_{Y|X}(y|x)$ can be obtained. Then, by calculating the degree of dissimilarity by dividing the verification image generation probability $P_Y(y)$ by the change probability $P_{Y|X}(y|x)$ and comparing the degree of dissimilarity with an authentication threshold, it can be determined whether the verification image belongs to an identical person.

A verification-image generation probability model and a change probability model which are used to calculate the above-described verification-image generation probability and change probability can be approached to the amount of features of the measured biometric information by changing the values of parameters.

As parameters for the verification-image generation probability model, there are an initial-element generation probability distribution, a general element generation probability distribution and a function to search for a place in which an element can be easily produced (for example, the square of the distance to the already-generated element). In addition to the above, there are the parameters of the change coefficient that are parameters for the change probability model (for example, a Gaussian's standard deviation) and the like.

As the learning method for approaching the parameters the amount of features of biometric information, there are the following two methods.

In the first method, a measured amount of features is assigned to the parameter. For example, the frequency distribution of measured initial-element generation position is used for the distribution of the generation position of an initial-element probability distribution.

In the second method, when a parameter does not directly express the amount of features, many images are virtually generated by variously changing the parameter, the amount of features of this virtual image is compared with the measured amount of features and a parameter closest to a certain standard (for example, the least square criterion) is adopted. In another method, a generation probability is used as the amount of features and the value of a parameter in which the generation probability of a measured image becomes closest to the appearance frequency of training data is adopted.

Figure 21:
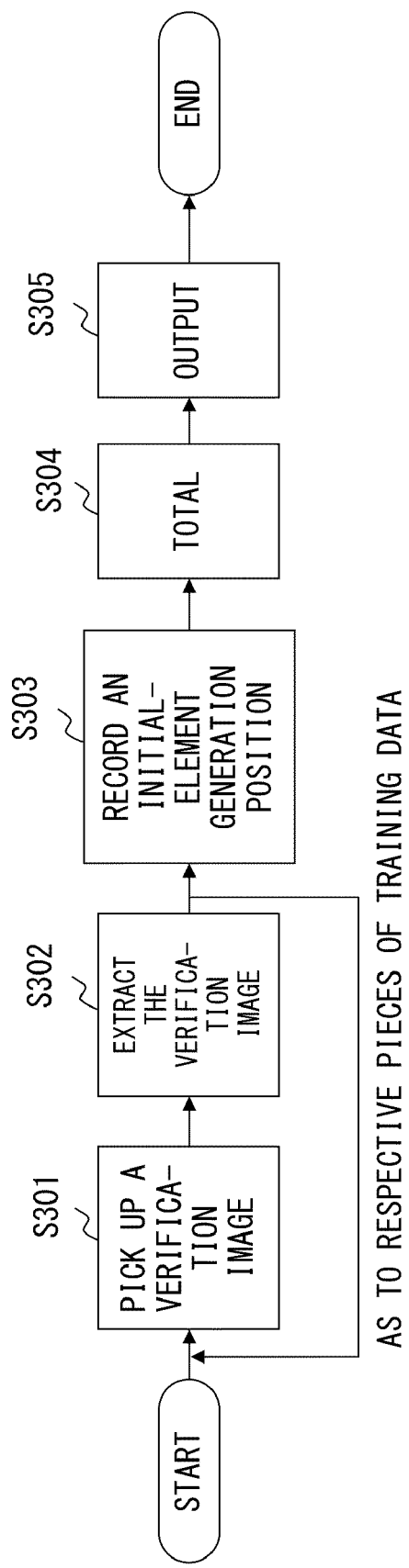
FIG. 21 is a flowchart of the learning process of the frequency distribution of initial-element generation positions.

FIG. 21 is a flowchart of the learning process of the frequency distribution of the initial-element generation positions of a verification image.

A plurality of verification images are picked up (S301) and biometric information is extracted from the respective verification images (S302).

The initial-element generation positions of the extracted biometric information are stored in a storage device (S303). The frequencies of the initial-element generation positions of the respective verification images are totaled (S304). The frequency distribution of the initial-element generation positions is output (S305).

The above-described first preferred embodiment performs biometric authentication by calculating a verification-image generation probability using a verification-image generation probability model, calculating a change probability using a change probability model, calculating the degree of dissimilarity on the basis of their ratios and comparing the degree of dissimilarity with an authentication threshold. According to the first preferred embodiment, high authentication accuracy can be obtained using a fairly small amount of data. This is because a verification-image generation probability and a change probability can be obtained by dividing a plurality of registration and verification images into a plurality of elements and storing data used to calculate the generation probability of an element and the like. Thus, the amount of data stored in a storage device can be reduced.

The data used to calculate the generation probability of an element is, for example, data indicating the generation probability of an initial-element (initial-element generation evaluation value and the like), data indicating the branch probability of an element (generation element number evaluation value and the like) and the like. Authentication by using a little data is realized by calculating the element generation probability and change probability of a verification image using these pieces of data.

Data stored in a storage device in order to perform authentication using a probability model is not limited to data, such as an initial-element generation evaluation value, a generation element number evaluation value and the like and another piece of data can also be used. For example, branch probability data, element generation probability data and the like can also be stored in a storage device and a verification-image generation probability, a change probability and the like can also be calculated using these pieces of probability data. This also applies to other preferred embodiments described below.

Furthermore, according to the first preferred embodiment, authentication does not depend excessively on collected data. This is because even if a portion of the data is lost, the lost portion can be complemented by calculating a verification-image generation probability calculating the generation probability of an element.

Since it is not necessary to finely adjust each piece of data in order to improve authentication accuracy, the man-hours of work required to be performed up to the time when an authentication program and the like is completed can be reduced.

Furthermore, since authentication accuracy can be checked in advance by generating virtual registration and verification images using a probability model and repeating authentication, it becomes easy to verify authentication accuracy.

[2] Second Embodiment

Next, the second preferred embodiment will be explained. The second preferred embodiment virtually generates a registration image using a registration-image generation probability model, calculates a registration-image generation probability and further calculates a verification-image generation probability on the basis of the registration-image generation probability. The second preferred embodiment also calculates a change probability using a change probability model. Then, the second preferred embodiment calculates the degree of dissimilarity on the basis of the verification-image generation probability and the change probability and authenticates a living body.

Figure 22:
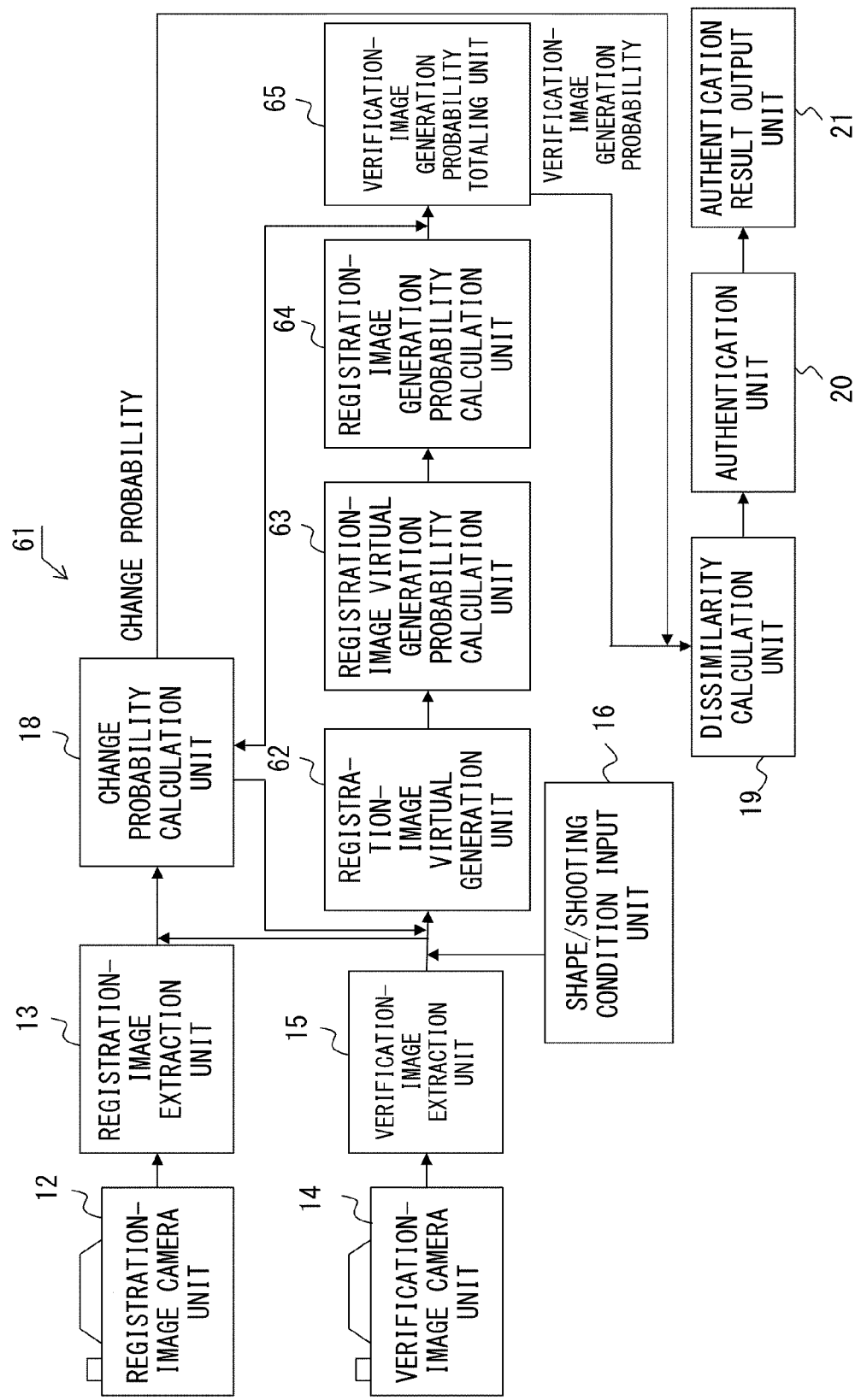
FIG. 22 is a configuration of a biometric authentication device in the second preferred embodiment.

FIG. 22 is a configuration of a biometric authentication device 61 in the second preferred embodiment. The operation of the biometric authentication device 61 illustrated in FIG. 22 will be explained with reference to a flowchart illustrated in FIG. 23. In FIG. 22, the same reference numerals are attached to the same functional blocks as those in the biometric authentication device 11 in FIG. 1 and their explanations are omitted. In the flowchart illustrated in FIG. 23, the same step numbers are attached to the same processes as those in the flowchart illustrated in FIG. 2 and their explanations are omitted.

The functions of a registration-image camera unit 12, a registration-image extraction unit 13, a verification image camera unit 14, a verification-image extraction unit 15 and a shape and shooting condition input unit 16, all of which are illustrated in FIG. 22 are the same as those of the blocks with the same reference numerals illustrated in FIG. 1.

Figure 23:
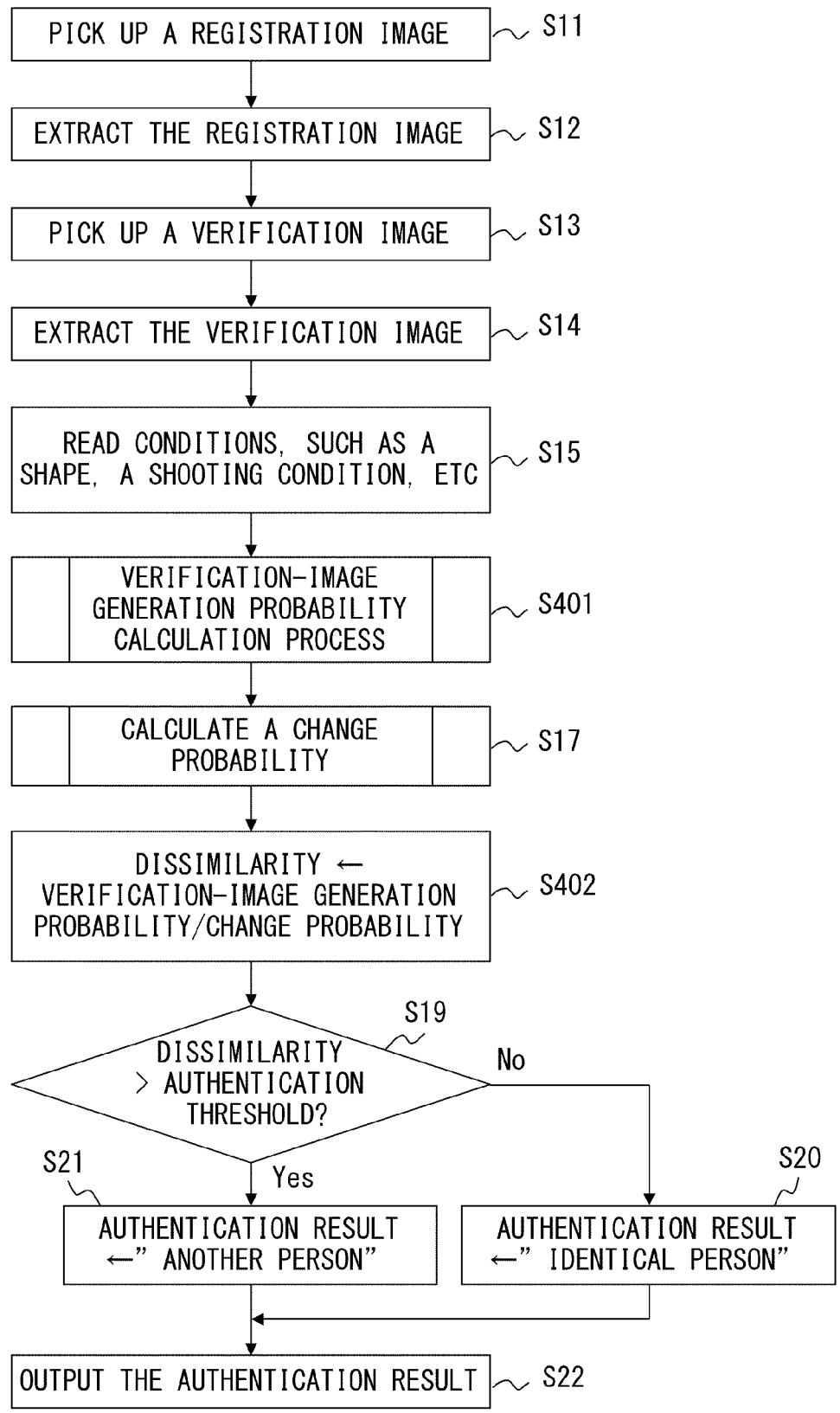
FIG. 23 is a flowchart illustrating the summary of the process in the second preferred embodiment.
Figure 24:
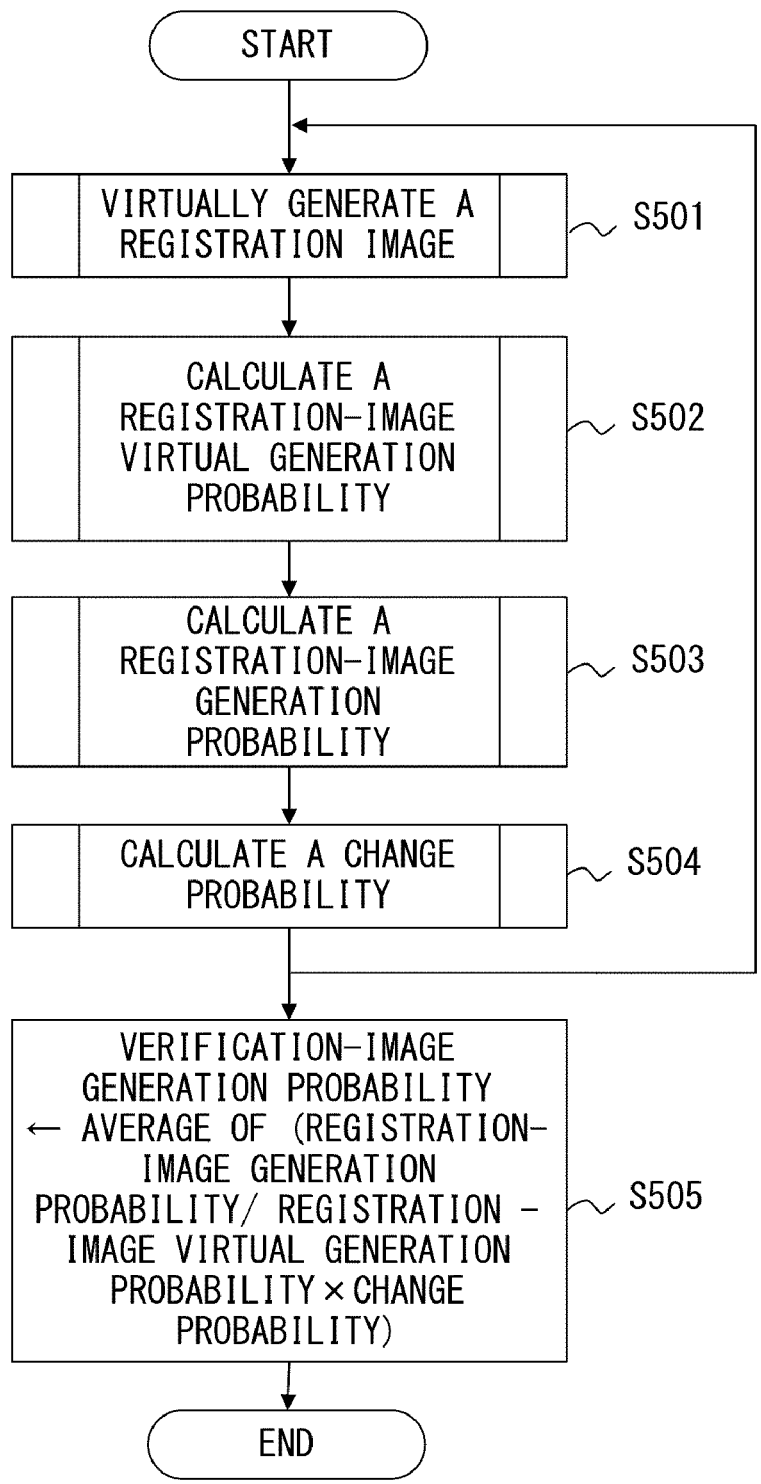
FIG. 24 is a flowchart of a verification-image generation probability calculation process.

FIG. 24 is a detailed flowchart of a verification-image generation probability calculation process in step S401 illustrated in FIG. 23. The flowchart illustrated in FIG. 24 indicates the process contents of a registration-image virtual generation unit 62, a registration-image virtual generation probability calculation unit 63, a registration-image generation probability calculation unit 64, a change probability calculation unit 18 and a verification-image generation probability totaling unit 65.

Step 501 indicates the process contents of the registration-image virtual generation unit 62. In step S501, a virtual registration image is generated using a desired probability distribution. The process in step S501 can also virtually generate a registration image, for example, by changing a verification image to be authenticated instead of a registration image. The change of the verification image to be authenticated results in a high probability of generating a registration image that is close to the verification image to be authenticated.

Step S502 indicates the process contents of the registration-image virtual generation probability calculation unit 63. In step S502, the virtual generation probability of the registration image virtually generated in step S501 is calculated.

Step S503 indicates the process contents of the registration-image generation probability calculation unit 64. In step S503, the registration-image generation probability of the registration image is calculated. For example, the registration-image generation probability is calculated on the basis of the distribution of actual registration images.

Step S504 indicates the process contents of the change probability calculation unit 18. In step S504, the change probability (virtual change probability) of the change between the registration image and the virtually generated registration image. The above processes in steps S501 through S504 are repeated until a predetermined number of times of virtual generation is reached.

After the number of times of virtual generation has reached a predetermined number, a verification-image generation probability calculation process in step S505 is performed. Step S505 indicates the process contents of the verification-image generation probability totaling unit 65. In step S505, an average value of values obtained from the registration-image generation probability divided by the registration-image virtual generation probability and multiplied with the change probability as verification-image generation probability data.

Figure 25:
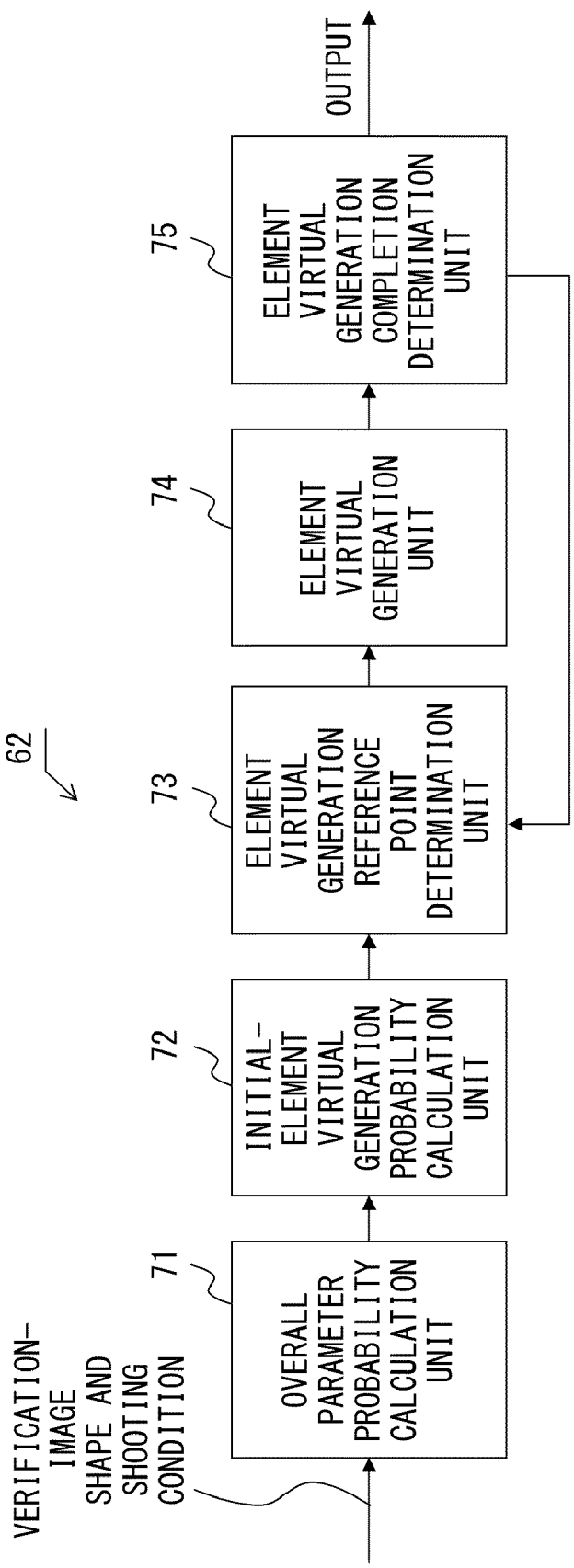
FIG. 25 is a configuration of a registration-image virtual generation unit.

FIG. 25 is one example of a configuration of the registration-image virtual generation unit 62 illustrated in FIG. 22. The registration-image virtual generation unit 62 includes an overall parameter probability calculation unit 71, an initial-element virtual generation unit 72, an element virtual generation reference point determination unit 73, an element virtual generation unit 74 and an element virtual generation completion determination unit 75.

The operation of the registration-image virtual generation unit 62 will be explained below with reference to a flowchart illustrated in FIG. 26.

Data, such as a verification image, a shape and shooting condition and the like is input into the overall parameter probability calculation unit 71. The overall parameter probability calculation unit 71 determines the parameters of a registration-image generation model and a change probability model (S601 in FIG. 26).

The initial-element virtual generation unit 72 virtually generates an initial element on the basis of the initial-element evaluation value table (S602). In the process in step S602 an initial-element generation evaluation value is read from an initial-element evaluation value table obtained by the learning of training data and an initial element with a probability proportional to the initial-element generation evaluation value is virtually generated.

The element virtual generation reference point determination unit 73 calculates the ease of element generation of an element and determines a reference-point element for virtual generation on the basis of the calculation result (S603).

The element virtual generation unit 74 generates an element on the basis of the evaluation value of the number of generation elements (S604).

The element virtual generation completion determination unit 75 determines whether all the already-generated elements of the virtually generated registration image has become reference points (S605). When there is an already-generated element that has not become a reference point (NO in step S605), the process returns to step S603 and an element is virtually generated using the already-generated element as the reference point.

Figure 27A:
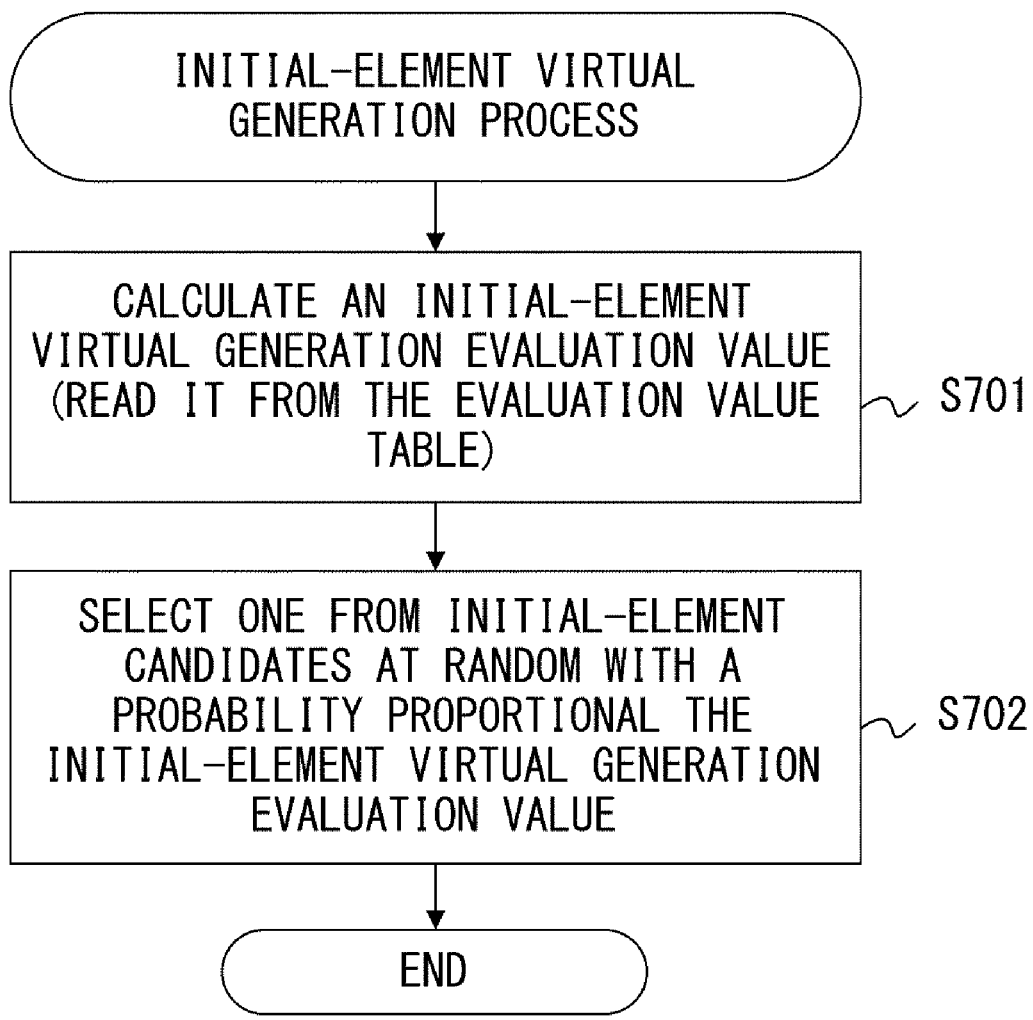
FIGS. 27A and 27B are flowcharts of an initial-element virtual generation process and an element virtual generation reference point determination process, respectively.

FIG. 27A is a detailed flowchart of the initial-element virtual generation process in step S602 illustrated in FIG. 26.

An initial-element virtual generation evaluation value is calculated (S701). The process in step S701, for example, calculates a distance between an initial-element candidate and the initial element of a verification image and obtains change coefficient data corresponding to the distance from the change coefficient table 51. Then, the process obtains initial-element evaluation value data from the initial-element evaluation value table and calculates an initial-element virtual generation evaluation value by multiplying the obtained initial-element evaluation value data by the change coefficient data. The process in step S701 is applied to respective initial-element candidates.

Then, one element is selected at random from the initial-element candidates that has a probability proportional to the initial-element virtual generation evaluation value calculated in step S701 (S702).

By the above processes in steps S701 and S702, one initial element can be virtually generated from the initial-element candidates on the basis of the initial-element virtual generation probability.

Figure 27B:
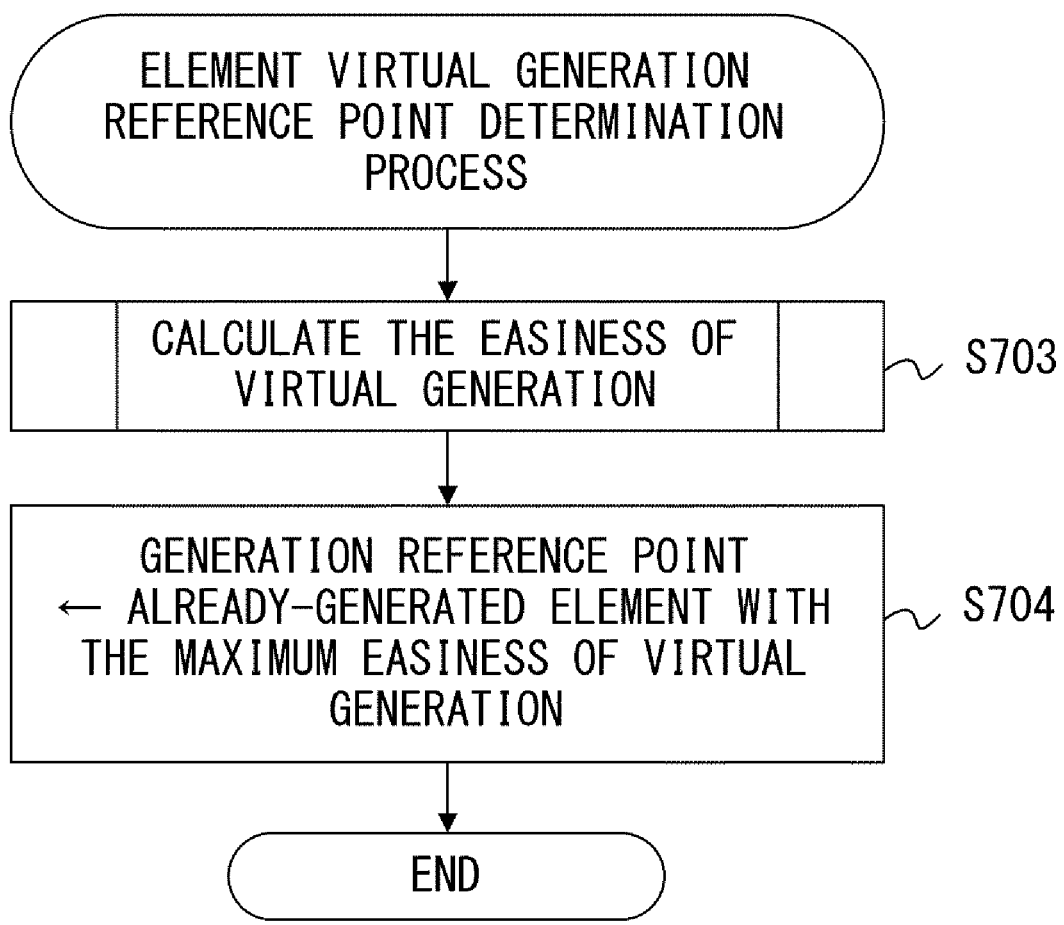

FIG. 27B is a detailed flowchart of the element virtual generation reference point determination process in step S603 illustrated in FIG. 26.

The virtual ease of element generation of an already-generated element is calculated (S703). The calculation process of the virtual ease of element generation in step S703 is the same as the process of calculating the minimum value of the n-th power of the distance between a focused-on element candidate and an already-generated element in steps S51 and S52 illustrated in FIG. 26.

An element whose virtual easiness in element generation is a maximum, of focused-on element candidates is determined as a generation reference point (S704).

As a result of the processes in steps S703 and S704, when there are plural initial-elements are selected one by one as a reference point in descending order of the value of the n-th power of the distance. By these processes, the generation order of elements can be uniquely determined.

Figure 28:
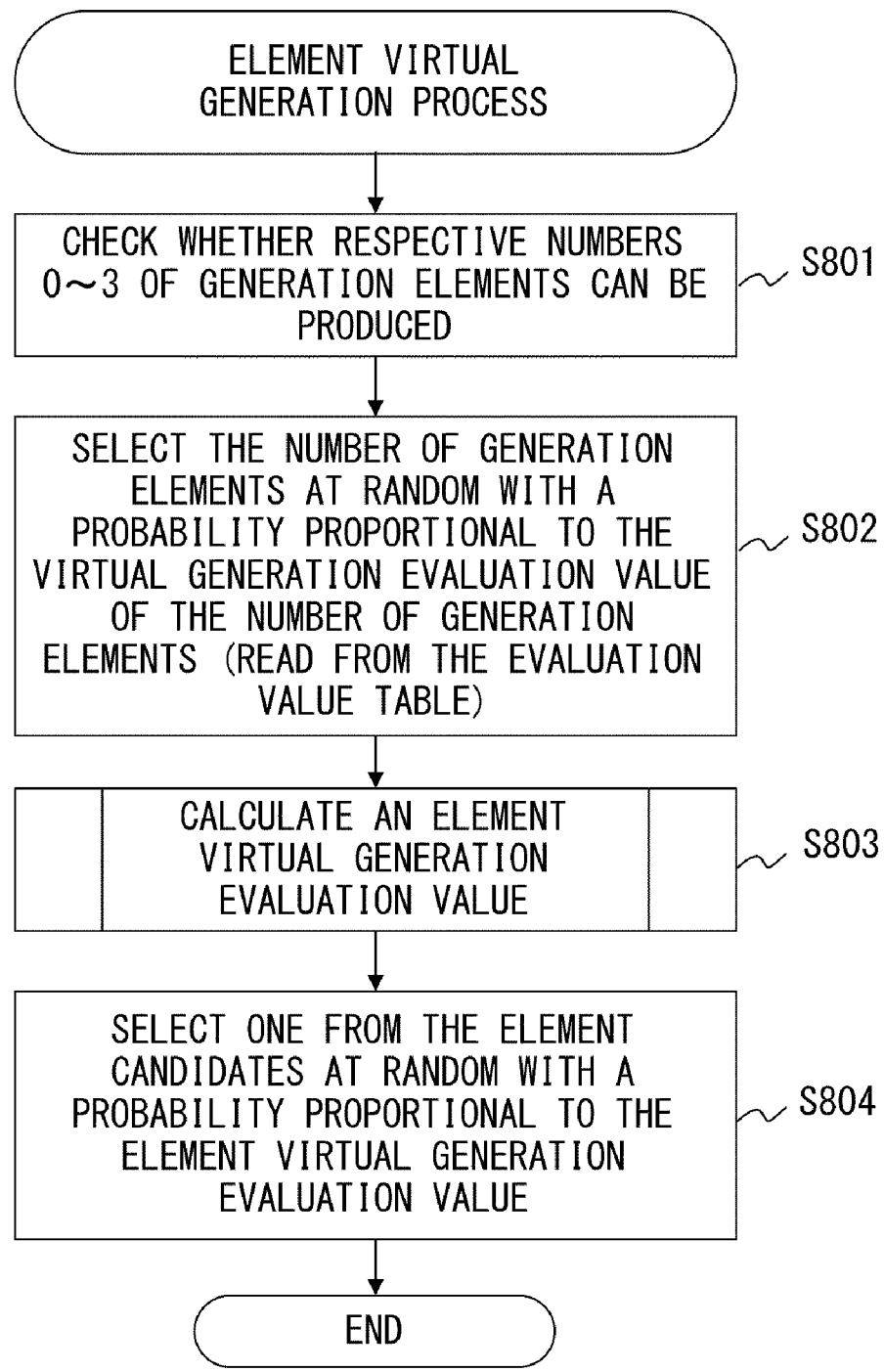
FIG. 28 is a flowchart of an element virtual generation process.

FIG. 28 is a detailed flowchart of an element virtual generation process in step S604 illustrated in FIG. 26.

It is checked whether respective numbers 0 through 3 of generation elements can be produced (S801). In the process in step S801 the number of producible elements is checked when there are four numbers 0 through 3 for generation elements. The process in step S801 is the same as that in step S61 illustrated in FIG. 8A.

Then, the number of generation elements is selected at random with a probability proportional to the virtual generation evaluation value of the number of generation elements (S802). In the process in step S802 the evaluation value of the number of generation elements is read from the generation element number evaluation value table and the number of generation elements is selected with a probability proportional to the virtual generation evaluation value of the number of generation elements.

For example, as explained in the element generation probability calculation of FIG. 10, in the process of step S802 the element number evaluation values "9", "6" and "1" are read in cases where one adjacent point is generated, where two adjacent points are generated and where no element is generated, respectively, and they are stored in the element number evaluation value table. Then, an element number is selected with a probability proportional to the virtual generation evaluation value of the read element number.

Then, an element virtual generation evaluation value calculation process is performed (S803). The element virtual generation evaluation value calculation process in step S803 calculates the element generation evaluation values of the respective element candidates of the selected element number. The element virtual generation evaluation value calculation process in step S803 is applied to the respective element candidate sets of the selected element number.

Then, one element is selected from the element candidates that has a probability proportional to the element virtual generation evaluation value obtained in step S803 (S804).

Figure 29:
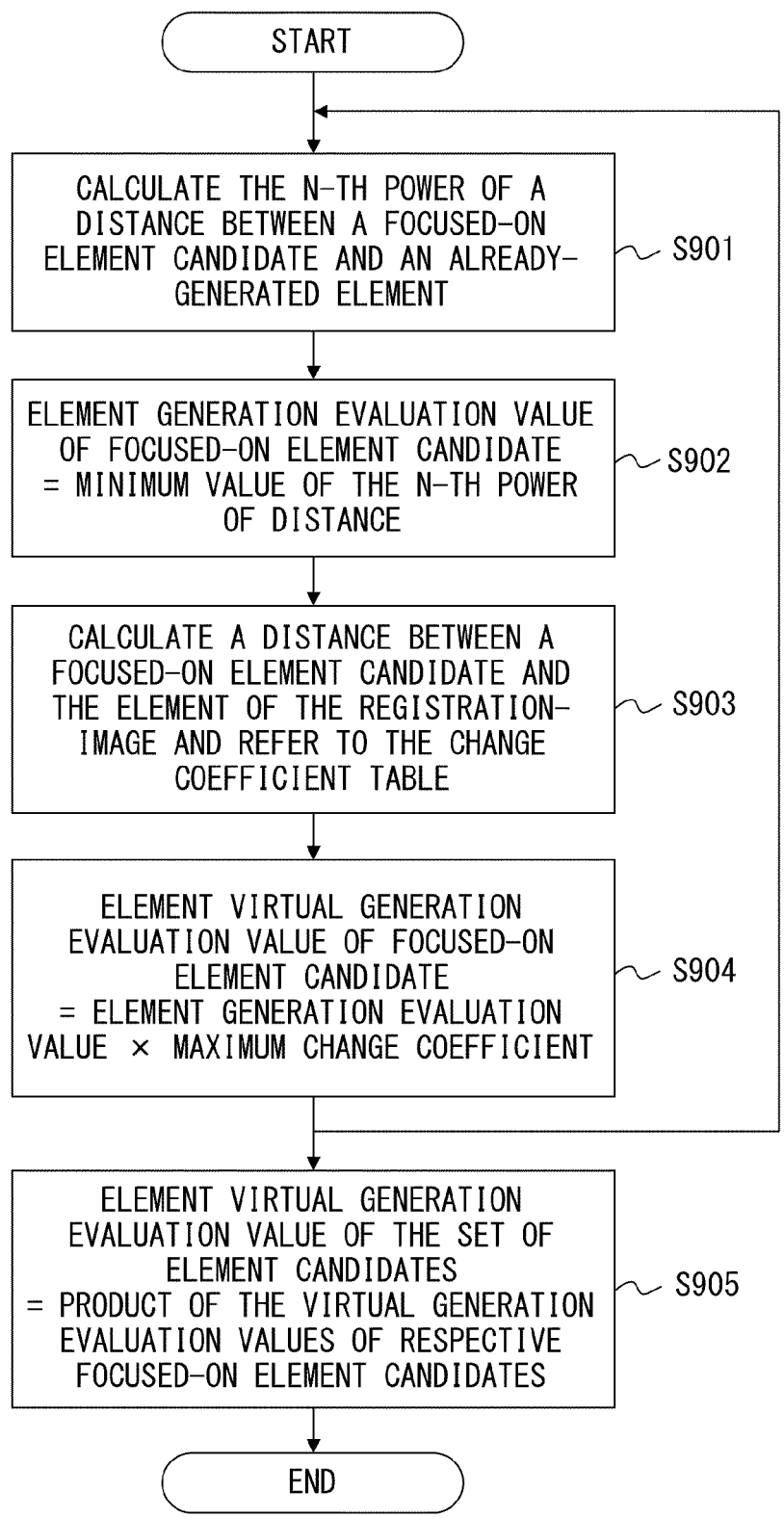
FIG. 29 is a flowchart of an element virtual generation evaluation value calculation process.

FIG. 29 is a detailed flowchart of the element virtual generation evaluation value calculation process in step S803 illustrated in FIG. 28.

The n-th power of a distance between a focused-on element candidate to be calculated and an already-generated element is calculated (S901). A focused-on element candidate is the candidate of an element generated from the virtually generated generation reference point and is one or a plurality of elements determined by the selected element number. The process in step S901 is applied to the respective already-generated elements of a registration image.

Then, the minimum value of the n-th power of the distance is stored in memory or the like as the element generation evaluation value of the focused-on element candidate (S902).

Then, a distance between the virtually generated focused-on element candidate of the registration image and the element of a verification image is calculated and a change coefficient corresponding to the distance is obtained from the change coefficient table 51 (S903).

Then, the element virtual generation evaluation value of the focused-on element candidate is calculated by multiplying the element generation evaluation value of the focused-on element candidate, calculated in step S902 by the maximum value of the change coefficients obtained from the change coefficient table 51 (S904).

The above processes in steps S901 through S904 are applied to the respective focused-on element candidates.

Then, the product of the virtual generation evaluation values of the respective focused-on element candidates currently calculated is calculated as the element virtual generation evaluation value of the set of the corresponding focused-on element candidates (S905).

By the above processes in steps S901 through S905, the element virtual generation evaluation value in the case where a registration image is virtually generated can be calculated.

After the registration-image virtual generation process in step S501 illustrated in FIG. 24 is completed by the above-described processes, the registration-image virtual generation probability calculation process in step S502 is performed. In the process in step S502, for example, the virtual generation probability $r(x_i)$ of the expression (2) is calculated. This virtual generation probability $r(x_i)$ is outputted to the verification-image generation probability totaling unit 65.

The registration-image virtual generation probability calculation process in step S502 applies a probability calculation to the virtually generated registration image instead of the random selection in the same procedure as the registration-image virtual generation process illustrated in FIG. 26.

In step S503 a registration-image generation probability calculation process is performed. Step S503 indicates the process contents of the registration-image generation probability calculation unit 64 illustrated in FIG. 22. A registration-image generation probability is calculated on the basis of the actual probability distribution of a registration image. For example, a registration-image generation probability $P_X(x_i)$ is calculated. The registration-image generation probability calculation process in step S503 is the same as the verification-image generation probability calculation process illustrated in FIG. 5 except for that its calculation target is a registration image.

In step S504, the change probability of the change between the virtually generated registration image and the registration image is calculated. Step S504 indicates the process contents of the change probability calculation unit 18 illustrated in FIG. 22. The change probability calculation unit 18 calculates a change probability and outputs the calculation result to the verification-image generation probability totaling unit 65.

The change probability calculation process in step S504 is the same as the change probability calculation process illustrated in FIG. 14 except that its calculation target is a virtually generated registration image.

The above processes in steps S501 through S504 are repeated until a predetermined number of times of virtual generation is reached. Then, after the predetermined number of times of virtual generation is reached, the verification-image generation probability calculation process in step S505 is performed. In the process in step S505 values calculated on the basis of the registration-image virtual generation probability obtained in step S502, the registration-image generation probability obtained in step S503 and the change probability obtained in step S504 are totaled and their average is calculated. More specifically, the verification-image generation probability is calculated according to the following expression:

Verification-image generation probability=Average of (registration-image generation probability/registration-image virtual generation probability× change probability).

The above verification-image generation probability calculation process in step S505 indicates the process performed by the verification-image generation probability totaling unit 65 illustrated in FIG. 22. The verification-image generation probability totaling unit 65 outputs the verification-image generation probability calculated on the basis of the virtually generated registration image to the dissimilarity calculation unit 19.

Back to FIG. 23, after the verification-image generation probability calculation process in step S401 is completed, the change probability calculation process in step S17 is performed. The change probability calculation process in step S17 is the same as the change probability calculation process in step S17 illustrated in FIG. 2.

The change probability calculation unit 18 illustrated in FIG. 22 calculates the change probability of the change between the registration image outputted from the registration-image extraction unit 13 and the verification image outputted from the verification-image extraction unit 15 and outputs the obtained change probability to a dissimilarity calculation unit 19.

In step S402 illustrated in FIG. 23, a ratio between the verification-image generation probability obtained in step S401 and the change probability obtained in step S17 is calculated as the degree of dissimilarity. Step S402 indicates the process contents of the dissimilarity calculation unit 19 illustrated in FIG. 22.

In step S19 it is determined whether the degree of dissimilarity is larger than the authentication threshold. When the degree of dissimilarity is larger than the authentication threshold (YES in step S19), it is determined that the user is another person (S21). When the degree of dissimilarity is equal to or smaller than the authentication threshold (NO in step S19), it is determined that the user is an identical person (S20). Steps S19 through S21 indicate the process contents of the authentication unit 20 illustrated in FIG. 22.

In step S22 illustrated in FIG. 23, the authentication result is outputted. Step S22 indicates the process contents of the authentication result output unit 21 illustrated in FIG. 22.

The above-described second preferred embodiment virtually generates many registration images using a registration-image generation probability model and calculates a verification-image generation probability on the basis of the virtual generation probability, the generation probability and change probability of a plurality of generated virtual registration images. Then, the degree of dissimilarity is calculated on the basis of the verification-image generation probability and the change probability and it is determined whether the user is an identical person.

According to the second preferred embodiment, the same effect as that of the first preferred embodiment can be obtained. Specifically, high authentication accuracy can be obtained by a smaller amount of data. This is because the amount of data stored in a storage device can be reduced by dividing a plurality of registration and verification images into a plurality of elements and storing data used to calculate the generation probabilities of respective elements are stored in advance in the storage device.

Furthermore, since a verification-image generation probability is calculated on the basis of the probability distribution of collected data, an authentication result does not excessively depend on the collected data. This is because even if portion of the data is lost, the lost portion can be complemented by calculating a verification-image generation probability by calculating the generation probability of an element.

Since it is not necessary to finely adjust each piece of data in order to improve authentication accuracy, man-hours of work required to be performed up until the time when an authentication program and the like is completed can be reduced.

Furthermore, since authentication accuracy can be checked in advance by generating virtual registration and verification images using a probability model and repeating authentication, it becomes easy to verify authentication accuracy.

[3] Third Embodiment

Next, the third preferred embodiment will be explained. The third preferred embodiment is designed in such a way as to evaluate authentication accuracy in advance by repeatedly applying authentication to a plurality of sets of a virtually generated registration image and a verification image. As one example, this preferred embodiment evaluates authentication accuracy by calculating the degree of dissimilarity on the basis of virtually generated registration images the verification-image generation probabilities of a verification image and change probabilities and generating the histogram of the degree of dissimilarity. The evaluation method of authentication accuracy is not limited to the generation of a histogram and authentication accuracy can also be evaluated by another method.

FIG. 30 is a configuration of an authentication accuracy evaluation device 81 in the third preferred embodiment. In FIG. 30, the same reference numerals are attached to the same functional blocks as those in FIGS. 1 and 24 and their explanations are omitted.

A registration-image virtual generation unit 82 virtually generates a registration image according to a registration-image generation probability calculated using a registration-image generation probability model.

A verification-image virtual generation unit 83 virtually generates a verification image changing the virtually generated registration image according to a change probability calculated using a change probability model.

The functions of a registration-image virtual generation unit 62, a registration-image virtual generation probability calculation unit 63 and a registration-image generation probability calculation unit 64 are the same as the blocks of the biometric authentication device 61 with the same reference numerals illustrated in FIG. 22.

A registration-image virtual generation probability outputted from the registration-image virtual generation probability calculation unit 63, a change probability outputted from the change probability calculation unit 18 and a registration-image generation probability outputted from the registration-image generation probability calculation unit 64 are inputted to a verification-image generation probability totaling unit 65. The verification-image generation probability totaling unit 65 calculates a verification-image generation probability on the basis of the registration-image virtual generation probability, the registration-image generation probability and the change probability, and outputs the obtained verification-image generation probability to a dissimilarity calculation unit 19.

The dissimilarity calculation unit 19 calculates a ratio between the verification-image generation probability outputted from the verification-image generation probability totaling unit 65 and the change probability outputted from the change probability calculation unit 18 as the degree of dissimilarity.

A totaling unit 84 generates the histogram of the degree of dissimilarity outputted from the dissimilarity calculation unit 19. An output unit 85 outputs the generated dissimilarity histogram. By generating the dissimilarity histogram, for example, the authentication accuracy of a probability model obtained when a parameter is changed can be checked.

FIG. 31 is a summary of the process of the authentication accuracy evaluation device 81 in the third preferred embodiment.

In step S1001 illustrated in FIG. 31, a registration-image virtual generation process using a registration-image generation probability is performed. Step S1001 indicates the process contents of the registration-image virtual generation unit 82.

Figure 32:
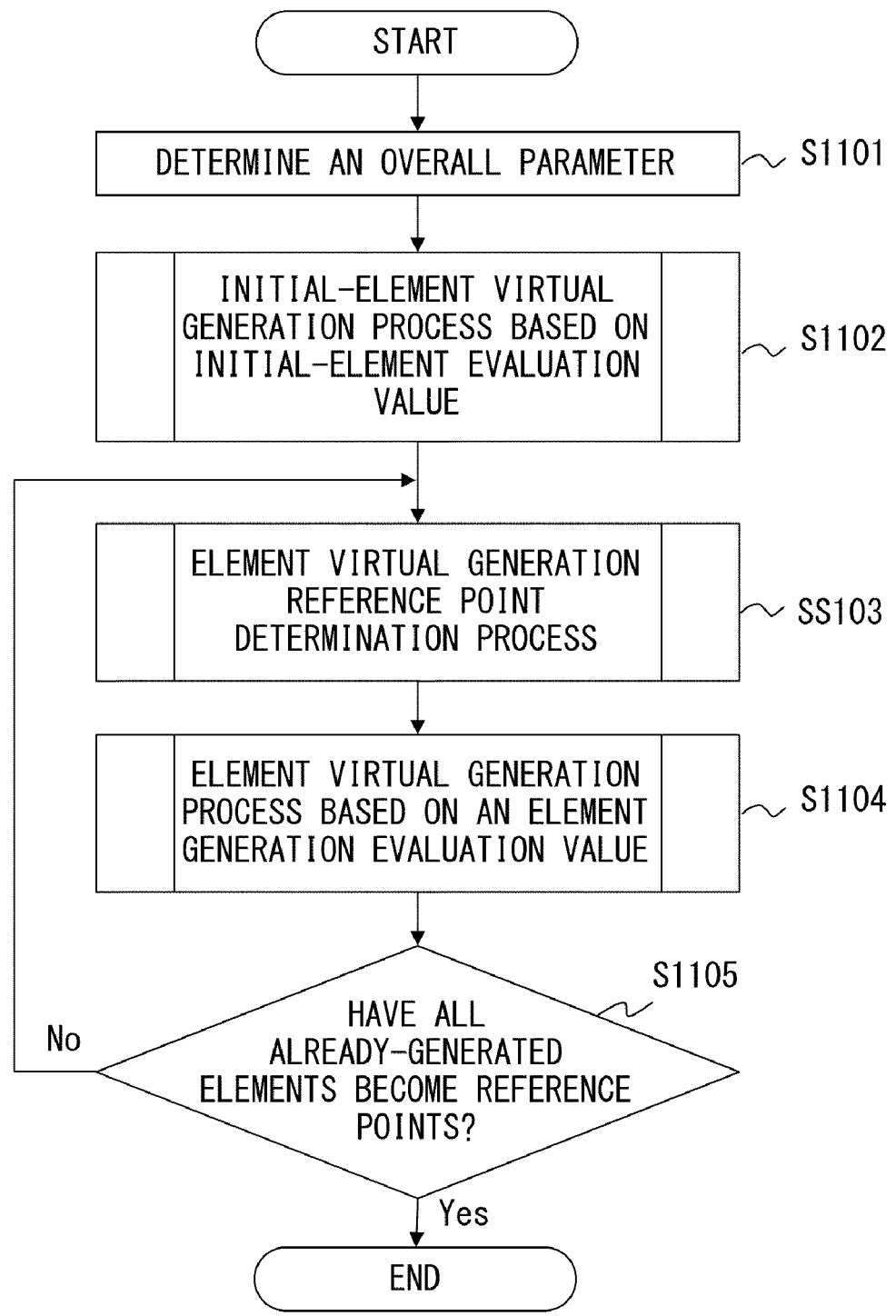
FIG. 32 is a flowchart of a registration-image virtual generation process based on a registration-image generation probability.

FIG. 32 is a detailed flowchart of the registration-image virtual generation process using the registration-image generation probability, in step S1001 illustrated in FIG. 31.

Firstly, an overall parameter, that is, the parameter of a probability model is determined (S1101).

Then, an initial-element virtual generation process based on an initial-element evaluation value is performed (S1102). The initial-element evaluation value is obtained from the earlier-described initial-element evaluation value table. The process in step S1102 is applied to respective initial-element candidates. The initial-element virtual generation process in step S1102 is the same as the initial-element virtual generation process illustrated in FIG. 27A. However, a generation probability is calculated on the basis of a distribution obtained by learning using an actual registration image as training data.

Then, an element virtual generation reference point determination process is performed (S1103). The element virtual generation reference point determination process in step S1103 is the same as the element virtual generation reference point determination process illustrated in FIG. 27B. However, a generation probability is calculated on the basis of a distribution obtained by learning using an actual registration image as training data.

Then, an element virtual generation process is performed on the basis of an element generation evaluation value (S1104).

Figure 33:
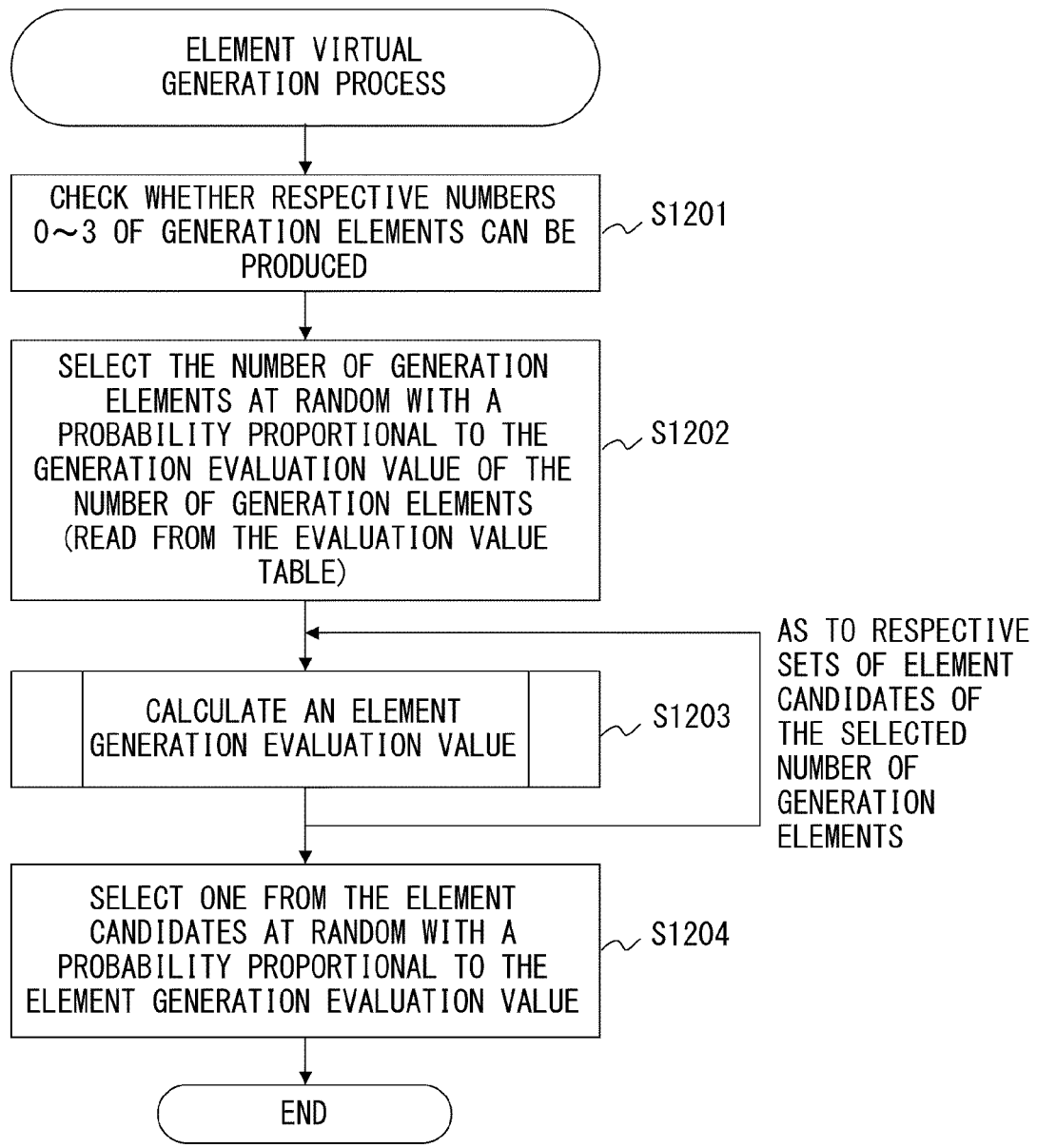
FIG. 33 is a flowchart of an element virtual generation process.

FIG. 33 is a detailed flowchart of the element virtual generation process in step S1104 illustrated in FIG. 32.

In step S1201, whether respective numbers of generation elements 0 through 3 can be produced, that is, the number of producible elements is checked.

Then, in step S1202, the evaluation value of the number of elements is read from the generation element number evaluation value table and the number of generation elements is selected at random with a probability proportional to the read evaluation value. The number of elements is selected by the process in step S1202 with a probability proportional to the evaluation value of the number of elements.

Then, in step S1203, an element generation evaluation value calculation process is performed. The process in step S1203 is applied to the respective element candidates of the selected number of elements. The element generation evaluation value of a general element is calculated by this process. The element generation evaluation value calculation process in step S1203 is the same as the element generation evaluation value calculation process illustrated in FIG. 8B.

Then, in step S1204, one element is selected at random from element candidates that has a probability proportional to the element generation evaluation value obtained in step S1203.

After the element virtual generation process in step S1104 illustrated in FIG. 32 is completed, the process proceeds to step S1105 illustrated in FIG. 32 and it is determined whether all already-generated elements have become reference points.

When there is an element that has not become a reference point from among the already-generated elements (NO in step S1105), the process returns to step S1103 and the processes in steps S1103 through S1105 are repeated.

When the process to all of the already-generated elements is completed (YES in step S1105), the process is terminated.

After the registration-image virtual generation process in step S1001 illustrated in FIG. 31 is completed, the process proceeds to step S1002 and a verification-image virtual generation process based on a change probability is performed.

Figure 34:
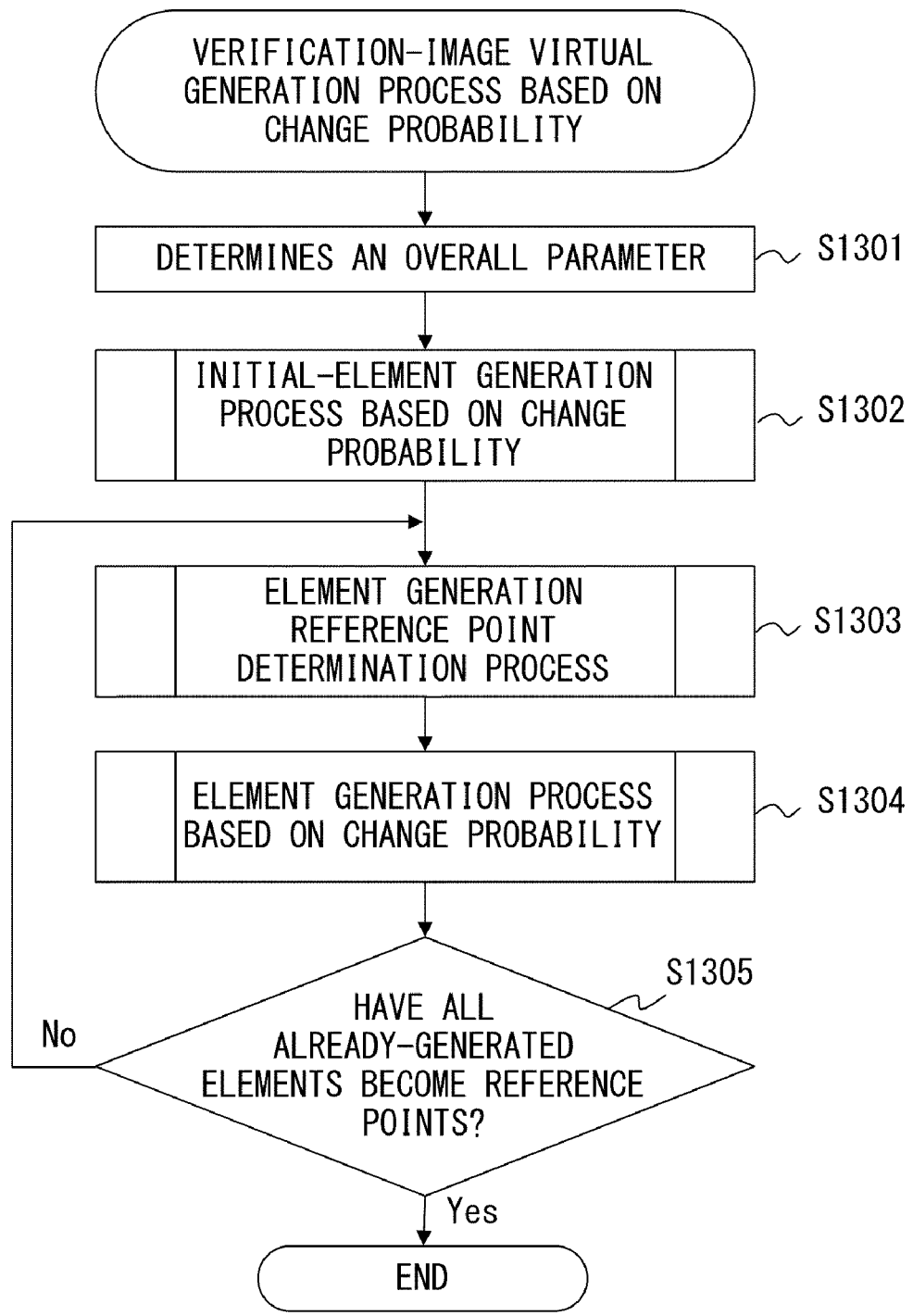
FIG. 34 is a flowchart of a verification-image virtual generation process based on a registration-image change probability.

FIG. 34 is a detailed flowchart of the verification-image virtual generation process based on a change probability in step 1002 illustrated in FIG. 31.

Firstly, an overall parameter (a parameter of a probability model) is determined (S1301). Then, an initial-element virtual generation process based on a change probability is performed (S1302).

Figure 35:
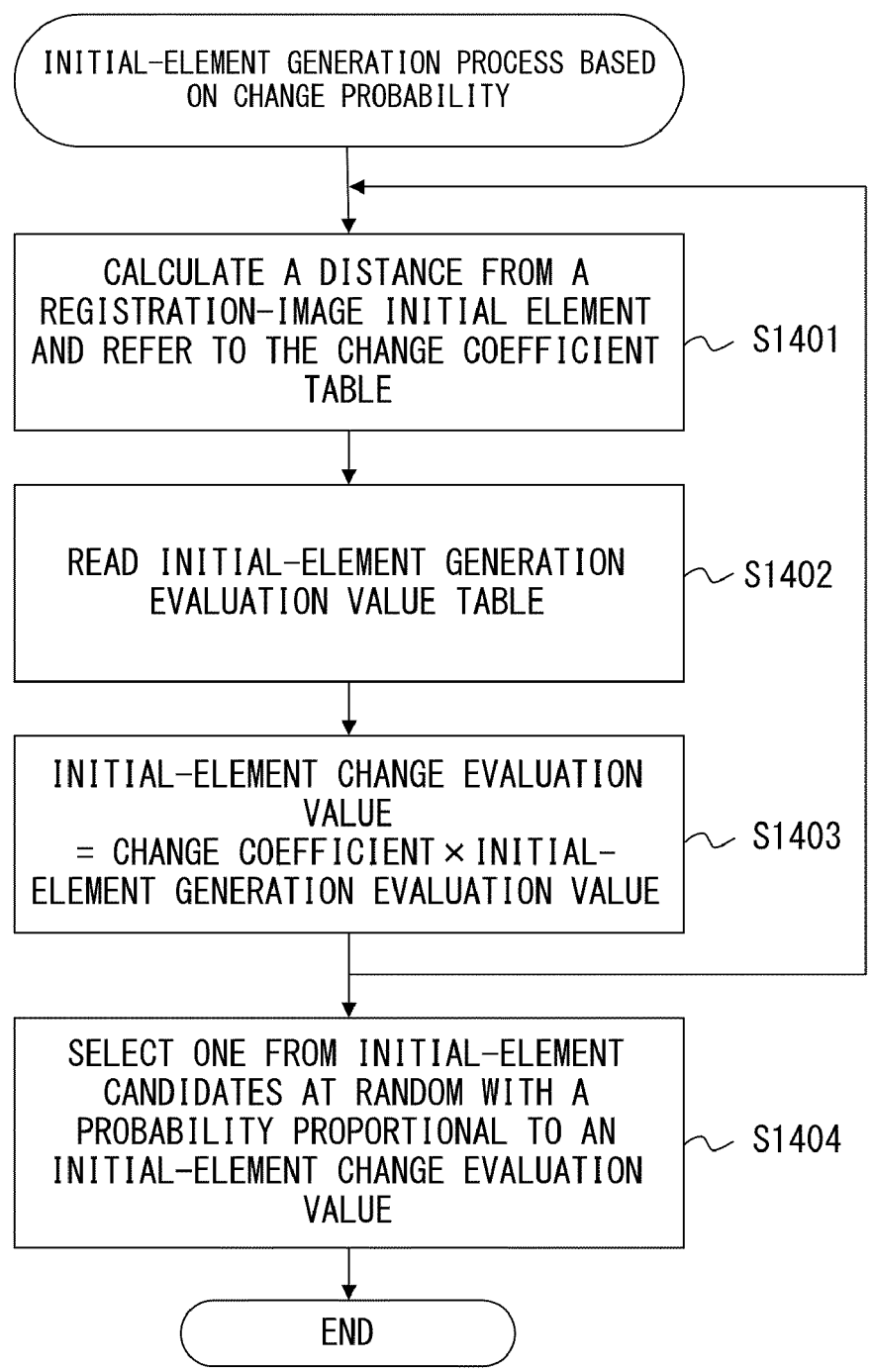
FIG. 35 is a flowchart of an initial-element generation process based on a change probability.

FIG. 35 is a detailed flowchart of the initial-element generation process based on a change probability in step S1302 illustrated in FIG. 34.

Firstly, a distance between a registration-image initial element and an initial-element candidate is calculated and a change coefficient corresponding to the distance is obtained from the change coefficient table (S1401).

Then, the generation evaluation value of the initial element is read from the initial-element evaluation value table (S1402). Then, an initial-element change evaluation value is calculated by multiplying the initial-element generation evaluation value obtained in step S1402 by the change coefficient obtained in step S1401 (S1403).

The above processes in steps S1401 through S1403 are applied to respective initial-element candidates.

Then, one initial element is selected at random from the initial-element candidates that has a probability proportional to the initial-element change evaluation value obtained in step S1403 (S1404).

One initial element can be generated using a change probability by the above processes in steps S1401 through S1404.

After the initial-element generation process in step S1302 illustrated in FIG. 34 is completed, the process proceeds to step S1303 and an element generation reference point determination process is performed. This element generation reference point determination process in step S1303 calculates ease of generation of an element by raising the distance to an already-generated element to the n-th power and determines a generation reference point on the basis of the ease of element generation. The element generation reference point determination process in step S1303 is the same as the element generation reference point determination process illustrated in FIG. 6B.

Then, an element generation process based on a change probability in step S1304 is performed.

Figure 36:
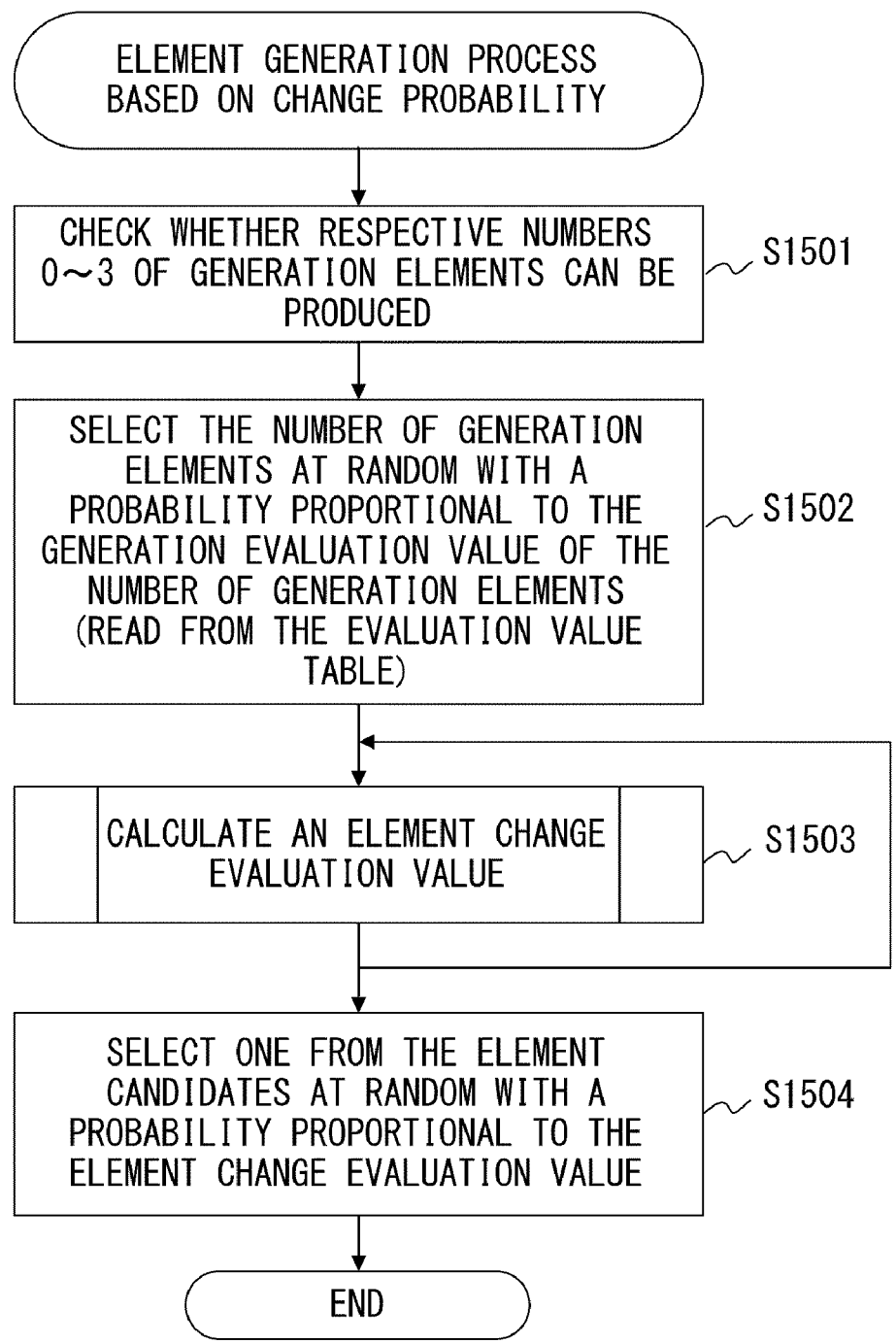
FIG. 36 is a flowchart of an element generation process based on a change probability.

FIG. 36 is a detailed flowchart of the element generation process based on a change probability in step S1304 illustrated in FIG. 34.

Firstly, whether respective numbers of generation elements 0 through 3 can be produced, that is, the number of producible elements is checked (S1501).

Then, the evaluation value of the number of elements is read from the generation element number evaluation value table and the number of generation elements is selected at random with a probability proportional to the read evaluation value (S1502).

Then, an element change evaluation value calculation process is performed (S1503). In this process, the minimum value of the n-th power of distances between a focused-on element candidate and the elements of a registration image is calculated as the element generation evaluation value of the focused-on element candidate. Then, a change coefficient corresponding to the distance is obtained from the change coefficient table 51 and an element change evaluation value is calculated on the basis of the obtained change coefficient and the element generation evaluation value. The element change evaluation value calculation process in step S1503 is the same as the element change evaluation value calculation process illustrated in FIG. 18. The process in step S1503 is applied to the respective sets of element candidates of the selected number of generation elements.

Then, an element is selected at random from the element candidates that has a probability proportional to the element change evaluation value calculated in step S1503 (S1504).

A general element of a verification image is virtually generated by the above processes in steps S1501 through S1504.

After the element generation process based on a change probability in step S1304 illustrated in FIG. 34 is completed, the process proceeds to step S1305 and it is determined whether all already-generated elements have become reference points.

When there is an already-generated element that has not become a reference point (NO in step S1305), the process returns to step S1303 and the above-described processes are repeated.

After all the already-generated elements have become reference points (YES in step S1305). The process is terminated.

A verification image can be virtually generated by the above-described processes in steps S1301 through S1305.

After the verification-image virtual generation process based on a change probability in step S1002 illustrated in FIG. 31 is completed, the process proceeds to step S1003 and data, such as a shape and shooting condition and the like are read. In step S1003, the shape and shooting condition (information indicating the resolution of a camera device and the like) to be authenticated are read.

Then, the verification-image generation probability calculation process in step S1004 is performed.

Figure 37:
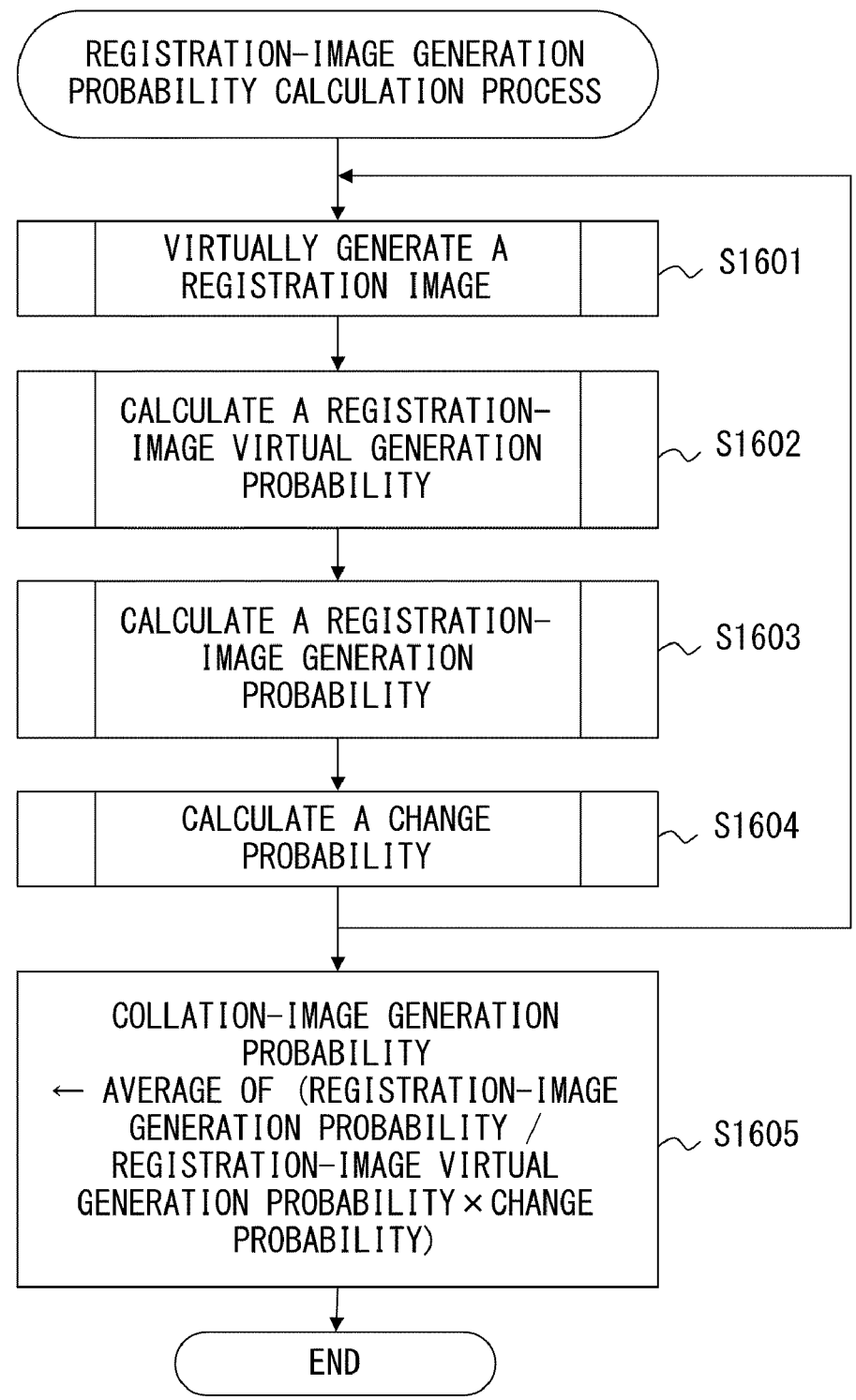
FIG. 37 is a flowchart of a verification-image generation probability calculation process.

FIG. 37 is a detailed flowchart of the verification-image generation probability calculation process in step S1004 illustrated in FIG. 31. The flowchart illustrated in FIG. 37 illustrates the process contents of the registration-image virtual generation unit 62, registration-image virtual generation probability calculation unit 63, registration-image generation probability calculation unit 64, change probability calculation unit 18 and verification-image generation probability totaling unit 65 that are illustrated in FIG. 30. The verification-image generation probability calculation process illustrated in FIG. 37 is the same as the verification-image generation probability calculation process in the second preferred embodiment illustrated in FIG. 24.

In step S1601, a virtual registration image is generated using a desired probability distribution.

Then, in step S1602, the virtual generation probability of the virtually generated registration image is calculated.

Then, in step S1603, the registration-image generation probability of a registration image is calculated. For example, the registration-image generation probability is calculated on the basis of the distribution of actual registration images.

Then, in step S1604, the change probability of the change between the registration image and virtually generated registration image is calculated.

The above processes in steps S1601 through S1604 are repeated until a predetermined number of virtual generations is reached.

After the predetermined number of virtual generations is reached, the verification-image generation probability calculation process in step S1605 is performed. In this process, a verification-image generation probability is calculated according to the following expression:

Verification-image generation probability=Average of (registration-image generation probability/registration-image virtual generation probability× change probability).

A verification-image generation probability based on sets of a virtually generated registration image and a virtually generated verification image can be calculated by the above processes in steps S1601 through S1605.

After the verification-image generation probability calculation process in step S1004 illustrated in FIG. 31 is completed, the change probability calculation process in step S1005 is performed and the change probability of a change between a virtually generated registration image and a verification image are calculated. This change probability calculation process is basically the same as the change probability calculation process in step S17 illustrated in FIG. 2, except for that its targets are a virtually generated registration image and a verification image.

Then, the dissimilarity calculation process in step S1006 is performed. In this process, the degree of dissimilarity is calculated by dividing the verification-image generation probability calculated in step S1004 by the change probability calculated in step S1005.

In step S1007, the dissimilarity histogram of the dissimilarity data of sets of a virtually generated registration image and a verification image are generated.

The above processes in steps S1001 through S1007 are repeated until a predetermined number of times of dissimilarity calculations is reached.

After the predetermined number of times of dissimilarity calculations is reached, the process proceeds to step S1008 and the generated dissimilarity histogram is outputted.

According to the above-described third preferred embodiment, the authentication accuracy of a probability model can be evaluated by generating various virtual registration and verification images using probability models, calculating verification-image generation probabilities and change probabilities and generating a dissimilarity histogram. Furthermore, an optimal parameter from which high authentication accuracy can be determined by variously changing the parameter and evaluating its authentication accuracy.

Although in the first through third preferred embodiments, initial-element generation evaluation value data, generation element number evaluation value data and the like is stored in a storage device, such as memory or the like, data which is obtained by learning training data and which is stored in advance is not limited to these pieces of data. Any type of data can be used as long as it can calculate the generation probabilities of the initial element and a general element of a blood vessel image. For example, initial-element generation probability data, element generation probability data and the like can also be stored in memory or the like.

Data used to evaluate authentication accuracy is not limited to the dissimilarity histogram and other pieces of data can also be used.

According to the above-described biometric authentication device, a high authentication accuracy can be obtained using fewer pieces of data.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric authentication device, comprising:
 a storage unit to store data indicating an initial-element generation probability of a blood vessel image, data indicating a branch probability of an element and data indicating a change coefficient or a change probability of the element, which are obtained by dividing a plurality of sets of a registration image and a verification image which indicate the blood vessel image of a living body into a plurality of respective elements;
 a verification-image generation probability calculation unit to calculate an element generation probability of a focused-on element of a verification image to be authenticated, using the data indicating the generation probability of the initial element and the data indicating the branch probability which are stored in the storage unit and calculating a value obtained by multiplying the element generation probabilities of respective focused-on elements as a verification-image generation probability of the verification image to be authenticated;
 a change probability calculation unit to calculate change probability of the change between the focused-on element of the verification image and the element of a registration image for a person to be authenticated, using the data indicating the change coefficient or the change probability which are stored in the storage unit and calculating a value obtained by multiplying the change probabilities of respective focused-on elements as a change probability of the verification image;
 a dissimilarity or similarity calculation unit to calculate a degree of similarity or dissimilarity using the verification image generation probability and the change probability; and
 an authentication unit to determine whether the verification image to be authenticated belongs to a registered person, in accordance with whether the degree of dissimilarity or similarity is more or less than a threshold.

2. The biometric authentication device according to claim 1, wherein
 the verification-image generation probability calculation unit comprises
 an initial-element generation probability calculation unit to calculate an initial-element generation probability of the verification image using the data indicating the generation probability of the initial element stored in the storage unit;
 an element generation reference point determination unit to determine an element which becomes a generation reference point using a distance between the focused-on element of the verification image and an already-generated element;
 an element generation probability calculation unit to calculate an element generation probability of the focused-on element using the data indicating the branch probability of the element stored in the storage unit; and
 a multiplication unit to calculate a product of the initial-element generation probability and the element generation probabilities of respective elements as the verification-image generation probability data of the verification image to be authenticated.

3. The biometric authentication device according to claim 1, wherein
 the change probability calculation unit comprises
 an initial-element change probability calculation unit to calculate a distance between the initial element of the registration image and the focused-on element of the verification image, obtaining from the storage unit the data indicating the change coefficient or the change probability corresponding to the distance obtained by the calculation and calculating an initial-element change probability using the obtained data indicating the change coefficient or change probability and data indicating a generation probability of the initial element;
 an element generation reference point determination unit to determine an element which becomes a generation reference point using a distance between the focused-on element and an already-generated element;
 an element change probability calculation unit to calculate an element change probability of the focused-on element using the data indicating the branch probability of the element which is stored in the storage unit; and
 a change probability calculation unit to calculate a product of the initial-element change probability and element change probabilities of respective focused-on elements as change probability of the registration image and the verification image to be authenticated.

4. The biometric authentication device according to claim 1, wherein the storage unit stores initial-element generation evaluation value data as the data indicating an initial-element generation probability of the blood vessel image, stores element number evaluation value data as the data indicating the branch probability of the element and stores change coefficient data as the data indicating the change coefficient or the change probability of the verification image and the registration image and the verification-image generation probability calculation unit comprises an initial-element generation probability calculation unit to calculate initial-element generation probability of the verification image using the data indicating the initial-element generation probability stored in the storage unit;

an element generation reference point determination unit to determine an element which becomes a generation reference point using a distance between the focused-on element of the verification image and an already-generated element;

an element generation probability calculation unit for calculating element generation probability data of the focused-on element using the element number evaluation value data stored in the storage unit; and a multiplication unit for calculating a product of the initial-element generation probability and the element generation probabilities of respective elements as the verification-image generation probability data of the verification image to be authenticated.

5. The biometric authentication device according to claim 4, wherein the change probability calculation unit comprises an initial-element change probability calculation unit to calculate a distance between an initial element of the registration image and the focused-on element of the verification image, to obtain from the storage unit the change coefficient data or the change probability corresponding to the calculated distance and to calculate an initial-element change probability using the obtained change coefficient data and the initial-element generation evaluation value data;

an element generation reference point determination unit to determine an element which becomes a generation reference point using a distance between the focused-on element and an already-generated element; and an element change probability calculation unit to calculate an element change probability of the focused-on element using the generation element number evaluation value data stored in the storage unit.

6. The biometric authentication device according to claim 4, wherein the element generation probability calculation unit comprises an element number probability calculation unit to calculate a value obtained by dividing the element number evaluation value data of the corresponding focused-on element of the verification image by a sum of element number evaluation value data of branchable elements as element number probability data;

an element generation evaluation value calculation unit to calculate a n-th power of a distance between the focused-on element and an already-generated element as element generation evaluation value data; and a multiplication unit to calculate a product of a value obtained by dividing the element generation evaluation value data of the focused-on element by a sum of the element generation evaluation value data of branchable elements and the element number probability data as the element generation probability.

7. The biometric authentication device according to claim 4, wherein the change probability calculation unit comprises an initial-element change probability calculation unit to calculate a distance between an initial element of the registration image and the focused-on element candidate of the verification image, to obtain from the storage unit the change coefficient data corresponding to the calculated distance and to calculate an initial-element change probability using the obtained change coefficient data and the initial-element generation evaluation value data;

an element change evaluation value calculation unit to calculate a n-th power of a distance between the focused-on element and an already-generated element as element generation evaluation value data, to obtain from the storage unit the change coefficient data corresponding to the distance and to calculate a product of the obtained change coefficient data and the element generation evaluation value as an element change evaluation value of the focused-on element;

an element change probability calculation unit to calculate an element change probability using a value obtained by dividing the element change evaluation value of the focused-on element by a sum of the element change evaluation values of branchable elements and an element number probability indicating a branch probability of the element obtained from the element number evaluation value; and a multiplication unit to calculate a product of the initial-element change probability and the element change probabilities of respective elements as the change probability of the verification image.

8. A biometric authentication device, comprising:

a storage unit to store data indicating an initial-element generation probability of a blood vessel image, data indicating a branch probability of an element and data indicating a change coefficient or a change probability of the element, which is obtained by dividing a plurality of sets of a registration image and a verification image which indicate the blood vessel image of a living body into a plurality of respective elements;

a registration-image virtual generation unit to generate a registration-image by virtually generating a plurality of elements using the data indicating the initial-element generation probability and data indicating the branch probability of the element, which are stored in the storage unit;

a registration-image virtual generation probability calculation unit to calculate a registration-image virtual generation probability of the virtually generated registration image;

a registration-image generation probability calculation unit to calculate a registration-image generation probability of a registration image;

a first change probability calculation unit to calculate virtual change probabilities of the virtually generated registration image and the verification image;

a verification-image generation probability calculation unit to calculate a verification-image generation probability using the registration-image generation probability, the registration-image virtual generation probability and the virtual change probability;

a second change probability calculation unit to calculate a change probability of the registration image and the verification image to be authenticated;

a dissimilarity or similarity calculation unit to calculate a degree of similarity or dissimilarity using the verification-image generation probability and the change probability; and an authentication unit to determine whether a verification image to be authenticated belongs to a registered person, in accordance with the degree of dissimilarity or similarity is more or less than a threshold.

9. The biometric authentication device according to claim 8, wherein the storage unit stores initial-element generation evaluation value data as the data indicating the initial-element generation probability of the blood vessel image, stores element number evaluation value data as the data indicating the branch probability of the element and stores change coefficient data as the data indicating the change coefficient or the change probabilities of the element and the registration-image virtual generation unit comprises an initial-element virtual generation unit to virtually generate an initial element of the verification image using the initial-element generation evaluation value data stored in the storage unit;

an element virtual generation reference point determination unit to determine an element which becomes a generation reference point using a distance between the focused-on element of the verification image and an already-generated element; and an element virtual generation unit to virtually generate an element using the element number evaluation value data stored in the storage unit.

10. The biometric authentication device according to claim 9, wherein the initial-element virtual generation unit selects one from a plurality of initial elements with a probability proportional to the initial-element generation evaluation value data stored in the storage unit and virtually generates the initial element and the element virtual generation unit comprises an element number selection unit to select a number of generation elements with a probability proportional to the element number evaluation value data;

an element virtual generation evaluation value calculation unit to calculate element virtual generation evaluation value data of a set of element candidates of the selected number of generation elements; and an element selection unit to select one from a plurality of element candidates with a probability proportional to the element virtual generation evaluation value data.

11. The biometric authentication device according to claim 9, wherein the element virtual generation evaluation value calculation unit comprises an evaluation value calculation unit to calculate a n-th power of a distance between the focused-on element and an already-generated element and to calculate the distance obtained by the calculation as element generation evaluation value data of the focused-on element;

an element virtual generation evaluation value calculation unit to calculate a distance between the focused-on element and an element of the verification image, to obtain from the storage unit change coefficient data corresponding to the obtained distance and to calculate an element virtual generation evaluation value data using the obtained change coefficient data and the element generation evaluation value data of the focused-on element; and an element candidate-set element virtual generation evaluation value calculation unit to calculate a product of the element virtual generation evaluation value data of respective focused-on elements as element virtual generation evaluation value data of a set of element candidates.

12. An authentication accuracy evaluation device, comprising:

a storage unit to store data indicating an initial-element generation probability of a blood vessel image, data indicating a branch probability of an element and data indicating a change coefficient or a change probability of the element, which are obtained by dividing a plurality of sets of a registration image and a verification image which indicate the blood vessel image of a living body into a plurality of respective elements;

a registration-image virtual generation unit to virtually generate a plurality of registration images using the data indicating the initial-element generation probability and the data indicating the branch probability which are stored in the storage unit;

a verification-image virtual generation unit to virtually generate a plurality of verification images using the data indicating the initial-element generation probability, the data indicating the branch probability of an element and the data indicating the change coefficient or the change probability which are stored in the storage unit;

a verification-image generation probability calculation unit to calculate a generation probability of the verification image;

a change probability calculation unit to calculate change probability of the virtually generated registration image and the virtually generated verification image;

a dissimilarity or similarity calculation unit to calculate a degree of similarity or dissimilarity using the verification image generation probability and the change probability; and an output unit to total a plurality of the degree of dissimilarity or similarity and to output data indicating authentication accuracy.

13. The authentication accuracy evaluation device according to claim 12, wherein the storage unit stores initial-element generation evaluation value data as the data indicating the initial-element generation probability of the blood vessel image, stores element number evaluation value data as the data indicating the branch probability of an element and stores a change coefficient data of the element as the data indicating the change coefficient or the change probability of the element and the registration-image virtual generation unit comprises an initial-element virtual generation unit to select one from a plurality of initial-element candidates with a probability proportional to the initial-element generation evaluation value data stored in the storage unit and to virtually generate an initial element;

an element virtual generation reference point determination unit to determine an element which becomes a generation reference point using a distance between a focused-on element and an already-generated element;

an element virtual generation evaluation value calculation unit to select a number of generation elements with a probability proportional to the element number evaluation value data and to calculate an element virtual generation evaluation value of an element of the selected number of generation elements; and an element virtual generation unit to select one from a plurality of element candidates with a probability proportional to the element virtual generation evaluation value data and to virtually generate an element.

14. The authentication accuracy evaluation device according to claim 13, wherein the verification-image virtual generation unit comprises an initial-element virtual generation unit to select one from a plurality of initial-element candidates with a probability proportional to a product of the initial-element generation evaluation value data and the change coefficient data stored in the storage unit and to virtually generate an initial element;

an element number selection unit to select one of numbers of generation elements from a plurality of numbers of generation elements with a probability proportional to the element number evaluation value data;

an element virtual generation evaluation value calculation unit to calculate an element virtual generation evaluation value of element candidate of the selected number of generation elements; and an element virtual generation unit to select one from a plurality of element candidates with a probability proportional to the element virtual generation evaluation value and virtually generating an element.

15. A biometric authentication method, comprising:

storing data indicating an initial-element generation probability of a blood vessel image, data indicating a branch probability of an element and data indicating a change coefficient or a change probability of the element, which are obtained by dividing a plurality of sets of a registration image and a verification image which indicate the blood vessel image of a living body into a plurality of respective elements;

calculating an element generation probability of a focused-on element of a verification image to be authenticated, using the data indicating the generation probability of the initial element and the data indicating the branch probability which are stored in the storage unit and calculating a value obtained by multiplying the element generation probabilities of respective focused-on elements as a verification-image generation probability of the verification image to be authenticated;

calculating change probabilities of the focused-on element of the verification image and an element of a registration image of a person to be authenticated using the data indicating the change coefficient or the change probability which are stored in the storage unit and calculating a value obtained by multiplying the change probabilities of respective focused-on elements as a change probability of the verification image;

calculating a degree of similarity or dissimilarity using the verification image generation probability and the change probability; and determining whether the verification image to be authenticated belongs to a registered person, in accordance with the degree of dissimilarity or similarity is more or less than a threshold.

16. The biometric authentication method according to claim 15, wherein initial-element generation evaluation value data is stored as the data used to calculate a generation probability of an initial element, an element number evaluation value data is stored as the data indicating the branch probability of the element and change coefficient data is stored as the data indicating the change coefficient or change probability of the element and calculation of the verification-image generation probability includes;

calculating a generation probability of the initial element of the verification image using the initial-element generation evaluation value data, determining an element which becomes a generation reference point using a distance between the focused-on element of the verification image and already-generated elements, calculating an element generation probability of the focused-on element using the element number evaluation value data stored in the storage unit and calculating a product of the initial-element generation probability and the element generation probabilities of respective elements as the verification-image generation probability.

17. A biometric authentication method, comprising:

storing data indicating an initial-element generation probability of a blood vessel image, data indicating a branch probability of an element and data indicating a change coefficient or a change probability of the element, which are obtained by dividing a plurality of sets of a registration image and a verification image which indicate the blood vessel image of a living body into a plurality of respective elements;

virtually generating a registration image by virtually generating a plurality of elements using the data indicating the initial-element generation probability and the data indicating the branch probability of the element;

calculating a registration-image virtual generation probability of the virtual registration image, calculating a registration-image generation probability of a registration image, calculating a virtual change probability of the registration image and the virtual registration image;

calculating a verification-image generation probability using the registration-image generation probability, the registration-image virtual generation probability and the virtual change probability, calculating a change probability of the registration image and the verification image to be authenticated;

calculating a degree of similarity or dissimilarity using the verification-image generation probability and the change probability; and determining whether a verification image to be authenticated belongs to a registered person, in accordance with the degree of dissimilarity or similarity is more or less than a threshold.

18. An authentication accuracy evaluation method, comprising:

storing data indicating an initial-element generation probability of a blood vessel image, data indicating a branch probability of an element and data indicating a change coefficient or a change probability of the element, which are obtained by dividing a plurality of sets of a registration image and a verification image which indicate the blood vessel image of a living body into a plurality of respective elements;

virtually generating a plurality of registration images using the data indicating the generation probability of an initial element and the data indicating the branch probability which are stored in the storage unit;

virtually generating a plurality of verification images using the data indicating the generation probability of the initial element, the data indicating the branch probability of the element and the data indicating the change coefficient or the change probability, which are stored in the storage unit;

calculating a generation probability of a verification image;

calculating change probabilities of the virtually generated registration image and the virtually generated verification image;

calculating a degree of similarity or dissimilarity using the verification image generation probability and the change probability; and totaling a plurality of the degree of dissimilarity or similarity and generating data indicating authentication accuracy.

* * * * *